United States Patent
Widmer et al.

(10) Patent No.: US 9,561,730 B2
(45) Date of Patent: Feb. 7, 2017

(54) WIRELESS POWER TRANSMISSION IN ELECTRIC VEHICLES

(75) Inventors: Hanspeter Widmer, Wohlenschwil (CH); Nigel P. Cook, El Cajon, CA (US); Lukas Sieber, Olten (CH)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 13/082,211

(22) Filed: Apr. 7, 2011

(65) Prior Publication Data
US 2011/0254377 A1 Oct. 20, 2011

Related U.S. Application Data

(60) Provisional application No. 61/322,196, filed on Apr. 8, 2010, provisional application No. 61/322,214, filed on Apr. 8, 2010, provisional application No. 61/322,221, filed on Apr. 8, 2010.

(51) Int. Cl.
| | | |
|---|---|---|
| H04B 3/00 | (2006.01) | |
| H04B 5/00 | (2006.01) | |
| B60L 11/18 | (2006.01) | |

(52) U.S. Cl.
CPC ............ *B60L 11/182* (2013.01); *B60L 11/185* (2013.01); *B60L 11/1877* (2013.01); *H04B 3/00* (2013.01); *H04B 5/0037* (2013.01); *B60L 2200/26* (2013.01); *B60L 2210/20* (2013.01); *Y02T 10/7005* (2013.01); *Y02T 10/705* (2013.01); *Y02T 10/7072* (2013.01); *Y02T 10/725* (2013.01); *Y02T 90/121* (2013.01); *Y02T 90/122* (2013.01); *Y02T 90/127* (2013.01); *Y02T 90/128* (2013.01); *Y02T 90/14* (2013.01)

(58) Field of Classification Search
CPC .................................... H04B 3/00; H04B 5/00
USPC ......................................... 307/9.1, 10.1, 104
See application file for complete search history.

(56) References Cited

U.S. PATENT DOCUMENTS

| | | | |
|---|---|---|---|
| 4,800,328 A | 1/1989 | Bolger et al. | |
| 5,399,955 A * | 3/1995 | Glaser ...................... | G05F 1/70 323/208 |
| 5,515,285 A | 5/1996 | Garrett, Sr. et al. | |
| 5,568,036 A | 10/1996 | Hulsey et al. | |

(Continued)

FOREIGN PATENT DOCUMENTS

| | | |
|---|---|---|
| CN | 101667754 A | 3/2010 |
| DE | 10325246 B3 | 11/2004 |

(Continued)

OTHER PUBLICATIONS

Teck Chuan Beh et al., "Basic Study of Improving Efficiency of Wireless Power Transfer via Magnetic Resonance Coupling Based on Impedance Matching", Industrial Electronics (ISIE), 2010 IEEE International Symposium on, Jul. 2010, pp. 2011-2016.

(Continued)

*Primary Examiner* — Adi Amrany
(74) *Attorney, Agent, or Firm* — Knobbe Martens Olson & Bear LLP

(57) ABSTRACT

Exemplary embodiments are directed to bidirectional wireless power transfer using magnetic resonance in a coupling mode region between a charging base (CB) and a battery electric vehicle (BEV). For different configurations, the wireless power transfer can occur from the CB to the BEV and from the BEV to the CB.

28 Claims, 55 Drawing Sheets

(56) References Cited

U.S. PATENT DOCUMENTS

| | | | |
|---|---|---|---|
| 5,573,090 A | 11/1996 | Ross | |
| 5,617,003 A | 4/1997 | Odachi et al. | |
| 5,654,621 A | 8/1997 | Seelig | |
| 5,710,502 A | 1/1998 | Poumey | |
| 5,821,731 A | 10/1998 | Kuki et al. | |
| 5,959,410 A * | 9/1999 | Yamauchi | H05B 41/28 315/209 R |
| 5,982,645 A * | 11/1999 | Levran et al. | 363/37 |
| 6,465,990 B2 * | 10/2002 | Acatrinei | G05F 1/70 323/222 |
| 6,960,968 B2 | 11/2005 | Odendaal et al. | |
| 7,375,994 B2 * | 5/2008 | Andreycak | 363/89 |
| 7,382,112 B2 * | 6/2008 | Krein | 323/207 |
| 7,839,023 B2 * | 11/2010 | Jacobson et al. | 307/77 |
| 7,880,334 B2 * | 2/2011 | Evans et al. | 307/66 |
| 7,990,117 B2 * | 8/2011 | Benedict | 323/271 |
| 8,294,427 B2 * | 10/2012 | Inoue et al. | 320/137 |
| 8,531,059 B2 * | 9/2013 | Ichikawa et al. | 307/104 |
| 8,587,154 B2 * | 11/2013 | Fells et al. | 307/104 |
| 8,953,340 B2 | 2/2015 | Boys | |
| 2002/0175784 A1 | 11/2002 | Yamashita et al. | |
| 2002/0196193 A1 | 12/2002 | Butler et al. | |
| 2003/0030411 A1 | 2/2003 | Ayano et al. | |
| 2004/0145342 A1 | 7/2004 | Lyon | |
| 2005/0151517 A1 * | 7/2005 | Cook et al. | 323/207 |
| 2005/0243522 A1 * | 11/2005 | Nilsen et al. | 361/716 |
| 2006/0145658 A1 * | 7/2006 | Wang | 320/107 |
| 2007/0052397 A1 * | 3/2007 | Thompson | G05F 1/613 323/223 |
| 2007/0115695 A1 * | 5/2007 | Lou et al. | 363/16 |
| 2007/0153560 A1 * | 7/2007 | Zhang et al. | 363/166 |
| 2007/0205881 A1 | 9/2007 | Breed | |
| 2008/0067869 A1 * | 3/2008 | Evans et al. | 307/11 |
| 2008/0164761 A1 * | 7/2008 | O'Bryant et al. | 307/66 |
| 2008/0297107 A1 | 12/2008 | Kato et al. | |
| 2009/0033304 A1 * | 2/2009 | Benedict | 323/284 |
| 2009/0079388 A1 | 3/2009 | Reddy | |
| 2009/0103341 A1 * | 4/2009 | Lee et al. | 363/124 |
| 2009/0108677 A1 | 4/2009 | Walter et al. | |
| 2009/0251008 A1 | 10/2009 | Sugaya | |
| 2010/0020579 A1 * | 1/2010 | Melanson | 363/89 |
| 2010/0102742 A1 * | 4/2010 | Park | H05B 41/2885 315/247 |
| 2010/0106984 A1 * | 4/2010 | Weng et al. | 713/300 |
| 2010/0117596 A1 | 5/2010 | Cook et al. | |
| 2010/0141206 A1 | 6/2010 | Agassi et al. | |
| 2010/0148723 A1 * | 6/2010 | Cook et al. | 320/108 |
| 2010/0201189 A1 | 8/2010 | Kirby et al. | |
| 2010/0230197 A1 | 9/2010 | Ortmann et al. | |
| 2010/0231163 A1 | 9/2010 | Mashinsky | |
| 2010/0235006 A1 | 9/2010 | Brown | |
| 2010/0244775 A1 * | 9/2010 | Smith | H02M 3/33584 320/140 |
| 2010/0259458 A1 | 10/2010 | Mattis et al. | |
| 2010/0295506 A1 | 11/2010 | Ichikawa | |
| 2011/0001485 A1 * | 1/2011 | Feight et al. | 324/500 |
| 2011/0013322 A1 * | 1/2011 | Gale et al. | 361/42 |
| 2011/0050164 A1 * | 3/2011 | Partovi et al. | 320/108 |
| 2011/0082621 A1 | 4/2011 | Berkobin et al. | |
| 2011/0095959 A1 | 4/2011 | Schertz et al. | |
| 2011/0133726 A1 | 6/2011 | Ballantyne et al. | |
| 2011/0156643 A1 * | 6/2011 | Chen et al. | 320/109 |
| 2011/0176343 A1 | 7/2011 | Kojima | |
| 2011/0181240 A1 * | 7/2011 | Baarman | B60L 11/182 320/108 |
| 2011/0204845 A1 * | 8/2011 | Paparo et al. | 320/108 |
| 2011/0254503 A1 | 10/2011 | Widmer et al. | |
| 2012/0043172 A1 * | 2/2012 | Ichikawa | B60L 5/005 191/45 R |
| 2012/0043807 A1 * | 2/2012 | Ichikawa | B60L 11/1816 307/9.1 |
| 2012/0091970 A1 * | 4/2012 | Cho et al. | 320/160 |
| 2012/0106206 A1 * | 5/2012 | Tang | H02M 1/4258 363/21.02 |
| 2012/0153717 A1 * | 6/2012 | Obayashi et al. | 307/9.1 |
| 2012/0306439 A1 * | 12/2012 | Ichikawa et al. | 320/108 |
| 2013/0076155 A1 * | 3/2013 | Yu et al. | 307/104 |

FOREIGN PATENT DOCUMENTS

| | | | |
|---|---|---|---|
| EP | 0751580 A2 | 1/1997 | |
| EP | 2066013 A2 | 6/2009 | |
| GB | 2463548 A | 3/2010 | |
| JP | H0764637 A | 3/1995 | |
| JP | H08103039 A | 4/1996 | |
| JP | H09200115 A | 7/1997 | |
| JP | H1014124 A | 1/1998 | |
| JP | H10136588 A | 5/1998 | |
| JP | 11252810 A * | 9/1999 | H02J 7/00 |
| JP | 2001008380 A | 1/2001 | |
| JP | 2002084673 A | 3/2002 | |
| JP | 2002281754 A * | 9/2002 | H02M 3/28 |
| JP | 2003315449 A | 11/2003 | |
| JP | 2003533961 A | 11/2003 | |
| JP | 2006517378 A | 7/2006 | |
| JP | 2009110893 A | 5/2009 | |
| JP | 2009136104 A | 6/2009 | |
| JP | 2009251895 A | 10/2009 | |
| JP | 2009261105 A | 11/2009 | |
| JP | 2009539343 A | 11/2009 | |
| JP | 2010022183 A | 1/2010 | |
| JP | 2010073976 A | 4/2010 | |
| JP | 2010081736 A * | 4/2010 | |
| JP | 2011504720 A | 2/2011 | |
| JP | 2011182633 A | 9/2011 | |
| TW | 200929817 A | 7/2009 | |
| WO | WO-9501669 A1 | 1/1995 | |
| WO | WO-0189058 A1 | 11/2001 | |
| WO | WO 2004047262 A2 * | 6/2004 | |
| WO | WO-2004068726 A2 | 8/2004 | |
| WO | WO-2004107276 A1 | 12/2004 | |
| WO | WO-2007139401 A2 | 12/2007 | |
| WO | WO-2008145982 A2 | 12/2008 | |
| WO | WO-2009069039 A1 | 6/2009 | |
| WO | WO2009111597 A2 | 9/2009 | |
| WO | WO2010006078 | 1/2010 | |
| WO | WO-2010027559 A1 | 3/2010 | |
| WO | WO-2010028092 A1 | 3/2010 | |
| WO | WO-2010033727 A2 | 3/2010 | |
| WO | WO2010035338 A1 | 4/2010 | |

OTHER PUBLICATIONS

International Search Report and Written Opinion—PCT/US2011/031850—ISA/EPO—May 15, 2012.

European Search Report—EP15150222—Search Authority—Munich—May 27, 2015.

* cited by examiner

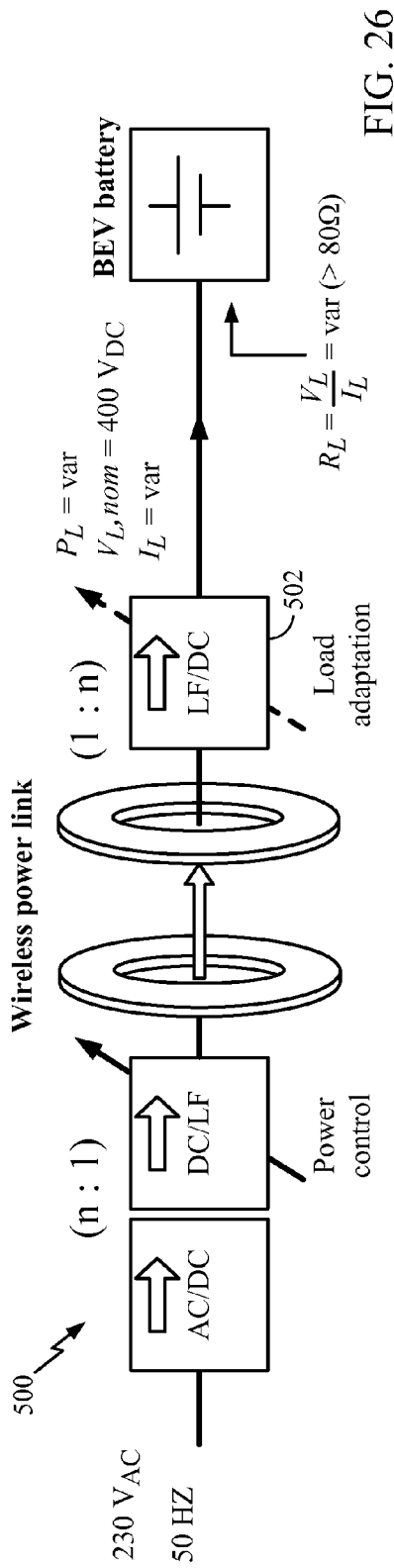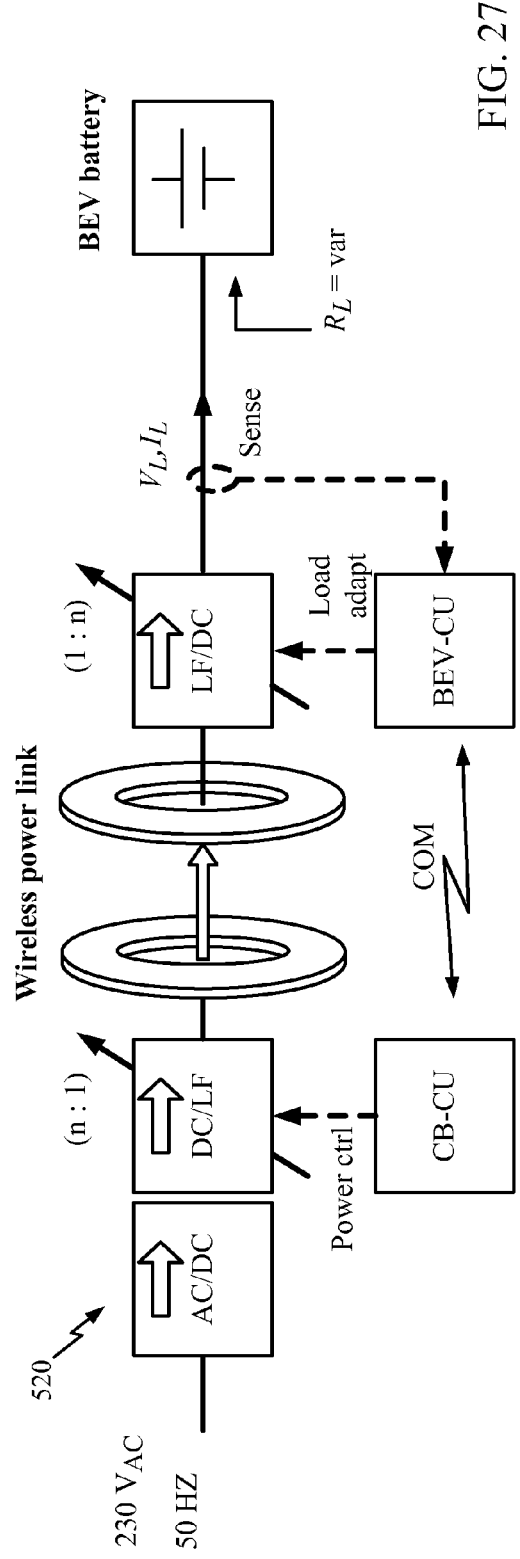

100 Hz pulsed AM (modulation harmonics side-bands)

LF ± n*100 Hz

100 Hz pulsed (Clean 'double tone' spectrum)

WIRELESS POWER TRANSMISSION IN ELECTRIC VEHICLES

CLAIM OF PRIORITY UNDER 35 U.S.C. §119

This application claims priority under 35 U.S.C. §119(e) to:

U.S. Provisional Patent Application 61/322,196 entitled "WIRELESS POWER TRANSMISSION IN ELECTRIC VEHICLES BACKGROUND" filed on Apr. 8, 2010, the disclosure of which is hereby incorporated by reference in its entirety;

U.S. Provisional Patent Application 61/322,214 entitled "WIRELESS POWER ANTENNA ALIGNMENT ADJUSTMENT SYSTEM FOR VEHICLES" filed on Apr. 8, 2010, the disclosure of which is hereby incorporated by reference in its entirety; and U.S. Provisional Patent Application 61/322,221 entitled "VEHICLE GUIDANCE SYSTEM FOR WIRELESS POWER BACKGROUND" filed on Apr. 8, 2010, the disclosure of which is hereby incorporated by reference in its entirety.

REFERENCE TO CO-PENDING APPLICATION FOR PATENT

This application is also related to the following applications, which are assigned to the assignee hereof and filed on even date herewith, the disclosures of which are incorporated herein in their entirety by reference:

U.S. patent application Ser. No. 13/082,229 entitled "WIRELESS POWER ANTENNA ALIGNMENT ADJUSTMENT SYSTEM FOR VEHICLES" filed on Apr. 7, 2011, the disclosure of which is hereby incorporated by reference in its entirety.

BACKGROUND

Field

The present invention relates generally to wireless power transfer, and more specifically to devices, systems, and methods related to wireless power transfer to vehicles including batteries.

Background

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within millimeters). Though this approach does have the capability to simultaneously charge multiple devices in the same area, this area is typically very small and requires the user to accurately locate the devices to a specific area.

Recently, vehicles have been introduced that include locomotion power from electricity and batteries to provide that electricity. Hybrid electric vehicles include on-board chargers that use power from vehicle braking and traditional motors to charge the vehicles. Vehicles that are solely electric must receive the electricity for charging the batteries from other sources. These electric vehicles are conventionally proposed to be charged through some type of wired alternating current (AC) such as household or commercial AC supply sources.

Efficiency is of importance in a wireless power transfer system due to the losses occurring in the course of wireless transmission of power. Since wireless power transmission is often less efficient than wired transfer, efficiency is of an even greater concern in a wireless power transfer environment. As a result, there is a need for methods and apparatuses that provide wireless power to electric vehicles.

A wireless charging system for electric vehicles may require transmit and receive antennas to be aligned within a certain degree. Adequate alignment of transmit and receive antennas within an electric vehicle wireless charging system may require proper positioning of an electric vehicle within a parking space, as well as fine tuning of antenna locations after the electric vehicle has been positioned within the parking space.

As a result, there is a need for methods and apparatuses that provide wireless power to electric vehicles.

BRIEF DESCRIPTION OF THE DRAWINGS

FIG. 26 is a simplified block diagram of a wireless power system for a BEV illustrating that the variable power control shown in FIGS. 24-25G may also be applicable to load adaptation in the BEV.

FIG. 27 is a simplified block diagram of a wireless power system for a BEV illustrating a communication channel between the BEV and the transmitter that may be present in some embodiments of the invention.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted from a transmitter to a receiver without the use of physical electromagnetic conductors.

Moreover, the term "wireless charging" is used herein to mean providing wireless power to one or more electrochemical cells or systems including electrochemical cells for the purpose of recharging the electrochemical cells.

The term "battery electric vehicle" (BEV) is used herein to mean a vehicle that includes, as part of its locomotion abilities, electrical power derived from one or more rechargeable electrochemical cells. As non-limiting examples, some BEVs may be hybrid electric vehicles that include on-board chargers that use power from vehicle deceleration and traditional motors to charge the vehicles, other BEVs may draw all locomotion ability from electrical power.

Exemplary embodiments of the invention include methods and apparatuses that provide wireless power to electric vehicles.

Figure 1:
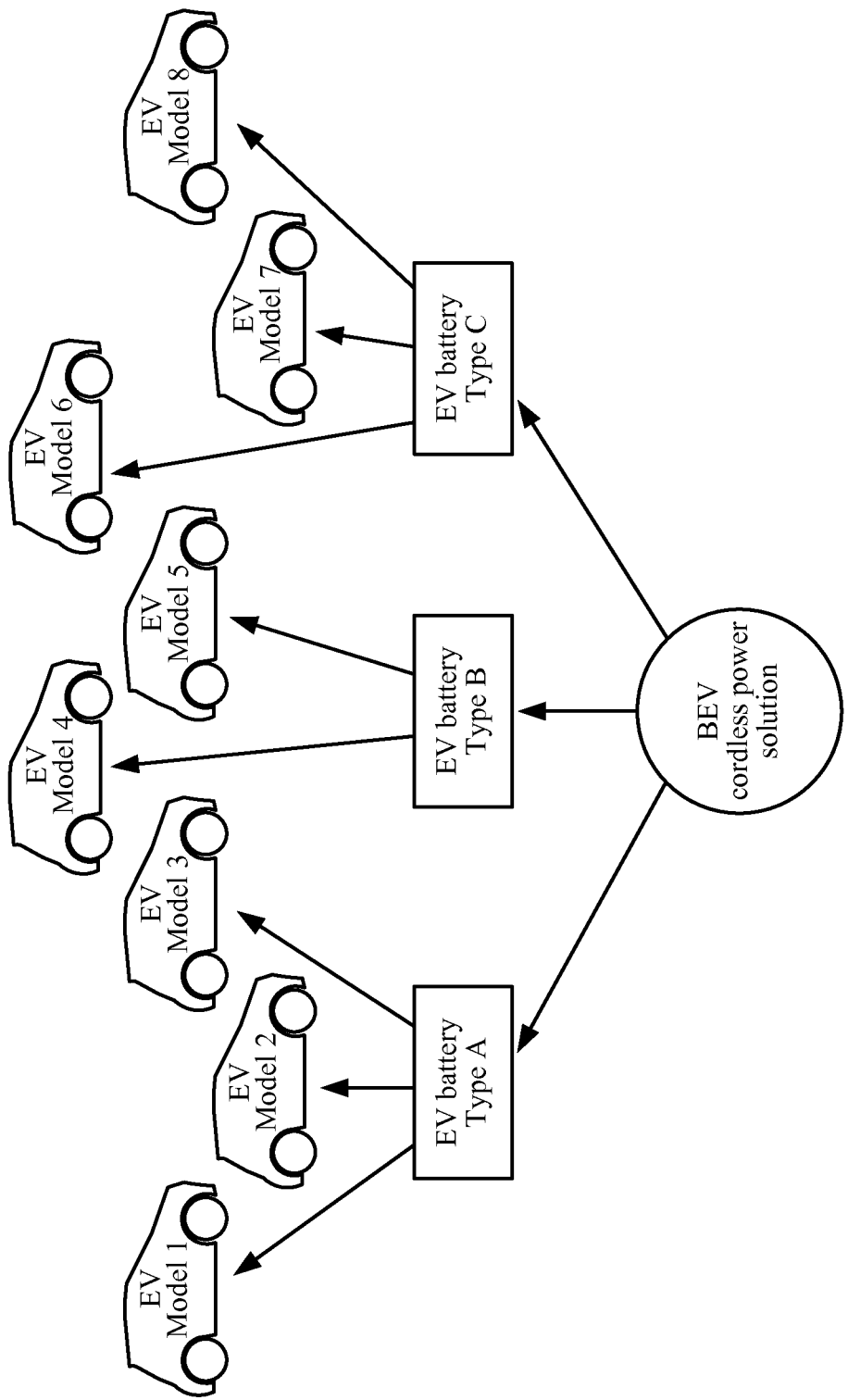
FIG. 1 is a hierarchical diagram illustrating how a wireless charging system can be used with a variety of replaceable batteries, each of which may be used in a variety of battery electric vehicles (BEV).

FIG. 1 is a hierarchical diagram illustrating how a wireless charging system can be used with a variety of replaceable batteries, each of which may be used in a variety of battery electric vehicles. Starting at the top, there may be many different models of BEVs. However, groups of vehicle models may be adapted to use only a limited number of replaceable battery units, such as Electric Vehicle (EV) battery type A, EV battery type B, and EV battery type C. As non-limiting examples, these different battery types may be configured based on needed capacity of the batteries, space required for the batteries, form factor for the batteries, size of wireless power antennas, and form factor for wireless power antennas. With the battery types limited, particularly, the size, placement, and form factor of the wireless antennas, a single wireless power delivery solution can be provided that will provide near-field wireless coupling to the various battery types.

A battery integrated solution may ease adoption of wireless charging by EV manufacturers as this solution will have only minor impact on the electrical and mechanical design of an EV. Once widely accepted and standardized, only a relatively small number of EV battery types will need to be in circulation. Limiting the battery types will simplify customization of a wireless BEV charging solution as the number of battery types will be much smaller than the number of EV models that will be introduced into the market in the future.

Furthermore, limited battery types may enable an existing EV model to be retrofitted for wireless charging. This retrofitting could be simply performed by replacing a conventional battery in an EV with a new battery that integrates wireless charging and that behaves as the original battery at all its other interfaces. In addition, wireless power battery types may be configured with a wireless and contactless charging interface to the rest of the vehicles allowing for easy battery swapping and non-contact recharging of batteries, which may include some advantages in regards to reliability, mechanical wear out and safety.

Figure 2:
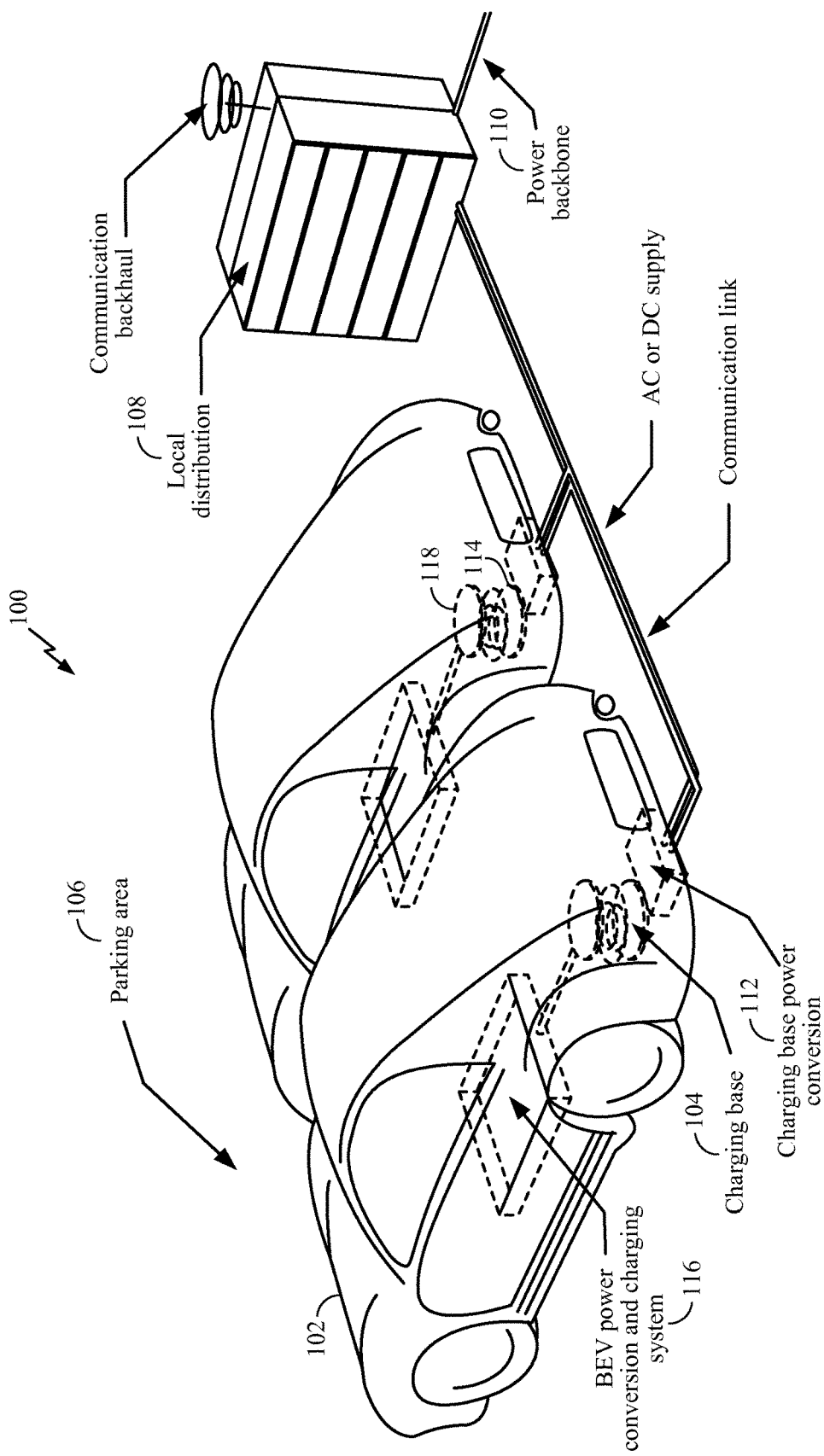
FIG. 2 illustrates a wireless charging system for BEVs equipped with a wireless receiver while the BEV is parked near a wireless transmitter.

FIG. 2 illustrates a wireless charging system for wireless charging enabled BEVs 102 while the BEV is parked near a wireless charging base (CB) 104. Two vehicles 102 are illustrated in a parking area 106 and parked over corresponding CBs 104. A local distribution center 108 is connected to a power backbone and is configured to provide an Alternating Current (AC) or a Direct Current (DC) supply to power conversion systems 112 as part of the CBs 104. The CBs 104 also include wireless power antennas 114 for generating or picking-up a near-field radiation. Each vehicle includes batteries, a BEV power conversion and charging system 116 and a wireless power antenna 118 interacting with the CB antenna 114 via the near-field. In some exemplary embodiments the BEV antenna 118 may be aligned with the CB antenna 114 and, therefore, disposed within the near-field region simply by the driver positioning the vehicle correctly relative to the CB antenna 114. In other exemplary embodiments, the driver may be given visual feedback, auditory feedback, or combinations thereof to determine when the vehicle is properly placed for wireless power transfer. In yet other exemplary embodiments, the vehicle may be positioned by an autopilot system, which may move the vehicle back and forth (e.g., in zig-zag movements) until an alignment error has reached a tolerable value. This may be performed automatically and autonomously by the vehicle without or with only minimal driver intervention provided that the vehicle is equipped with a servo steering wheel, ultrasonic sensors all around and artificial intelligence. In still other exemplary embodiments, the BEV antenna 118, the CB antenna 114, or a combination thereof may include means for displacing and moving the antennas relative to each other to more accurately orient them and develop a more optimum near-field coupling therebetween.

The CBs 104 may be located in a variety of locations. As non-limiting examples, some suitable locations are a parking area at a home of the vehicle owner, parking areas reserved for BEV wireless charging modeled after conventional petroleum-based filling stations, and parking lots at other locations such as shopping centers and places of employment.

These BEV charging stations may provide numerous benefits, such as, for example:

Convenience: charging can be performed automatically virtually without driver intervention and manipulations.

Reliability: there may be no exposed electrical contacts and no mechanical wear out.

Safety: manipulations with cables and connectors may not be needed, and there may be no cables, plugs, or sockets that may be exposed to moisture and water in an outdoor environment.

Vandalism resistant: There may be no sockets, cables, and plugs visible nor accessible.

Availability: if BEVs will be used as distributed storage devices to stabilize the grid. Availability can be increased with a convenient docking-to-grid solution enabling Vehicle to Grid (V2G) capability.

Esthetical and non-impedimental: There may be no column loads and cables that may be impedimental for vehicles and/or pedestrians.

As a further explanation of the V2G capability, the wireless power transmit and receive capabilities can be configured as reciprocal such that the CB 104 transfers power to the BEV 102 and the BEV transfers power to the CB 104. This capability may be useful for power distribution stability by allowing BEVs to contribute power to the overall distribution system in a similar fashion to how solar-cell power systems may be connected to the power grid and supply excess power to the power grid.

Figure 3:
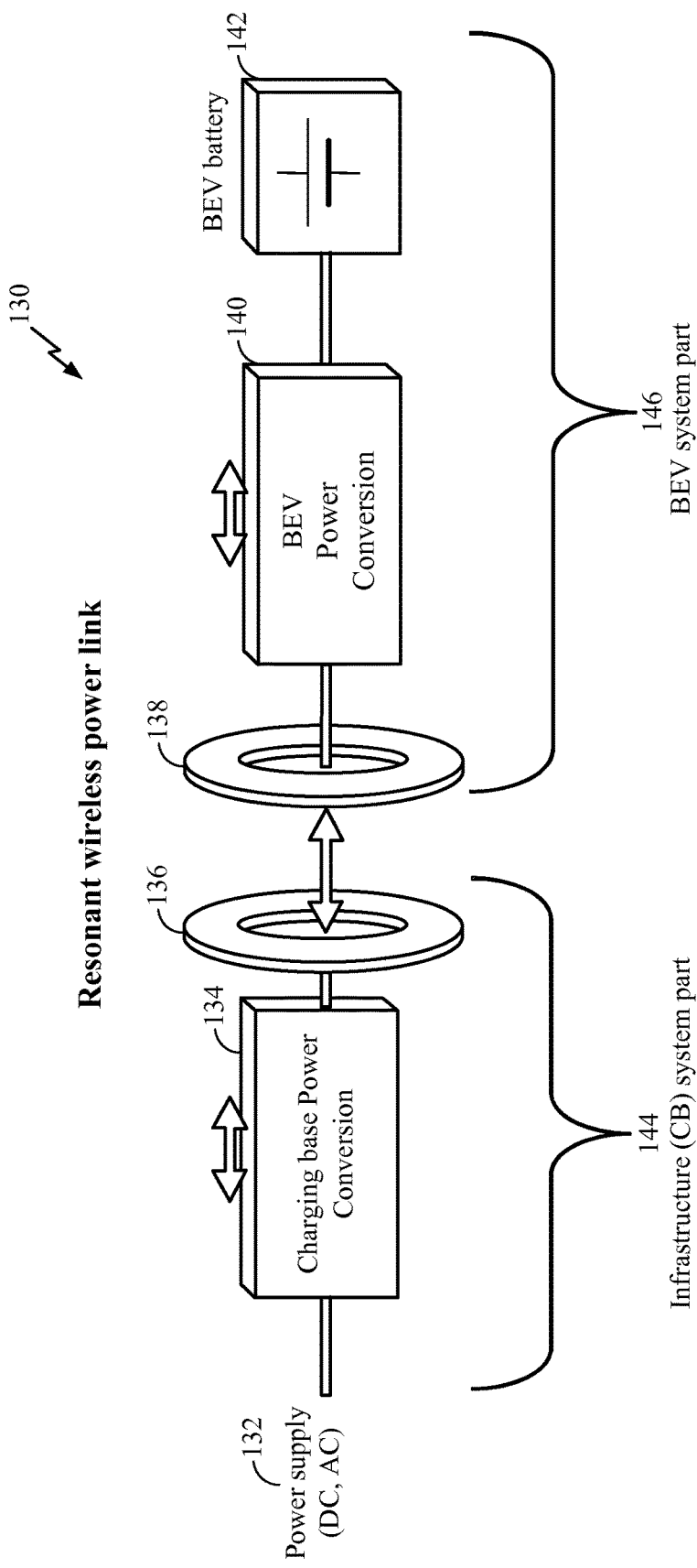
FIG. 3 is a simplified block diagram of a wireless power charging system for a BEV.

FIG. 3 is a simplified block diagram of a wireless power charging system 130 for a BEV. Exemplary embodiments described herein use capacitvely loaded wire loops (i.e., multi-turn coils) forming a resonant structure that is capable to efficiently couple energy from a primary structure (transmitter) to a secondary structure (receiver) via the magnetic near field if both primary and secondary are tuned to a common resonance frequency. The method is also known as "magnetic coupled resonance" and "resonant induction."

To enable wireless high power transfer, some exemplary embodiments may use a frequency in the range from 20-60 kHz. This low frequency coupling may allow highly efficient power conversion that can be achieved using state-of-the-art solid state devices. In addition, there may be less coexistence issues with radio systems compared to other bands.

In FIG. 3, a conventional power supply 132, which may be AC or DC, supplies power to the CB power conversion module 134 assuming energy transfer towards vehicle. The CB power conversion module 134 drives the CB antenna 136 to emit a desired frequency signal. If the CB antenna 136 and BEV antenna 138 are tuned to substantially the same frequencies and are close enough to be within the near-field radiation from the transmit antenna, the CB antenna 136 and BEV antenna 138 couple such that power may be transferred to the BEV antenna 138 and extracted in the BEV power conversion module 140. The BEV power conversion module 140 may then charge the BEV batteries 142. The power supply 132, CB power conversion module 134, and CB antenna 136 make up the infrastructure part 144 of an overall wireless power system 130, which may be stationary and located at a variety of locations as discussed above. The BEV battery 142, BEV power conversion module 140, and BEV antenna 138 make up a wireless power subsystem 146 that is part of the vehicle or part of the battery pack.

In operation, assuming energy transfer towards the vehicle or battery, input power is provided from the power supply 132 such that the CB antenna 136 generates a radiated field for providing the energy transfer. The BEV antenna 138 couples to the radiated field and generates output power for storing or consumption by the vehicle. In exemplary embodiments, the CB antenna 136 and BEV antenna 138 are configured according to a mutual resonant relationship and when the resonant frequency of the BEV antenna 138 and the resonant frequency of the CB antenna 136 are very close, transmission losses between the CB and BEV wireless power subsystems are minimal when the BEV antenna 138 is located in the "near-field" of the CB antenna 136.

As stated, an efficient energy transfer occurs by coupling a large portion of the energy in the near-field of a transmitting antenna to a receiving antenna rather than propagating most of the energy in an electromagnetic wave to the far field. When in this near-field a coupling mode may be developed between the transmit antenna and the receive antenna. The area around the antennas where this near-field coupling may occur is referred to herein as a near field coupling-mode region.

The CB and the BEV power conversion module may both include an oscillator, a power amplifier, a filter, and a matching circuit for efficient coupling with the wireless power antenna. The oscillator is configured to generate a desired frequency, which may be adjusted in response to an adjustment signal. The oscillator signal may be amplified by the power amplifier with an amplification amount responsive to control signals. The filter and matching circuit may be included to filter out harmonics or other unwanted frequencies and match the impedance of the power conversion module to the wireless power antenna.

The CB and BEV power conversion module may also include a rectifier, and switching circuitry to generate a suitable power output to charge the battery.

BEV and CB antennas used in exemplary embodiments may be configured as "loop" antennas, and more specifically, multi-turn loop antennas, which may also be referred to herein as a "magnetic" antenna. Loop (e.g., multi-turn loop) antennas may be configured to include an air core or a physical core such as a ferrite core. An air core loop antenna may allow the placement of other components within the core area. Physical core antennas may allow development of a stronger electromagnetic field.

As stated, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, a capacitor may be added in series with the antenna to create a resonant circuit that generates a magnetic field. Accordingly, for larger diameter loop antennas, the size of capacitance needed to induce resonance decreases as the diameter or inductance of the loop increases. It is further noted that inductance may also depend on a number of turns of a loop antenna. Furthermore, as the diameter of the loop antenna increases, the efficient energy transfer area of the near-field increases. Of course, other resonant circuits are possible. As another non-limiting example, a capacitor may be placed in parallel between the two terminals of the loop antenna (i.e., parallel resonant circuit).

Exemplary embodiments of the invention include coupling power between two antennas that are in the near-fields of each other. As stated, the near-field is an area around the antenna in which electromagnetic fields (also referred to herein as near field radiation) exist but may not propagate or radiate away from the antenna. Near-field coupling-mode regions are typically confined to a volume that is near the physical volume of the antenna e.g. within a radius of one sixth of the wavelength. In the exemplary embodiments of the invention, magnetic type antennas such as single and multi-turn loop antennas are used for both transmitting and receiving since magnetic near-field amplitudes in practical embodiments tend to be higher for magnetic type antennas in comparison to the electric near-fields of an electric-type antenna (e.g., a small dipole). This allows for potentially higher coupling between the pair. Another reason for relying on a substantially magnetic field is its low interaction with non-conductive dielectric materials in the environment and the safety issue. Electric antennas for wireless high power transmission may involve extremely high voltages. Furthermore, "electric" antennas (e.g., dipoles and monopoles) or a combination of magnetic and electric antennas is also contemplated.

Figure 4:
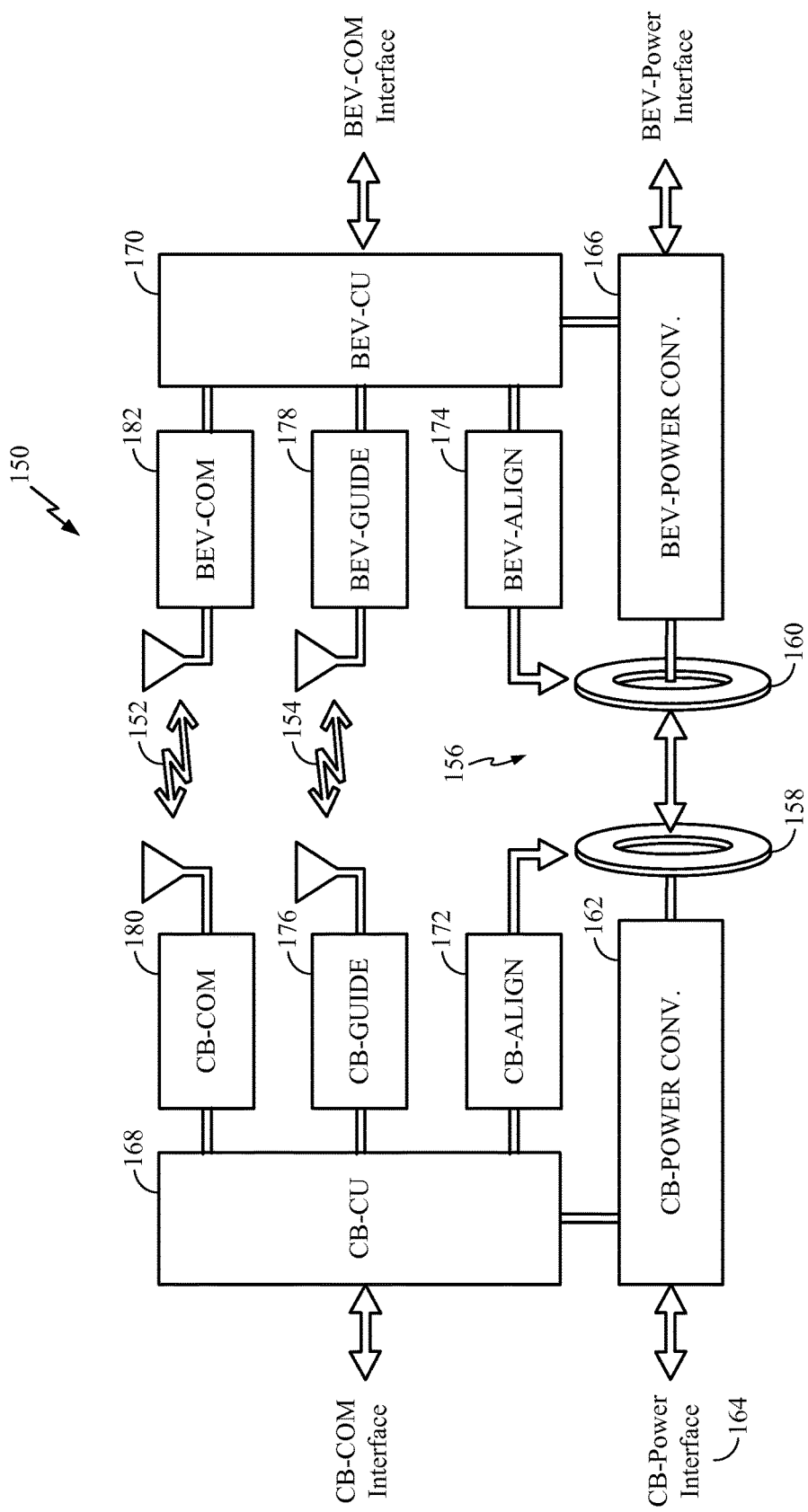
FIG. 4 is a more detailed block diagram of a wireless power charging system for a BEV illustrating communication links, guidance links, and alignment systems for the transmit antenna and receive antenna.

FIG. 4 is a more detailed block diagram of a generic wireless power charging system 150 for a BEV illustrating communication links 152, guidance links 154, and alignment systems 156 for the CB antenna 158 and BEV antenna 160. As with the exemplary embodiment of FIG. 3 and assuming energy flow towards BEV, in FIG. 4 the CB power conversion unit 162 receives AC or DC power from the CB power interface 164 and excites the CB antenna 158 at or near its resonant frequency. The BEV antenna 160, when in the near field coupling-mode region, receives energy from the near field coupling mode region to oscillate at or near the resonant frequency. The BEV power conversion unit 166 converts the oscillating signal from the receive antenna 160 to a power signal suitable for charging the battery.

The generic system may also include a CB communication unit 168 and a BEV communication unit 170, respectively. The CB communication unit 168 may include a communication interface to other systems (not shown) such as, for example, a computer, and a power distribution center. The BEV communication unit 170 may include a communication interface to other systems (not shown) such as, for example, an on-board computer on the vehicle, other battery charging controller, other electronic systems within the vehicles, and remote electronic systems.

The CB and BEV communication units may include subsystems or functions for specific application with separate communication channels therefore. These communications channels may be separate physical channels or just separate logical channels. As non-limiting examples, a CB alignment unit 172 may communicate with a BEV alignment unit 174 to provide a feedback mechanism for more closely aligning the CB antenna 158 and BEV antenna 160, either autonomously or with operator assistance. Similarly, a CB guide unit 176 may communicate with a BEV guide unit 178 to provide a feedback mechanism to guide an operator in aligning the CB antenna 158 and BEV antenna 160. In addition, there may be a separate general-purpose communication channel 152 including CB communication unit 180 and BEV communication unit 182 for communicating other information between the CB and the BEV. This information may include information about EV characteristics, battery characteristics, charging status, and power capabilities of both the CB and the BEV, as well as maintenance and diagnostic data. These communication channels may be separate physical communication channels such as, for example, Bluetooth, zigbee, cellular, etc.

In addition, some communication may be performed via the wireless power link without using specific communications antennas. In other words the communications antenna and the wireless power antenna are the same. Thus, some exemplary embodiments of the CB may include a controller (not shown) for enabling keying type protocol on the wireless power path. By keying the transmit power level (Amplitude Shift Keying) at predefined intervals with a predefined protocol, the receiver can detect a serial communication from the transmitter. The CB power conversion module 162 may include a load sensing circuit (not shown) for detecting the presence or absence of active BEV receivers in the vicinity of the near-field generated by the CB antenna 158. By way of example, a load sensing circuit monitors the current flowing to the power amplifier, which is affected by the presence or absence of active receivers in the vicinity of the near-field generated by CB antenna 158. Detection of changes to the loading on the power amplifier may be monitored by the controller for use in determining whether to enable the oscillator for transmitting energy, to communicate with an active receiver, or a combination thereof.

BEV circuitry may include switching circuitry (not shown) for connecting and disconnecting the BEV antenna 160 to the BEV power conversion unit 166. Disconnecting the BEV antenna not only suspends charging, but also changes the "load" as "seen" by the CB transmitter, which can be used to "cloak" the BEV receiver from the transmitter. If the CB transmitter includes the load sensing circuit, it can detect these load changes. Accordingly, the CB has a mechanism for determining when BEV receivers are present in the CB antenna's near-field.

Figure 5:
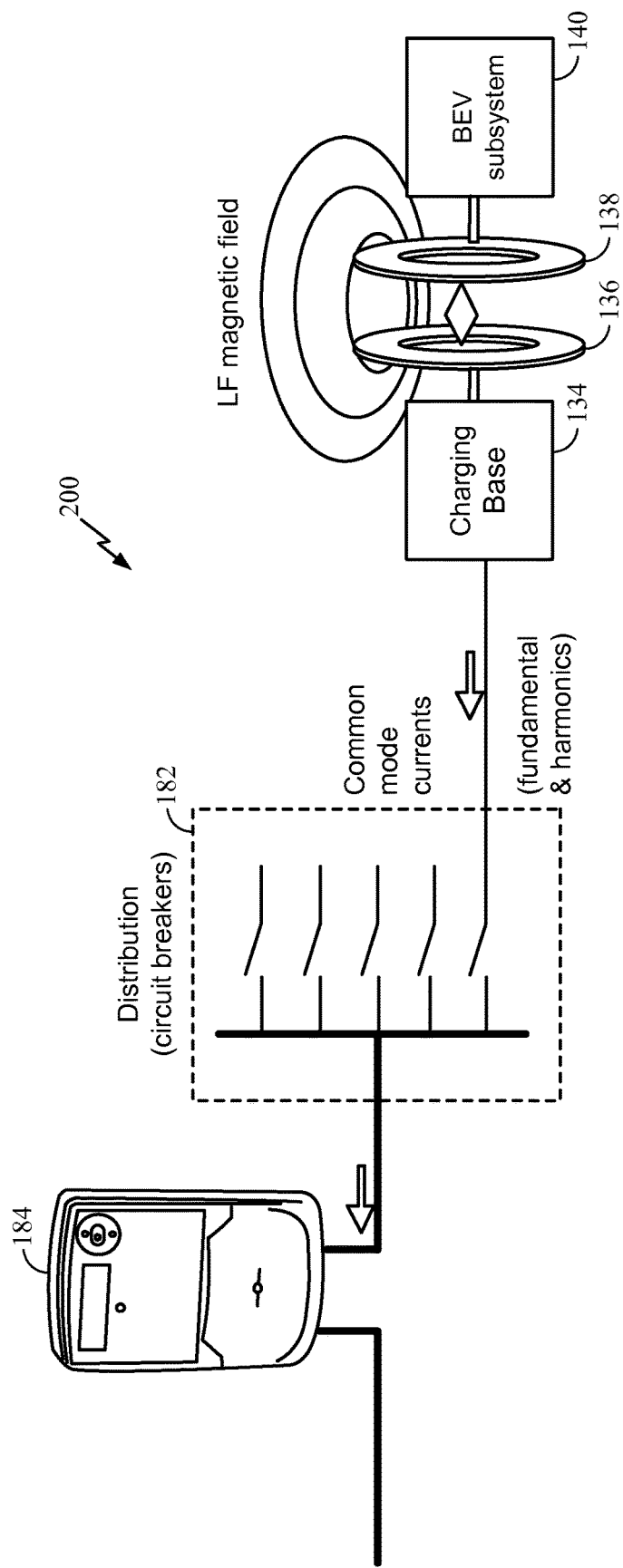
FIG. 5 illustrates portions of a distribution system for low voltage power line communications that may be used in some embodiments of the invention.

FIG. 5 illustrates portions of a power distribution system 200 enabled for low voltage power line communications that may be used in some embodiments of the invention. The CB may be linked to a power line communication system through a power distribution 182 to provide Power Line Communications (PLC) via its external CB-COM interface that supports the relevant PLC standard. The PLC node communicating with the external CB-COM interface may be integrated in an electricity (energy) meter 184. In many countries and particularly in Europe, PLC may play an important role as part of an Automated Metering Infrastructure (AMI) and for Smart Grid applications. An AMI may include elements such as: Automatic Meter Reading (AMR) of electricity, gas, water, heat; energy and water use profiling; demand forecasting; and demand side management. Furthermore, with exemplary embodiments of the invention, AMI may include management of V2G for BEVs. As a non-limiting example, an in-house PLC system may be configured as part of a home area network for home automation applications. Some non-limiting frequencies for PLC nodes may be in Band B (95-125 kHz) or Band C (125-140 kHz).

Wireless power charging in BEVs may be adapted to many different battery capabilities and technologies. For some exemplary embodiments, information about the battery capabilities and technologies may be useful in determining charging characteristics and charging profiles. Some non-limiting examples of battery capabilities are; battery charge, battery energy, battery voltage, battery capacity, battery charge current, battery charge power, and charging capabilities.

Many different batteries and electrochemical cell technologies may be used in BEVs. Some non-limiting examples of suitable electrochemical cells are, Lithium Ion, Lithium polymer, and lead-acid type batteries. Li-Ion cells may provide high energy density due to a high battery pack voltage (e.g., 400 V). Lead acid cells may provide high energy density due to high battery capacity (e.g. 180 Ah). Currently, there has been a trend to Li-Ion cells because they provide a high energy-density and high power-density. However, exemplary embodiments of the present invention may be used in other rechargeable electrochemical or electromechanical (e.g. flywheel) cells and even future rechargeable electrochemical or electromechanical cells.

Figure 6:
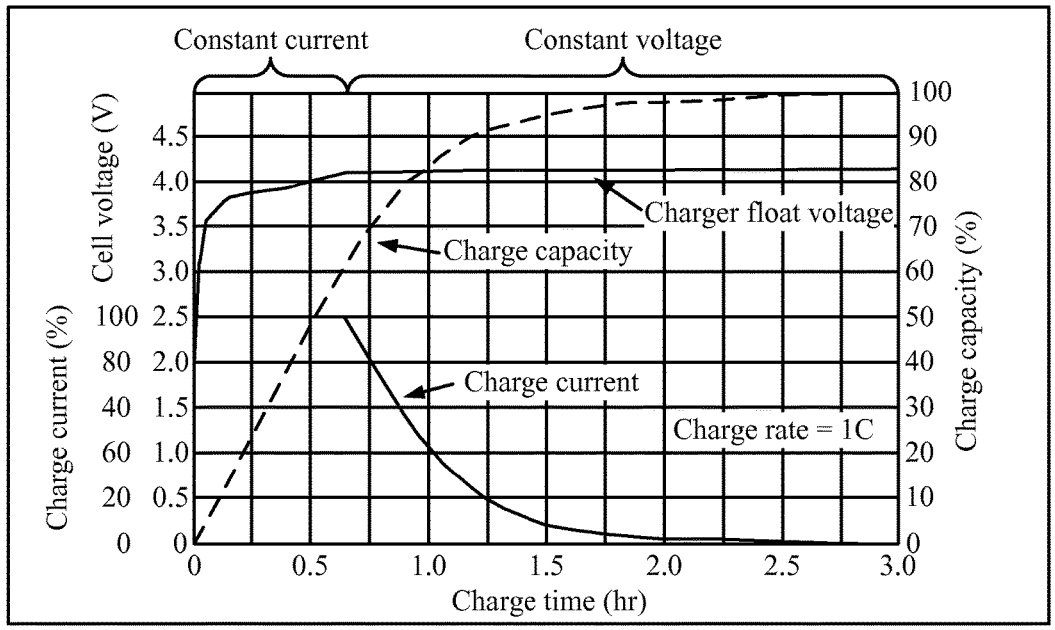
FIG. 6 shows a typical charging process of a Li-Ion battery which may be representative for charging a battery that may be used in a BEV.

FIG. 6 illustrates a typical charging process of a Li-Ion battery that may be representative for a battery that may be used in a BEV. The graph illustrates charge current versus charge time, cell voltage, and charge capacity. During a first phase, substantially constant current may be applied to the battery as the charge capacity is increasing at a relatively high rate. During a second phase, a substantially constant voltage may be applied as the charge capacity nears full charge. FIG. 6 illustrates an example charge scenario for charging a battery at its rated capacity (often referred to as 1C). Other fast charge scenarios may be used, such as rates faster than 1C (e.g., 2C, 3C, etc).

Figure 7:
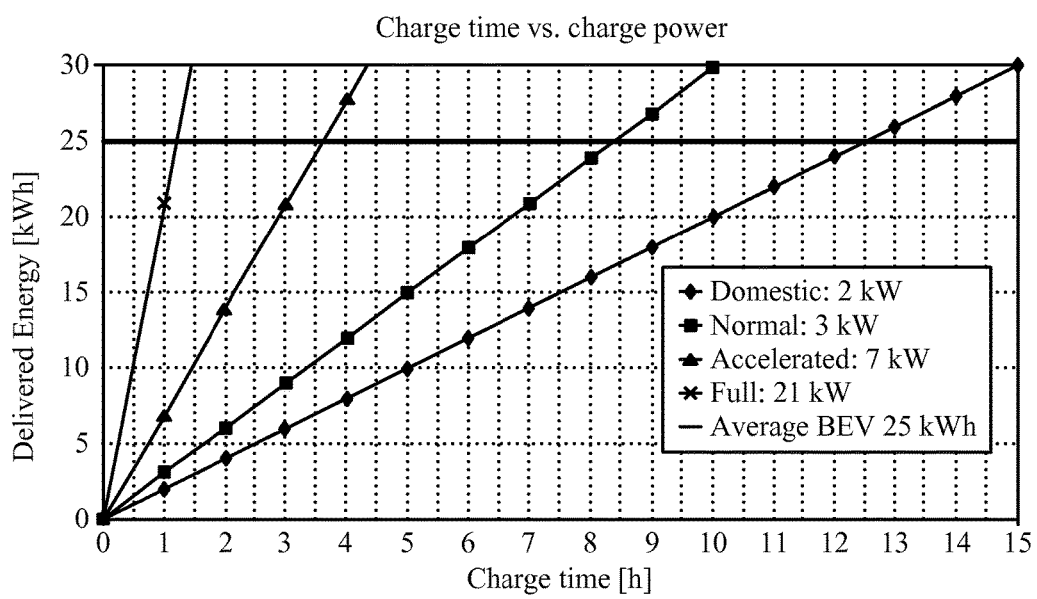
FIG. 7 illustrates examples of charging times for a battery that may be used in a BEV.

FIG. 7 illustrates examples of charging times for a battery that may be used in a BEV. A stored energy of 25 kWh is shown as one example of a charge capacity for a typical battery in a BEV. Depending on the power available, the charge time to full capacity may be as low as about 1.25 hours with a high delivery capability of about 21 kW, about 3.5 hours for an accelerated delivery capability of about 7 kW, about 8.5 hours for a normal delivery capability of about 3 kW, and about 12.5 hours for a domestic delivery capability of about 2 kW. FIG. 7 is intended as an example only to show ranges of charging times and how they may be adapted to wireless power delivery capabilities.

Figure 8:
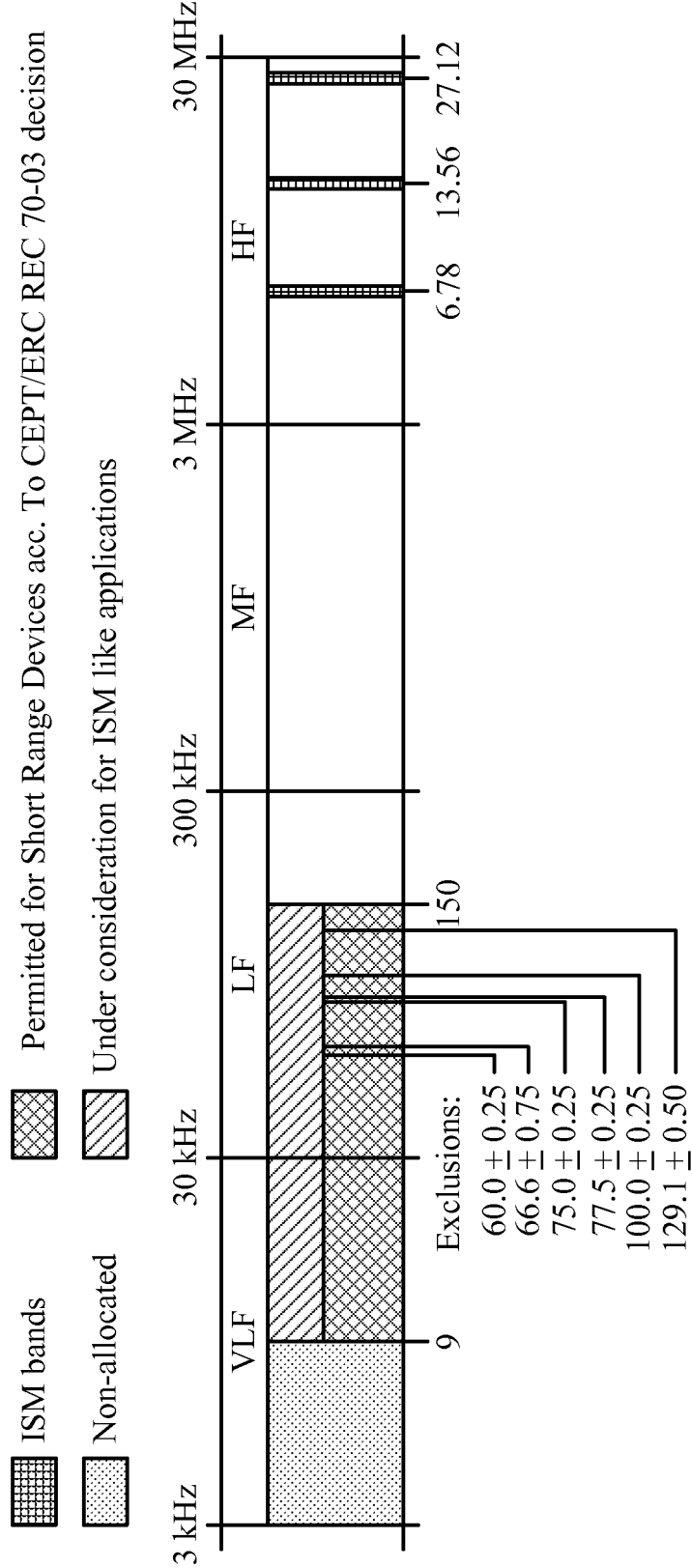
FIG. 8 illustrates a frequency spectrum showing various frequencies that may be available for wireless charging of BEVs.

FIG. 8 illustrates a frequency spectrum showing various frequencies that may be available and suitable for wireless charging of BEVs. Some potential frequency ranges for wireless high power transfer to BEVs include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 9:
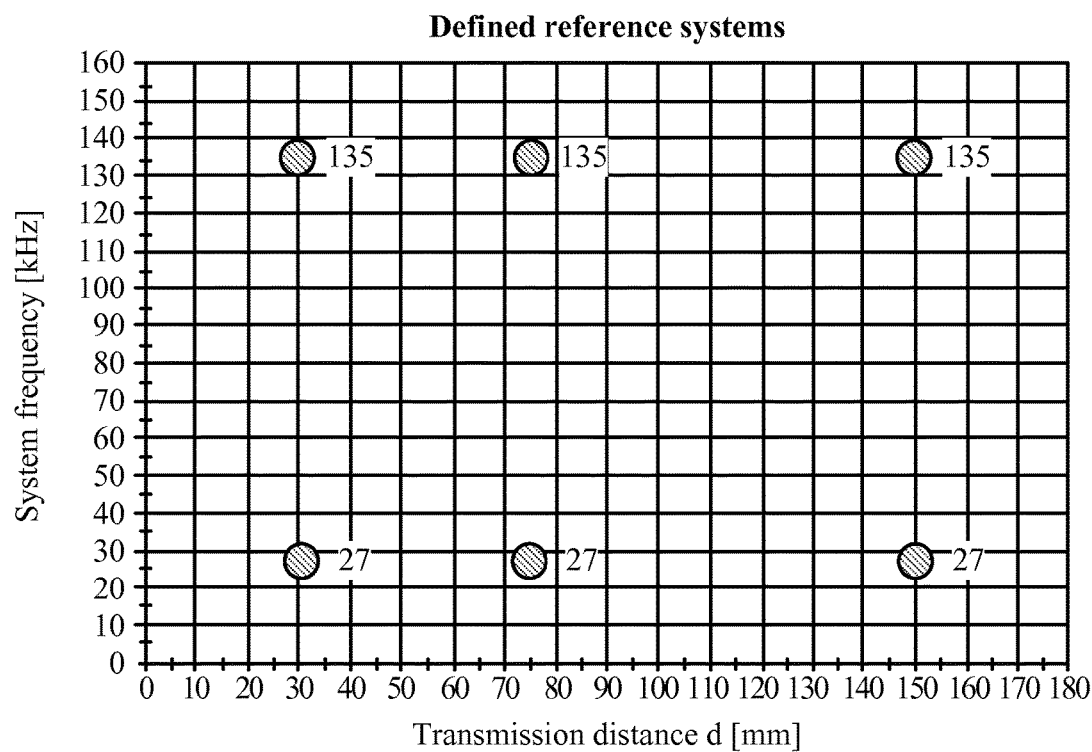
FIG. 9 illustrates some possible frequencies and transmission distances that may be useful in wireless charging of BEVs.

FIG. 9 illustrates some possible frequencies and transmission distances that may be useful in wireless charging of BEVs. Some example transmission distances that may be useful for BEV wireless charging are about 30 mm, about 75 mm, and about 150 mm. Some exemplary frequencies may be about 27 kHz in the VLF band and about 135 kHz in the LF band.

Many consideration must be taken into account on determining a suitable frequency beyond just the resonance characteristics and coupling-mode region of the receive and transmit antennas. Wireless power frequencies may interfere with frequencies used for other applications. As non-limiting examples, there may be VLF/LF coexistence issues with power line frequencies, audible frequencies and communication frequencies. Some non-limiting examples where coexistence may be an issue for VLF and LF are: frequencies for radio clocks, frequencies for LW AM broadcasts and other radio services, cross-coupling to ISDN/ADSL and ISDN/xDSL communication channels, electronic vehicle immobilization systems, RFID (Radio Frequency Identification) systems, EAS (Electronic Article Surveillance) systems, on-site paging, Low Voltage PLC systems, medical implants (cardiac pacemakers, etc.), audio systems and acoustic emission perceivable by humans and animals.

Some non-limiting examples where coexistence may be an issue for HF frequencies are industrial, scientific and medical (ISM) radio bands, such as: 6.78 MHz for remote control applications and RFID in FDX or HDX mode with continuous energy transfer; 13.56 MHz for RFID in FDX or HDX mode with continuous energy transfer as well as portable device wireless power; and 27.12 MHz for Railway applications (Eurobalise 27.095 MHz), Citizen band radio, and remote control (e.g., models, toys, garage door, computer mouse, etc.).

Figure 10:
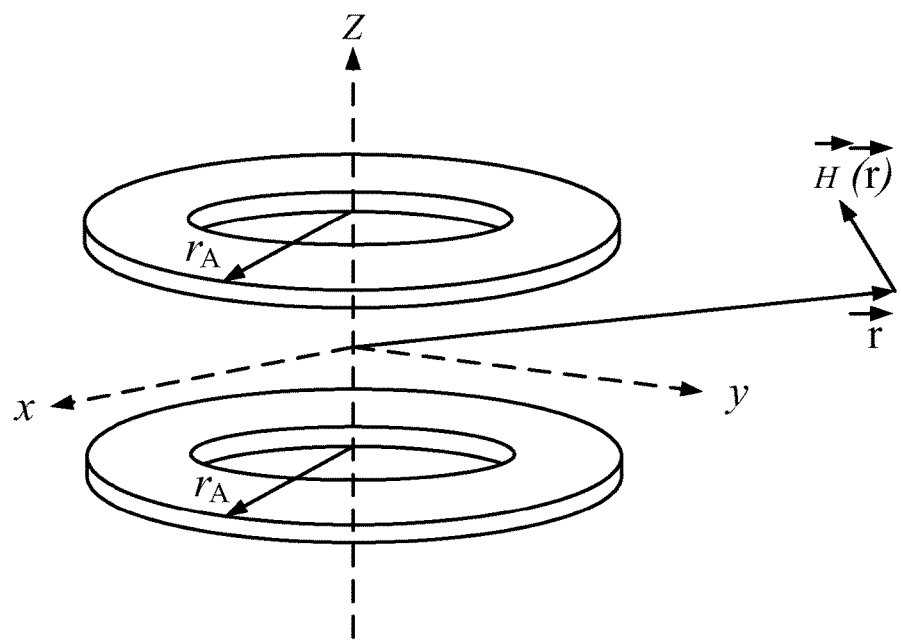
FIG. 10 illustrates transmit and receive loop antennas showing magnetic field strength relative to radius of the antennas.

FIG. 10 illustrates transmit and receive loop antennas showing field strength relative to radius of the antennas. Antenna structures with a radius larger or smaller than an optimum radius generate higher field strength in the vicinity of the antenna for a given transferred power. H-field strength increases linearly with increasing power transfer distance and for a given transferred power provided that the antenna radius is proportionally increased thus always optimum.

Figure 11A:
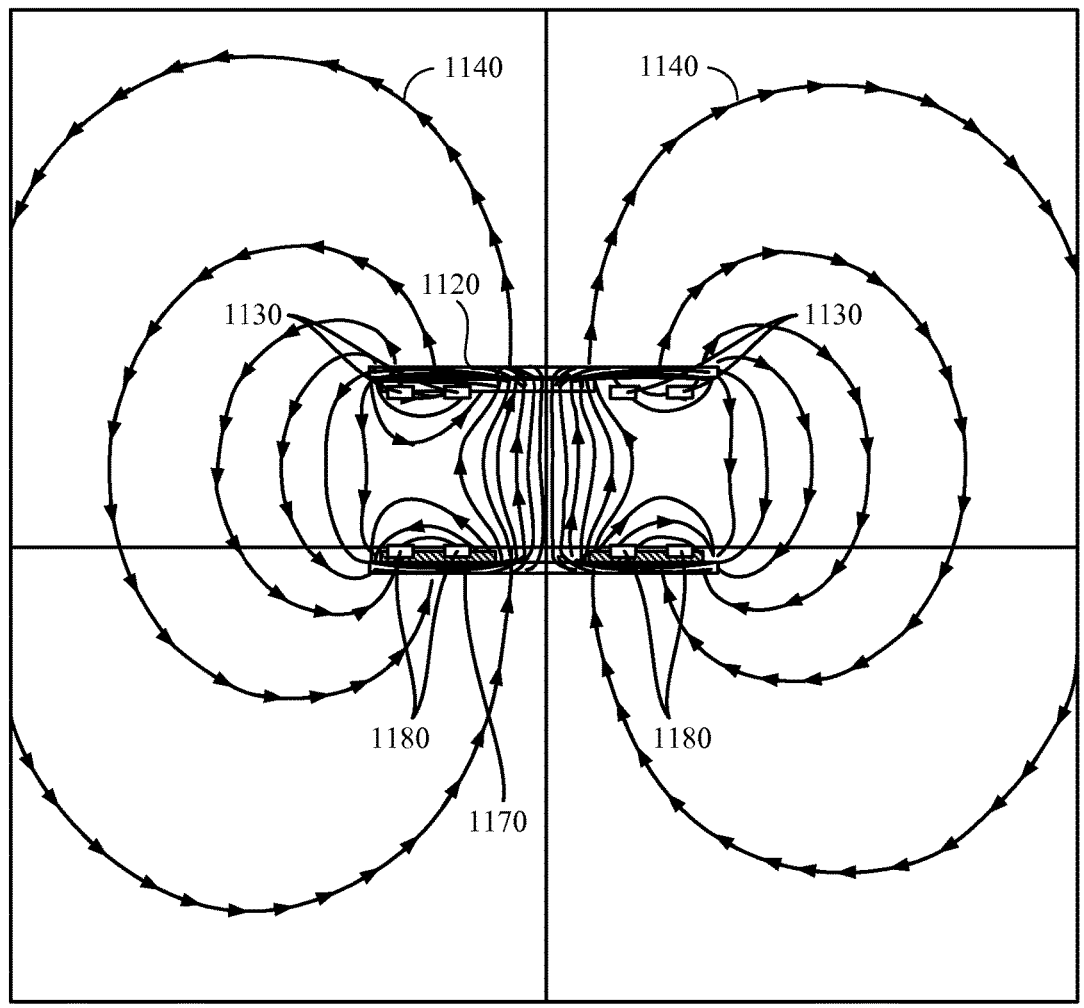
FIGS. 11A and 11B illustrate magnetic fields around a loop antenna and accompanying ferrite backing
Figure 11B:
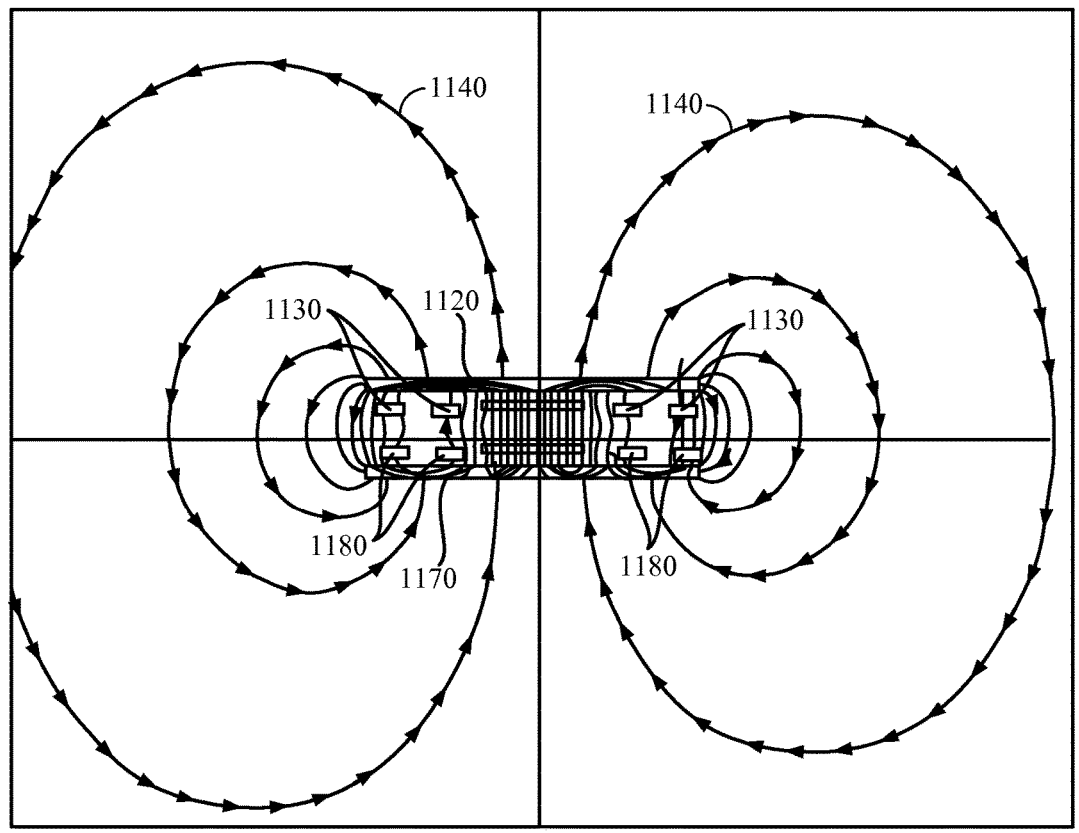

FIGS. 11A and 11B illustrate electromagnetic fields around a loop antenna and accompanying ferrite backing A transmit antenna includes a wire loop 1130, which may comprise a multi-turn wire loop, and a ferrite backing 1120 and a receive antenna includes a wire loop 1180 and a ferrite backing 1170. At VLF and LF frequencies, a ferrite backing may be useful for intensifying the magnetic field 1140 in the space between the antennas thus for enhanced coupling. As shown in FIG. 11A, if the separation between the antenna coils 1130 and 1180 and the ferrite backings 1120 and 1170 is reduced to 0 cm, the coupling coefficient between the transmit antenna and receive antenna decreases slightly. Consequently, there may be an ideal separation between the antenna coils 1130 and 1180 and the ferrite backings 1120 and 1170. FIG. 11B, illustrates a small separation between the antenna coils 1130 and 1180 and the ferrite backings 1120 and 1170. In addition, FIG. 11B illustrates a reduced spacing between the antenna coils 1130 and 1180 and their respective ferrite backings 1120 and 1170. For smaller transmission distances (e.g., 3 cm), the performance gain of ferrite backing may be less because the coupling coefficient is very high already.

Figure 12:
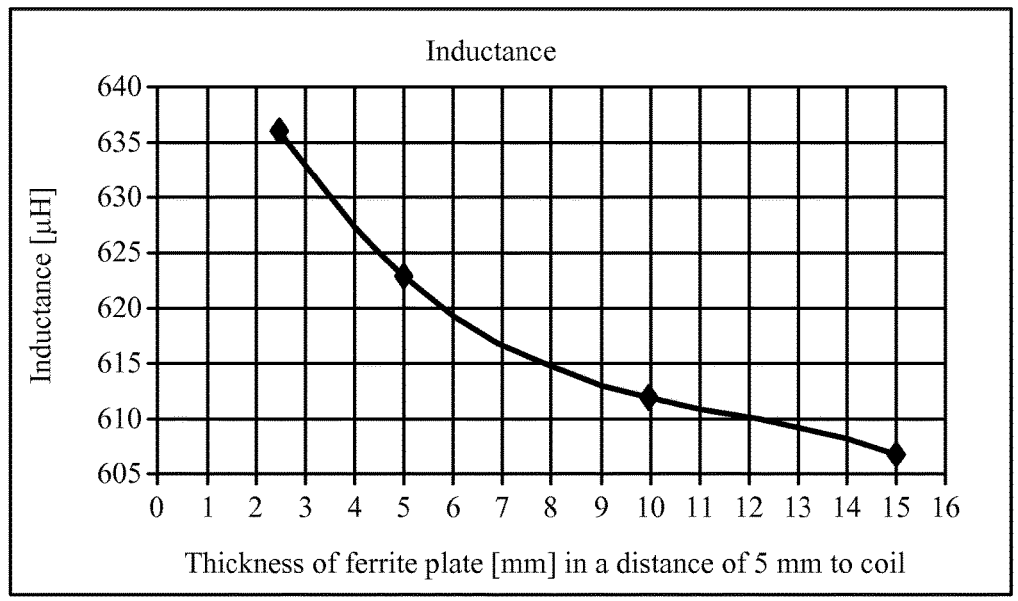
FIG. 12 is a graph illustrating possible inductance values for various thicknesses of a ferrite backing as part of a wireless power antenna.

FIG. 12 is a graph illustrating possible inductance values for various thicknesses of a ferrite backing as part of a wireless power antenna. In the exemplary embodiment for FIG. 12 the ferrite backing is about 0.5 cm from the coil. It can be seen that inductance does not change considerably (i.e., about 5%) with a thickness change for the ferrite backing between about 5 mm and 10 mm.

Figure 13:
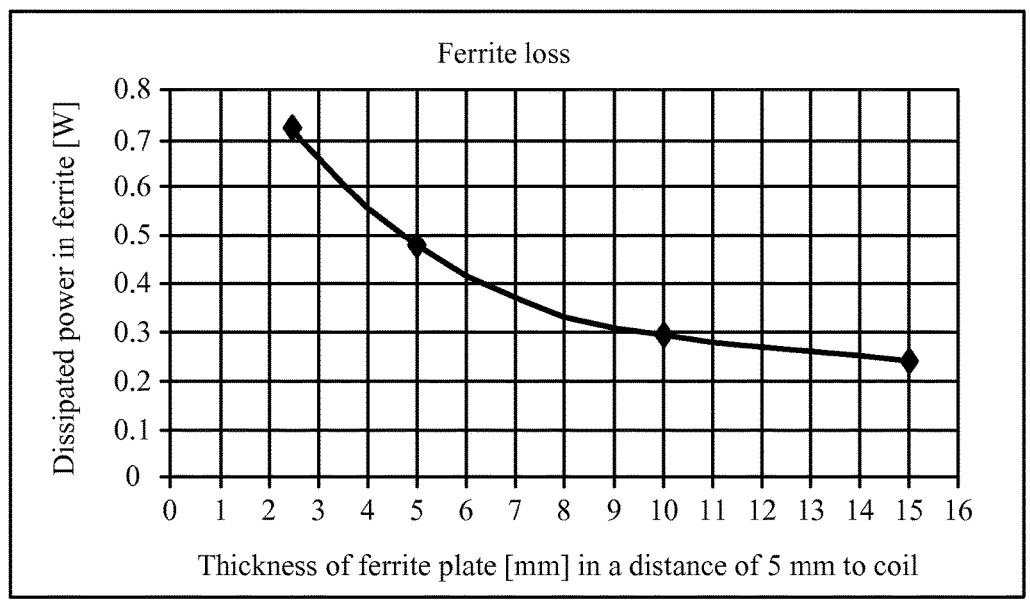
FIG. 13 is a graph illustrating possible ferrite loss values for various thicknesses of a ferrite backing as part of a wireless power antenna.

FIG. 13 is a graph illustrating possible ferrite loss values for various thicknesses of a ferrite backing as part of a wireless power antenna. In the exemplary embodiment for FIG. 12 the ferrite backing is about 0.5 cm from the coil. It can be seen that losses increase rapidly (i.e., about 185%) with a thickness change for the ferrite backing between about 5 mm and 10 mm. The resulting loss may decrease the Q factor. As a result, a trade-off may need to be made between performance relative to considerations such as volume, weight, and cost.

Figure 14:
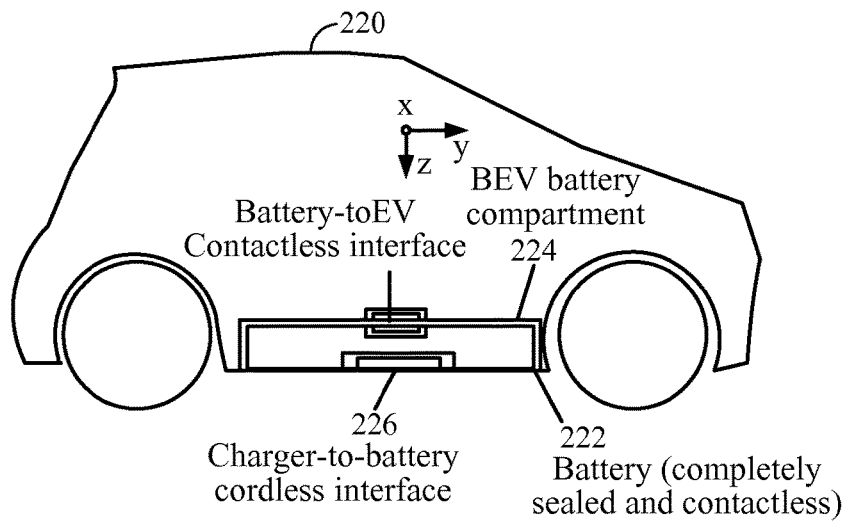
FIG. 14 shows a simplified diagram of a replaceable contactless battery disposed in a battery electric vehicle (BEV).

FIG. 14 shows a simplified diagram of a replaceable battery disposed in a battery electric vehicle (BEV) 220. In this exemplary embodiment, The BEV side of the wireless energy transfer system is an integral part of the vehicles battery unit 222. Present movements towards standardized EV batteries may enable easy and fast replacement in so-called battery swapping (or switching) stations. As shown in FIG. 14, the shape and placement of the battery unit 222 are illustrative of one exemplary embodiment. Many other configurations are possible. As a non-limiting example, the bulk of the battery may be below the rear seat.

However, the low battery position may be useful for a battery unit that integrates a wireless power interface and that can receive power from a charger embedded in the ground. Fast battery replacement will likely continue to coexist with corded and wireless BEV charging and will not totally supersede any alternative charging solution (e.g., wireless charging). In battery swapping stations motorists can get a fully recharged battery perhaps in less than a minute (faster than refueling in a conventional gas stations), while corded and wireless charging will be the solution at home and for opportunistic charging in public and private parking lots to increase vehicles autonomy time.

Due to high capital expenditure issues, deployments of battery swapping stations may be mainly along major transport axis and in larger cities. Another strong argument for a decentralized and in particular for a convenient charging and docking-to-grid solution is the availability of BEVs for vehicle-to-grid use as explained above.

In FIG. 14, the EV replaceable battery unit 222 is accommodated in a specially designed battery compartment 224. The battery unit 222 also provides a wireless power interface 226, which may integrate the entire BEV sided wireless power subsystem comprising the resonant magnetic antenna, power conversion and other control and communications functions needed for efficient and safe wireless energy transfer between a ground embedded charging base (CB) and the Electric Vehicle (EV) battery.

It may be useful for the BEV antenna to be integrated flush with a bottom side of battery unit 222 (vehicle body) so that there are no protrusive parts and so that the specified ground-to-vehicle body clearance can be maintained. This configuration may require some room in the battery unit dedicated to the wireless power subsystem.

In some exemplary embodiments, the CB antenna and the BEV antenna are fixed in position and the antennas are brought within a near-field coupling region by overall placement of the BEV relative to the CB. However, in order to perform energy transfer rapidly, efficiently, and safely, the distance between the charging base antenna and the BEV antenna may need to be reduced to improve magnetic coupling. Thus, in some exemplary embodiments, the CB antenna and the BEV antenna may be deployable moveable to bring them into better alignment.

Also illustrated in FIG. 14 is a battery unit 222 that is completely sealed and that provides contactless power and communications interfaces 226,228. A conceptual block diagram of this exemplary embodiment is illustrated in FIG. 16.

Figure 15A:
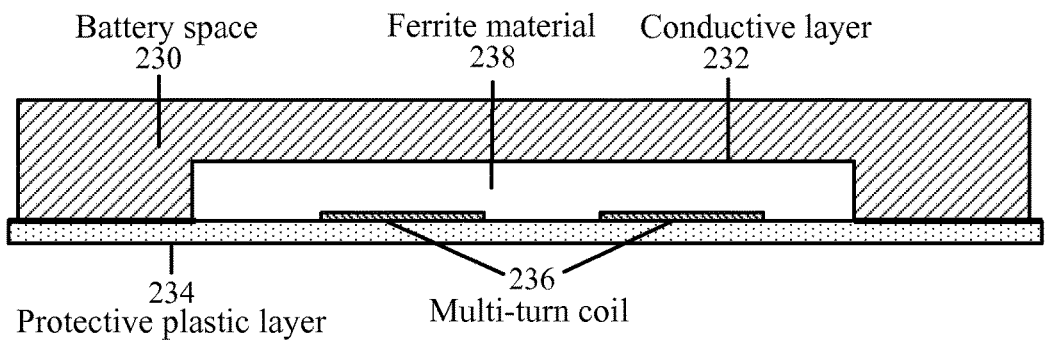
FIGS. 15A and 15B are more detailed diagrams of a wireless power antenna and ferrite material placement relative to a battery.
Figure 15B:
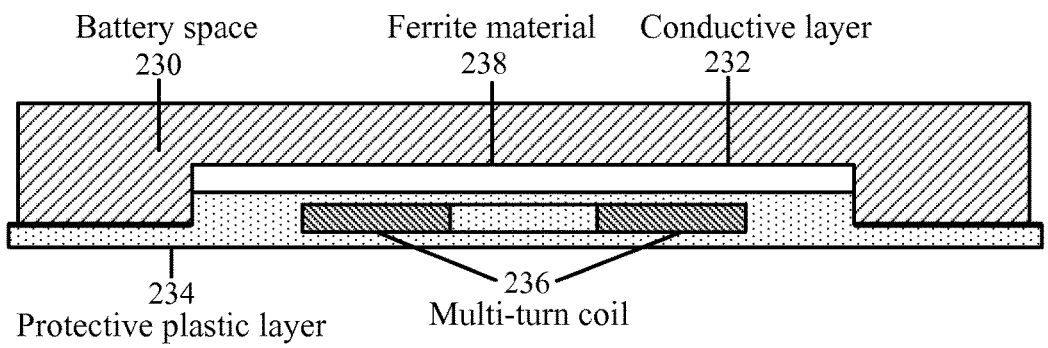

FIGS. 15A and 15B are more detailed diagrams of a loop antenna and ferrite material placement relative to a battery. In these exemplary embodiments, the battery unit includes a non-deployable BEV antenna module as part of the wireless power interface. To prevent magnetic fields from penetrating into the battery unit 230 and into the interior of the vehicle, there may be a conductive shielding 232 (e.g., a copper sheet) between the battery unit and the vehicle. Furthermore, a non-conductive (e.g., plastic) layer 234 to may be used protect the conductive shield 232, the coil 236, and the ferrite material 238 from all sorts of environmental impacts (e.g., mechanical damage, oxidization, etc.).

FIG. 15A shows a fully ferrite embedded antenna coil 236. The coil 236 itself may be made, for example only, of stranded Litz wire. FIG. 15B shows an optimally dimensioned ferrite plate (i.e., ferrite backing) to enhance coupling and to reduce eddy currents (heat dissipation) in the conductive shield 232. The coil may be fully embedded in a non-conducting non-magnetic (e.g. plastic) material 234. There may be a separation between coil and ferrite plate in general, as the result of an optimum trade-off between magnetic coupling and ferrite hysteresis losses.

Figure 16:
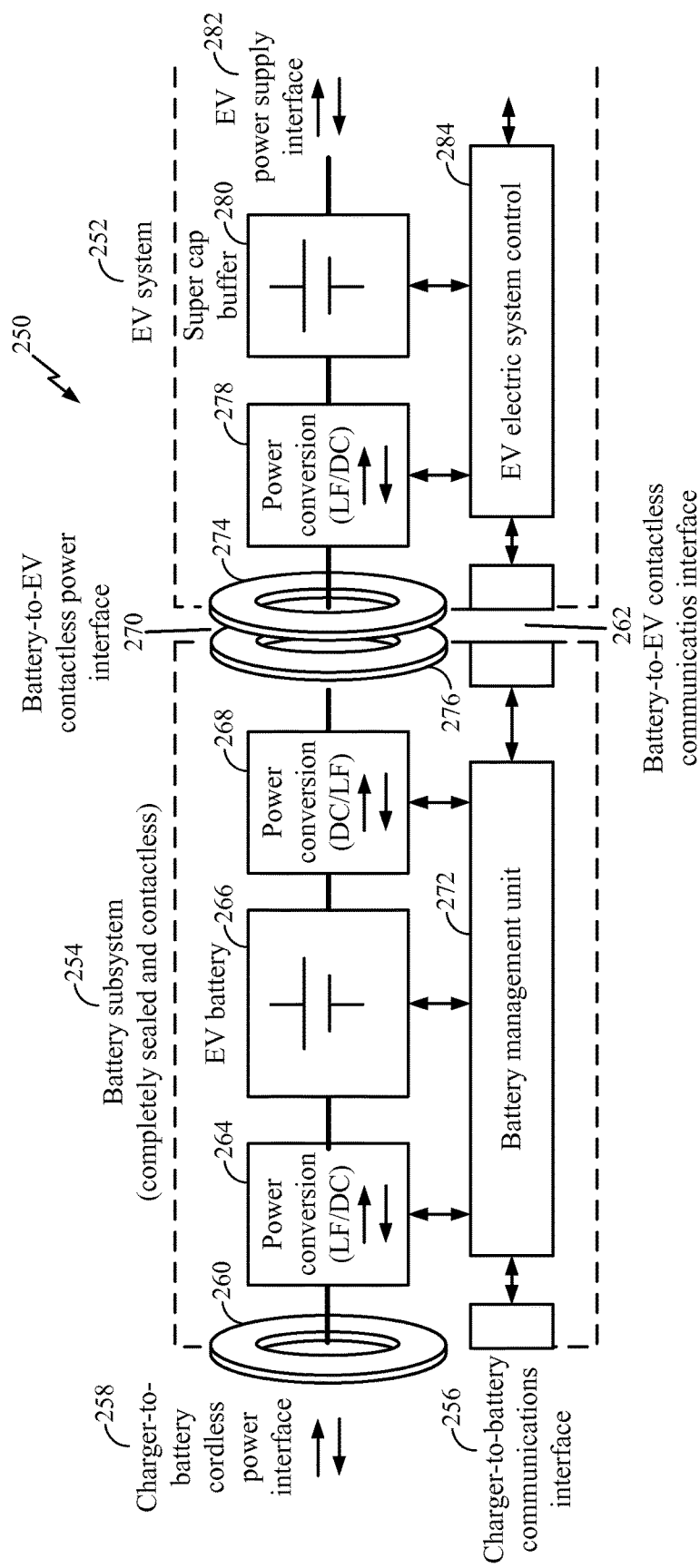
FIG. 16 is a simplified block diagram of portions of a battery system in a BEV equipped to wirelessly receive or transmit power.

FIG. 16 is a simplified block diagram of portions of a battery system 250 in a BEV equipped to receive wireless power. This exemplary embodiment illustrates wireless power interfaces that may be used between an EV system 252, a battery subsystem 254, and the wireless charging interface to a CB (not shown). The battery subsystem 254 provides for both energy transfer and communications with a wireless interface between the EV and the battery subsystem 254, which enables a completely contactless, closed, and sealed battery subsystem 254. The interface may include all the required functionality for bidirectional (two-way) wireless energy transfer, power conversion, control, battery management, and communications.

The charger to battery communication interface 256 and wireless power interface 258 has been explained above and it shall be noted again that FIG. 16 shows a generic concept. In specific embodiments, the wireless power antenna 260 and the communications antenna may be combined to a single antenna. This may also apply to the battery-to-EV wireless interface 262. The power conversion (LF/DC) unit 264 converts wireless power received from the CB to a DC signal to charge the EV battery 266. A power conversion (DC/LF) 268 supplies power from the EV battery 266 to a wireless power interface 270 between the battery subsystem 254 and the EV system 252. A battery management unit 272 may be included to manage EV battery charging, control of the power conversion units (LF/DC and DC/LF), as well as a wireless communication interface.

In the EV system 252, a wireless antenna 274 receives power from antenna 276 and a LF/DC power conversion unit 278 may supply a DC signal to a super capacitor buffer 280. In some exemplary embodiments LF/DC power conversion unit 278 may supply a DC signal directly to the EV power supply interface 282. In other exemplary embodiments, a contactless interface may not be capable of providing the high battery peak current required by the vehicles drive train e.g., during acceleration. To decrease the source resistance and thus the peak power capability of the EVs energy storage system as "seen" at the EV power supply terminals, an additional super capacitor buffer may be employed. An EV electrical system control unit 284 may be included to manage control of the power conversion unit (LF/DC) 278, charging of the super capacitor buffer 280, as well as a wireless communication interface 262 to the EV and the battery subsystem 254. Furthermore, it is noted that V2G capabilities, as described above, may apply to the concepts described with reference to, and illustrated in, FIG. 16.

Wireless power delivery to BEVs may require a significant amount of power. As a result, lower frequencies may be more appropriate for transmission of the higher power. Power conversion electronics may be more available at the lower frequencies of VLF and LF. The following discussions will refer to LF frequencies for clarity and brevity. However, unless other wise noted, the following discussion may also be applicable to VLF or frequencies above LF. In converting DC to LF, a reflected impedance is seen by the transmitter (power converter) and a DC resistance is seen at the DC power supply terminals.

Figure 17A:
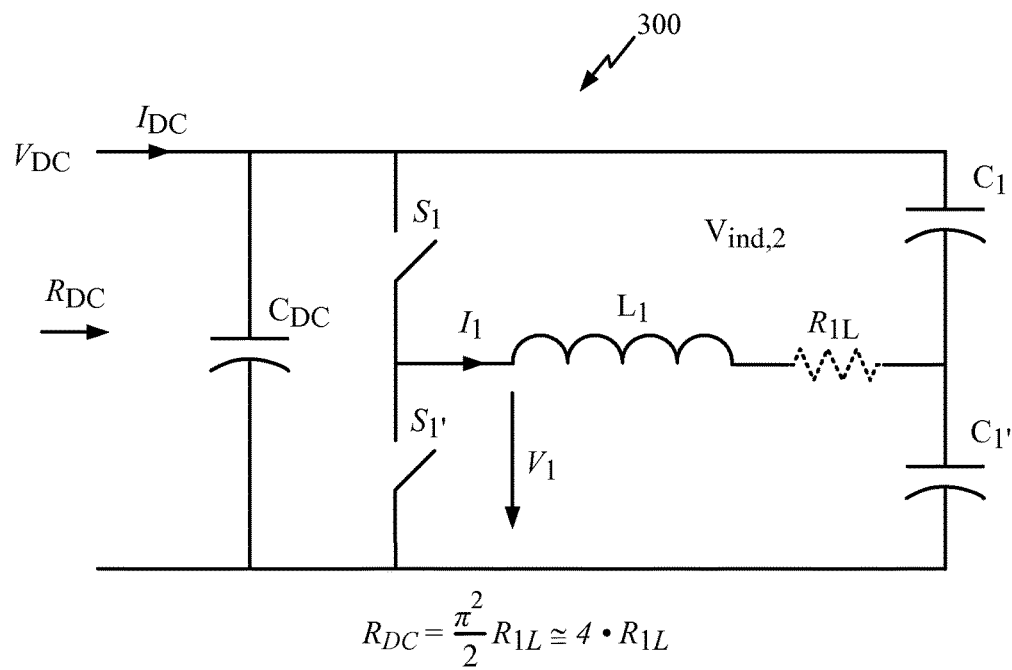
FIGS. 17A and 17B illustrate a simplified circuit diagram and a waveform, respectively, for a power conversion system using a half-bridge series resonant circuit.
Figure 17B:
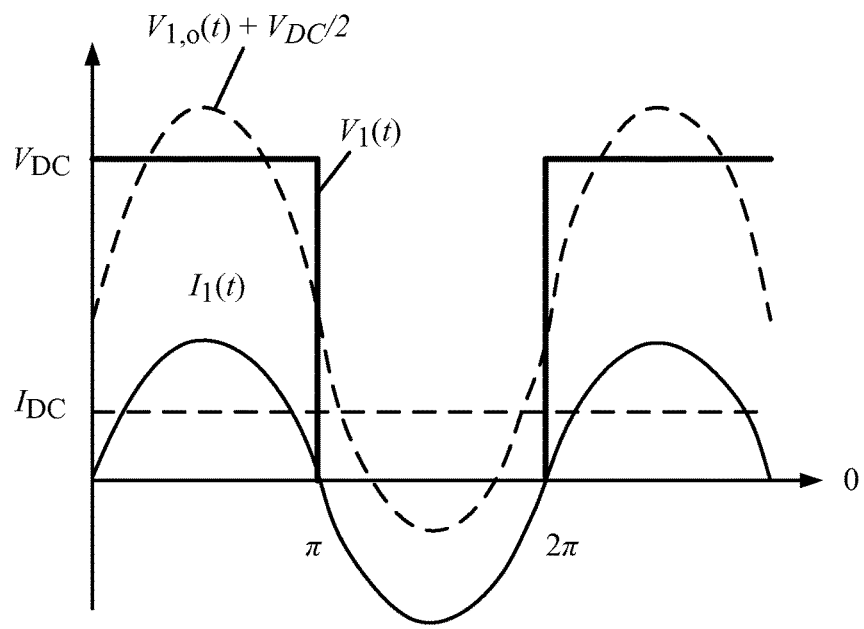

FIGS. 17A and 17B illustrate a simplified circuit diagram and a waveform, respectively, for a power conversion system using a half-bridge series resonant circuit. The half-bridge circuit 300 in FIG. 17A illustrates a transmit power conversion circuit that converts DC power with a voltage $V_{DC}$ and current $I_{DC}$ to LF power at a suitable operating frequency to supply a series resonant antenna circuit ($L_1$, $C_1$) with voltage $V_1$ and current $I_1$, and which presents a load resistance $R_{1L}$ at fundamental frequency. This load resistance represents the real part of the impedance 'reflected' by the power receiver (not shown in FIG. 17A). At its DC input terminals, the half bridge power conversion circuit 300 presents an input resistance $R_{DC}$. Power conversion is performed using two actively controlled solid-state switches $S_1$ and $S_{1'}$ switching at the operating frequency and configured as a half bridge. Capacitor $C_{DC}$ assists in buffering DC input power and stabilizing the input voltage and to block switching frequency signals from propagating into the DC supply. The waveforms in FIG. 17B illustrate the switching voltage $V_1(t)$ that is substantially square wave as well as its DC component and fundamental frequency component $V_{1,0}(t)+V_{DC}/2$. It can be shown that the apparent resistance $R_{DC}$ at DC input of the half bridge power conversion is about four times the resistance $R_{1L}$.

Figure 18A:
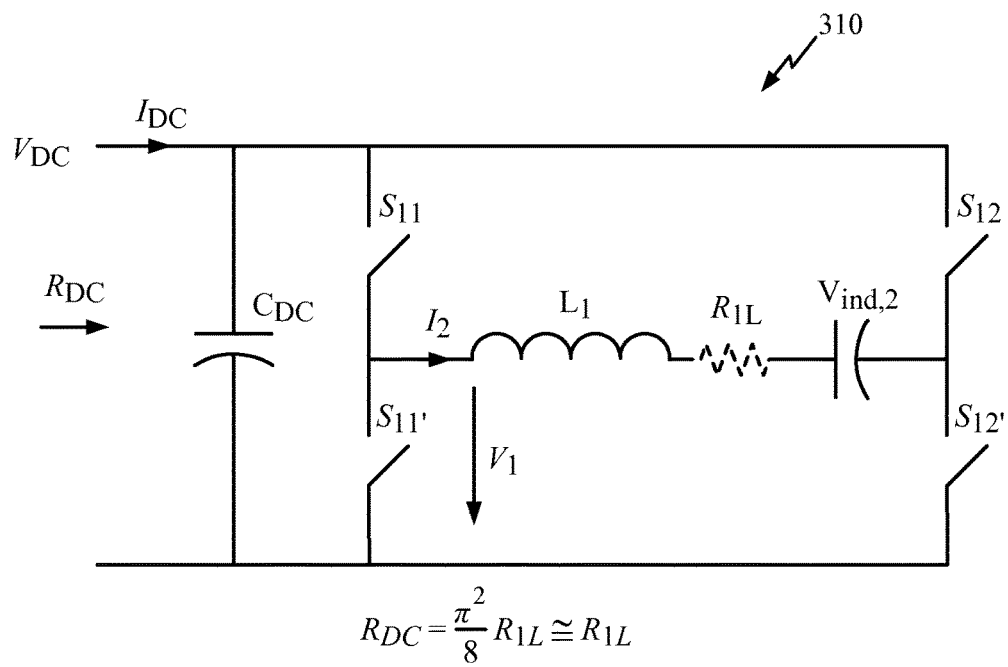
FIGS. 18A and 18B illustrate a simplified circuit diagram and a waveform, respectively, for a power conversion system using a full H-bridge series resonant circuit.
Figure 18B:
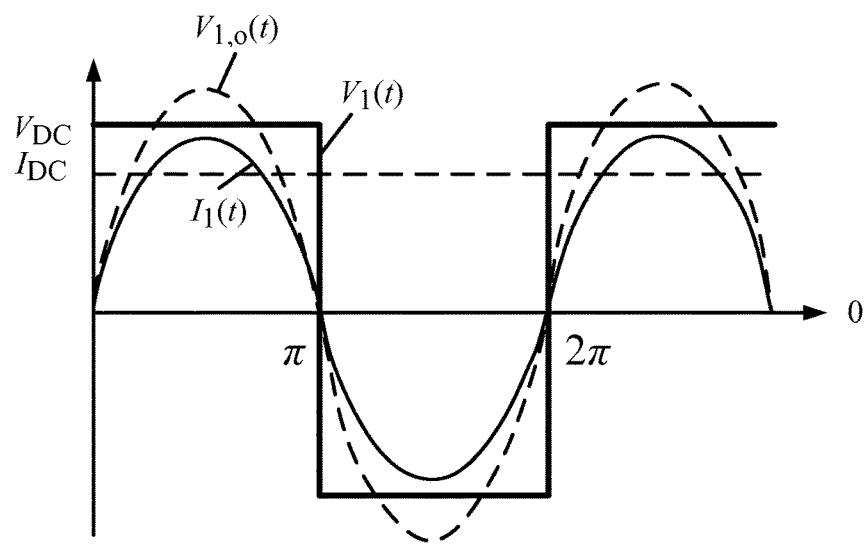

FIGS. 18A and 18B illustrate a simplified circuit diagram and a waveform, respectively, for a power conversion system using a full H-bridge series resonant circuit. The full-bridge circuit 310 in FIG. 18A illustrates a transmit power conversion circuit that converts DC power with a voltage $V_{DC}$ and current $I_{DC}$ to LF power at a suitable operating frequency to supply a series resonant antenna circuit ($L_1$, $C_1$) with voltage $V_1$ and current $I_1$, and which presents a load resistance $R_{1L}$ at fundamental frequency. This load resistance represents the real part of the impedance 'reflected' by the power receiver (not shown in FIG. 17A). At its DC input terminals, the full bridge power conversion circuit presents an input resistance $R_{DC}$. Power conversion is performed using four actively controlled solid-state switches $S_{11}$, $S_{11'}$, $S_{12}$, and $S_{12'}$, configured as a full bridge, all switching at the operating frequency and in appropriate phase. Capacitor $C_{DC}$ assists in buffering DC input power and stabilizing the input voltage and to block switching frequency signals from propagating into the DC supply. The waveforms in FIG. 18B illustrate the switching voltage $V_1(t)$ that is substantially square wave as well as its fundamental frequency component $V_{1,0}(t)$. (There is ideally no DC component). It can be shown that the apparent resistance $R_{DC}$ at DC input of the full bridge power conversion is about equal to the resistance $R_{1L}$.

Figure 19:
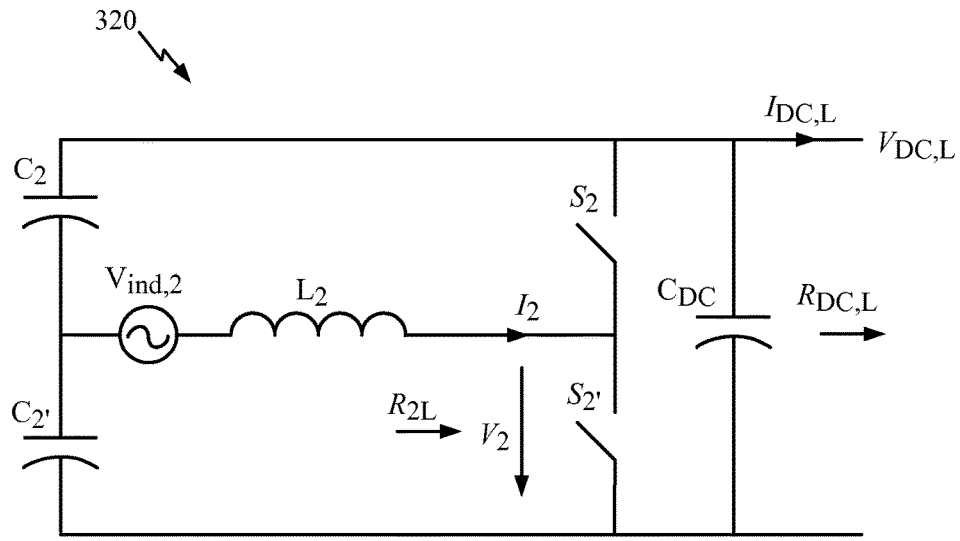
FIG. 19 is a simplified circuit diagram for a power conversion system to illustrate adaptation for both receivers and transmitters in a wireless power system.

FIG. 19 is a simplified circuit diagram for a power conversion system to illustrate reciprocal operation of the transmit power conversion as a receive power conversion that acts as a half bridge rectifier. The half-bridge rectifier circuit 320 in FIG. 19 illustrates a receive power conversion circuit for generating a DC power with a voltage $V_{DC,L}$ and DC current $U_{DC,L}$ when connected to a load resistance $R_{DC,L}$. The two solid-state switches $S_2$ and $S_{2'}$ are synchronously switching with the frequency and in phase of the power received by series resonant antenna circuit ($L_2$, $C_2$) with a voltage $V_2$ and current $I_2$. The voltage source with voltage $V_{ind,2}$ represents the voltage induced by the transmitter. In some exemplary embodiments, the solid-state switches may be actively controlled, whereas in other exemplary embodiments, they may simply be diodes. Capacitor $C_{DC}$ assists in the filtering and buffering of the rectified LF power. It can be shown that for a half bridge topology, the apparent load resistance $R_{2L}$ as seen by the receive resonant antenna at fundamental frequency is about four times lower than the DC load resistance $R_{DC,L}$ connected to the DC output of the receive power conversion. As noted on FIG. 19, an exemplary embodiment may also include a full H bridge topology (not shown) and would have an impedance transformation ratio $R_{2L}$-to-$R_{DC,L}$ of about one-to-one.

Figure 20:
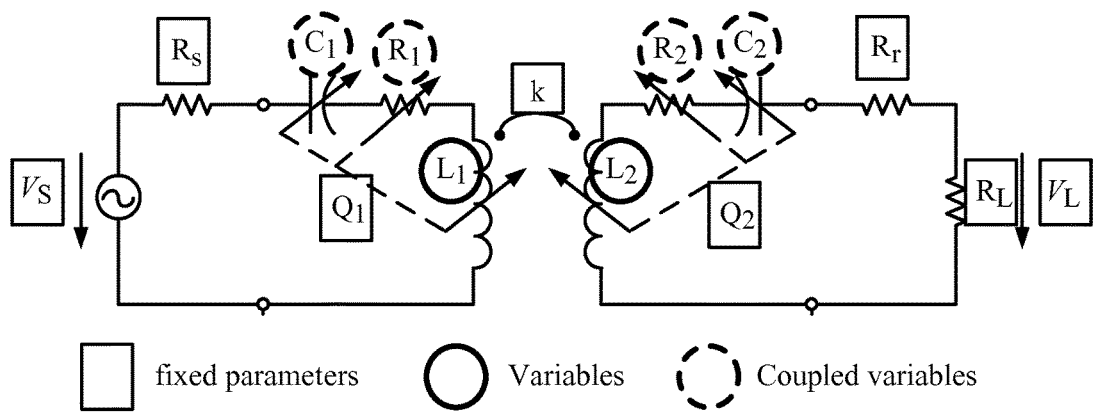
FIG. 20 is an equivalent circuit diagram of a wireless power system illustrating some parameters that may be varied in development of an efficient wireless power system.

FIG. 20 is a simplified equivalent circuit of a wireless power system illustrating some parameters that may be varied in development of an efficient wireless power system. In general, on the transmit side, the LF power source providing the LF signal at voltage $V_S$ and its equivalent source impedance $R_S$ are substantially fixed (given). These source impedance may represent any losses produced in transmit power conversion circuit elements and any matching or filtering circuitry prior to the resonant transmit antenna. In general, on the receive side, the load resistance $R_L$ and voltage $V_L$, as well as the series resistance $R_r$ are substantially fixed (given). The series resistance $R_r$ may represent any losses produced in receive power conversion circuit elements and any matching or filtering circuitry post to the resonant receive antenna. Similarly for a given spatial relationship between the transmit and receive antennas, the unloaded Q-factor of the transmit antenna coil $Q_1$ and the unloaded Q-factor of the receive antenna coil $Q_2$, as well as the coupling factor (k) therebetween can be considered as fixed (given) and the other circuit elements are adapted to optimize power transfer based on given $Q_1$, $Q_2$, and the coupling factor (k).

A sensible approach to this design problem first specifies the required source and load voltages (in particular the required voltage transfer ratio $\Gamma_{V,e}$) and target Q-factors $Q_1$ and $Q_2$ for the antenna/coils. Optimization is then performed by varying antenna inductances $L_1$ and $L_2$, series resonant loss resistance $R_1$ and $R_2$, series resonant capacitors $C_1$ and $C_2$, and combinations thereof for maximum transfer efficiency while maintaining specified antenna unloaded Q-factors $Q_1$ and $Q_2$.

This approach assumes that antenna coils can be designed for any desired inductance under a specified Q-factor constraint. Coil design practice indicates that the Q-factor is mainly determined by the specified volume/form factor constraints rather than by inductance. Thus a Q-factor constraint is eventually a volume/form factor constraint.

If an optimum inductance was found beyond the available range defined by the specified volume/form factor constraints, then specific antenna matching circuitry would become necessary. In a strongly coupled regime, such specific matching is normally not required as realistic inductances will result. However, moderately or weakly coupled regimes typically requiring special provisions for antenna matching.

To find optimum values for the variables $L_1$ and $L_2$ a system of two independent equations may be used. One equation results from the specified voltage transfer ratio, another one from the optimum load resistance.

Using the definitions of the total Q-factor:

$$Q_{1,tot} \cong \frac{Q_1 \omega_0 L_{1,opt}}{\omega_0 L_{1,opt} + Q_1 R_S}$$

the equation for the ratio $\Gamma_{V,e}$ may be expressed as:

$$|\Gamma_{V,e}| = \sqrt{\frac{L_{2,opt}}{L_{1,opt}}} \cdot \frac{kQ_{1,tot}}{1+\sqrt{1+k^2 Q_{1,tot} Q_{2,tot}}}$$

and the optimum load resistance $R_{L,opt}$ may be expressed as:

$$R_L = \frac{\omega_0 L_{2,opt}}{Q_2} \cdot \sqrt{1+k^2 Q_{1,tot} Q_{2,tot}}$$

Except for a strongly coupled symmetric magnetic resonant link ($L_1=L_2$), there may be no simple analytical solution for $L_{1,opt}$ and $L_{2,opt}$ neither for the general case nor for a strongly coupled regime. As a result, a numerical approach or network simulation supporting optimization may be a better way to find solutions.

For the strongly coupled symmetric link, we simply obtain:

$$L_{1,opt} = L_{2,opt} = L_{opt} \cong \frac{R_L}{k\omega_0} \text{ for}$$

$$Q_1 = Q_2 = Q, R_S = R_r = R'$$

In the symmetric case however, the voltage transfer ratio is determined by the network symmetry and becomes:

$$|\Gamma_{V,e}| \cong \frac{kQ_{tot}}{1+kQ_{tot}} \cong \sqrt{\eta_{M,e,max}}$$

where:

$$Q_{tot} \cong \frac{Q\omega_0 L_{opt}}{\omega_0 L_{opt} + QR_S}$$

and: $\eta_{M,e,max}$ is the maximum achievable end-to-end efficiency.

Figure 21:
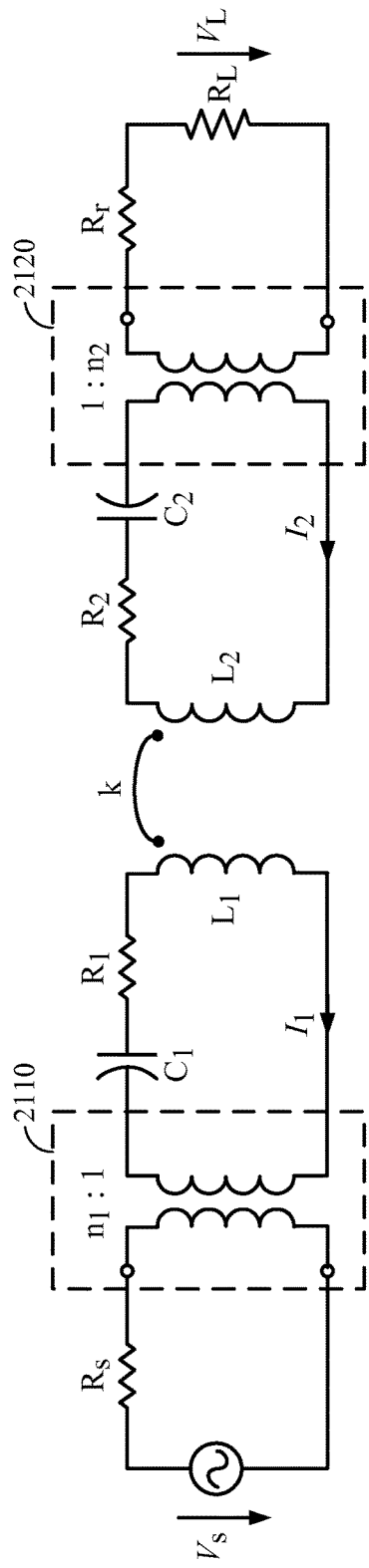
FIG. 21 illustrates an equivalent circuit diagram that may be useful to model various parameters of a wireless power system.

FIG. 21 illustrates an equivalent circuit that may be useful to model various parameters of a wireless power system. If optimum inductance is unrealizable at a specified Q (e.g., due to voltage or current constraints), a specific matching circuit may be needed, which is normally the case in a moderately or weakly coupled regime or for particular values of $R_L$. As shown in FIG. 21, a matching circuit can be represented using ideal transformers (2110 on the transmit side and 2120 on the receive side). Such transformation can be accomplished in many different ways, such as, for example, using shunt capacitance to source and/or load, parallel resonance, inductive coupling loops, etc.

Many elements must be considered in maximizing overall transfer efficiency in a magnetic resonant link. Optimum matching may be generally determined by the required overall voltage transfer ratio, and the magnetic links internal and external losses (e.g., due to power conversion). In strongly coupled regimes, matching can normally be achieved by choosing a pair of optimum antenna inductance (or L-C ratio) at a specified Q factor. Matching by L-C ratio, if possible, may be preferable as this method is simplest and does not introduce additional (lossy) and expensive components. In addition, the circuitry for transmit and/or receive power conversion may be used to perform impedance transformation to adapt apparent source resistance and/or load resistance to the optimum value. However this may add extra losses, which may unfavorably alter the ratio $R_r$ to $R_L$. As a result, such methods may best be used when coupling is variable or the load resistance changes dynamically and considerably.

Figure 22:
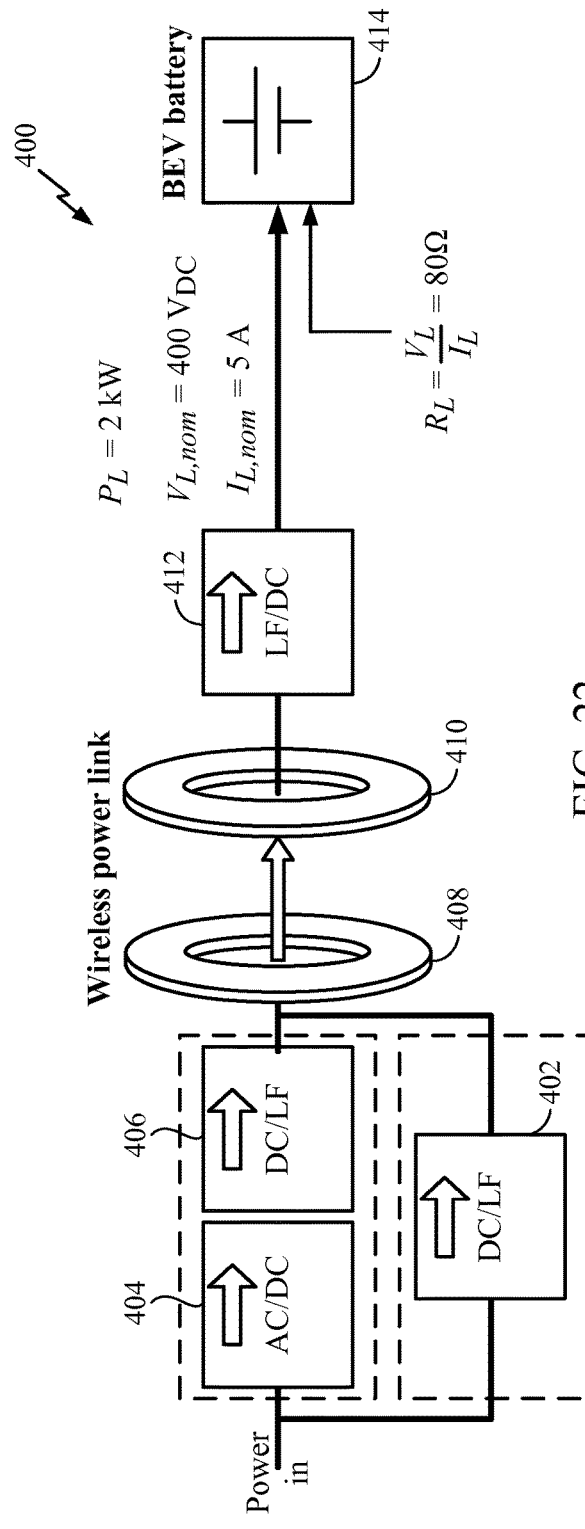
FIG. 22 is a simplified block diagram of a wireless power system for a BEV illustrating some basic components of the system.

FIG. 22 is a simplified block diagram of a wireless power system 400 for a BEV illustrating some basic components of the system. It should be noted that throughout this description, AC supply voltages may be referred to with the European standards of about 230 volts AC at about 50 Hz. However, supply voltages may be DC, and other AC formats such as the United States standards of 110 volts AC at 60 Hz and 220 volts AC at 60 Hz. The following descriptions will refer to LF frequencies for clarity and brevity. However, unless otherwise noted, the following discussion may also be applicable to VLF or frequencies above LF.

If the power input signal is DC, the DC/LF converter 402 changes the intermediate DC voltage to a frequency in the LF range for driving the transmit antenna of the wireless power link.

If the power input signal is AC, the AC/DC converter 404 changes the AC supply voltage to an intermediate DC voltage and a DC/LF converter 406 changes the intermediate DC voltage to a frequency in the LF range for driving the transmit antenna of the wireless power link. A receive antenna 410 couples with the transmit antenna 408 when it is in the coupling-mode region of the transmit antenna and resonates at substantially the same frequency as the transmit antenna. A LF/DC converter 412 changes the LF signal from the receive antenna 410 to a DC signal for charging the BEV battery 414. At some exemplary embodiment parameters for the LF/DC converter 412, the power available ($P_{L,nom}$) may be about 2 kW, the voltage available ($V_{L,nom}$) may be about 400 $V_{DC}$, and the current available ($I_{L,nom}$) may be about 5 amps. The impedance seen by the LF/DC converter 412 in this case may be about 80Ω.

Figure 23:
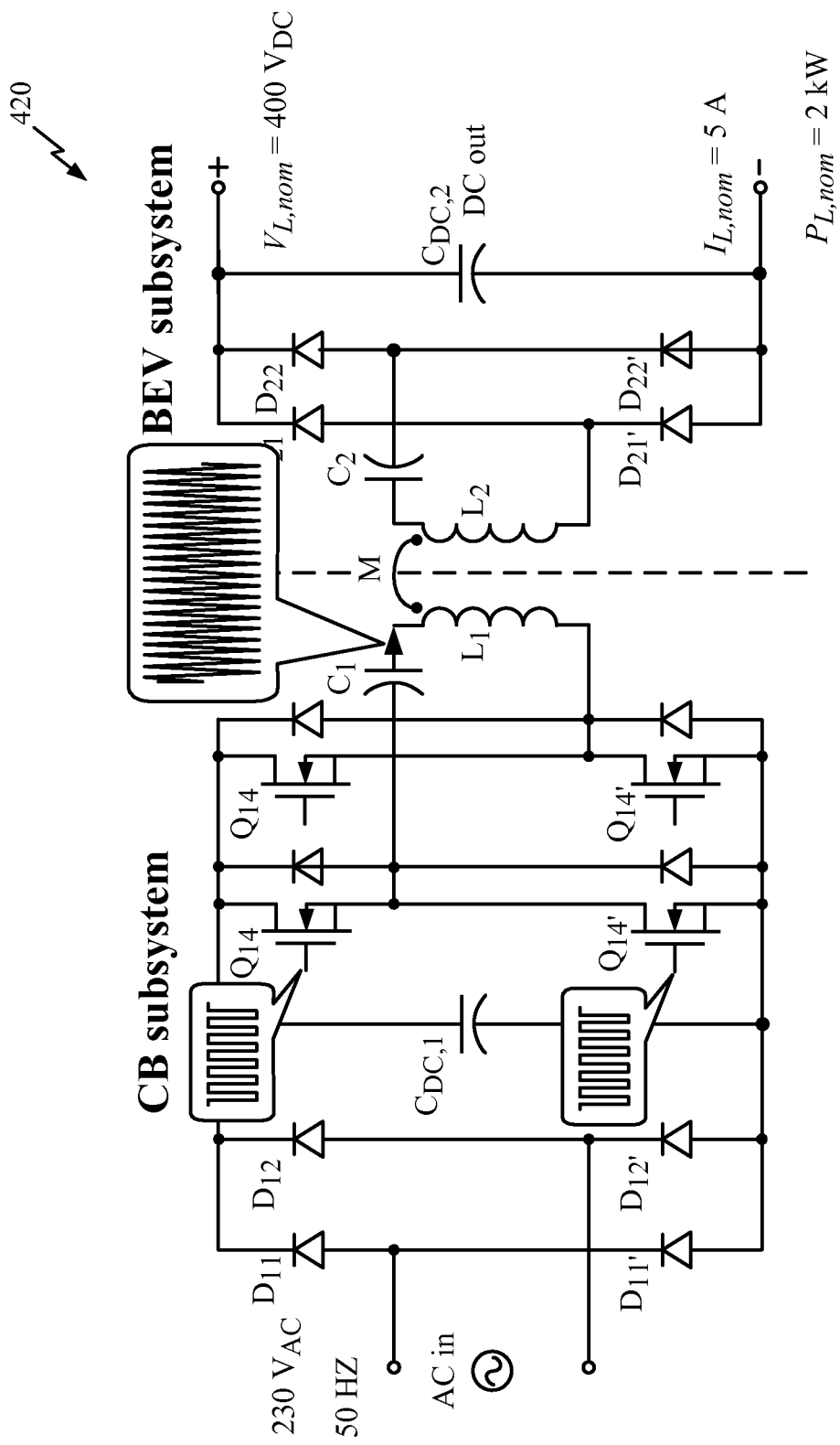
FIG. 23 is a simplified circuit diagram of a wireless power system for a BEV illustrating some possible circuits and waveforms for generating wireless power signals.

FIG. 23 is a simplified circuit diagram of a wireless power system 420 for a BEV illustrating some possible circuits and waveforms for generating wireless power signals. In the exemplary embodiment of FIG. 23, diodes $D_{11}$, $D_{11'}$, $D_{12}$, and $D_{12'}$ along with capacitor $C_{DC,1}$ form the AC/DC conversion to the intermediate DC voltage on the transmit side. Transistors $Q_{14}$, $Q_{14'}$, $Q_{24}$, and $Q_{24'}$ create the DC/LF conversion using a pulse-width-modulation (PWM) approach to control switching of the transistors. Capacitor $C_1$ and inductance $L_1$ represent the series resonant transmit antenna. In the exemplary embodiment of FIG. 23, the PWM control may be set at about a 50% duty cycle to ensure that there is switching only when resonant antenna current $I_1(t)$ passes zero. A receive antenna $L_2$ couples with the transmit antenna $L_1$ when it is in the coupling-mode region of the transmit antenna providing a mutual inductance M and resonates at substantially the same frequency as the transmit antenna. On the receive side, diodes $D_{21}$, $D_{21'}$, $D_{22}$, and $D_{22'}$ along with capacitor $C_{DC,2}$ form the LF/DC converter and rectify the LF signal from the receive antenna to create the DC voltage, and current, power, when loaded by a corresponding DC resistance as shown in FIG. 22.

Of course, power control may also be needed if different BEV classes with different charging power requirements have to be supported by the same charging base. Moreover, power control may be useful for reasons, such as, for example, to regulate charging current, to ramp up and ramp down power smoothly, and to operate the system in a low power mode for antenna alignment, to emit a low power (beacon) signal that can be used to guide BEVs to a charging spot (guidance system), and/or to align the wireless power antennas of the charging base and/or the BEV, and other tuning and testing purposes.

Figure 24:
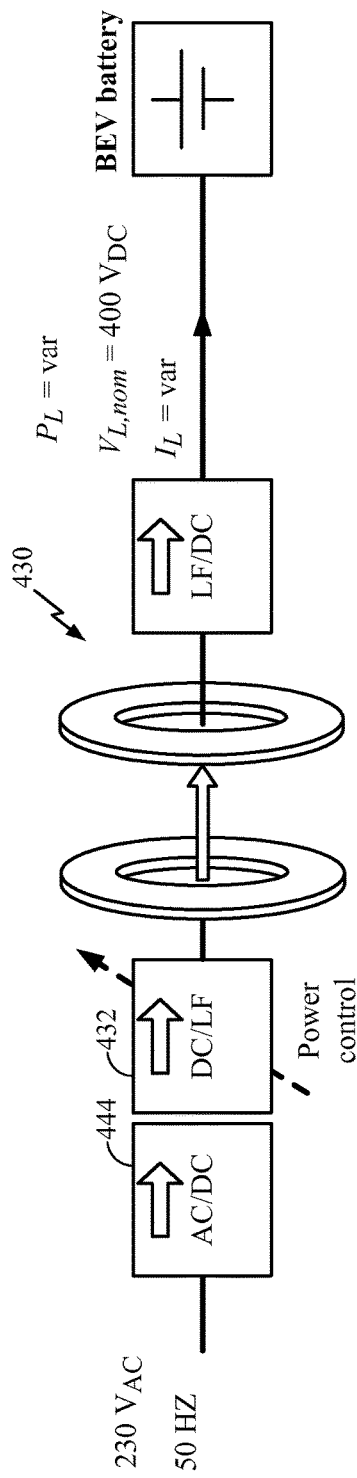
FIG. 24 is a simplified block diagram of a wireless power system for a BEV illustrating a variable power control block for converting direct current DC to a suitable wireless power frequency.

FIG. 24 is a simplified block diagram of a wireless power system 430 for a BEV illustrating a variable power control block for converting DC power to wireless power at a suitable frequency. The elements in FIG. 24 are similar to the elements in FIG. 22 except that the DC/LF converter 432 on the transmit side is now variable to accomplish power control.

Figure 25A:
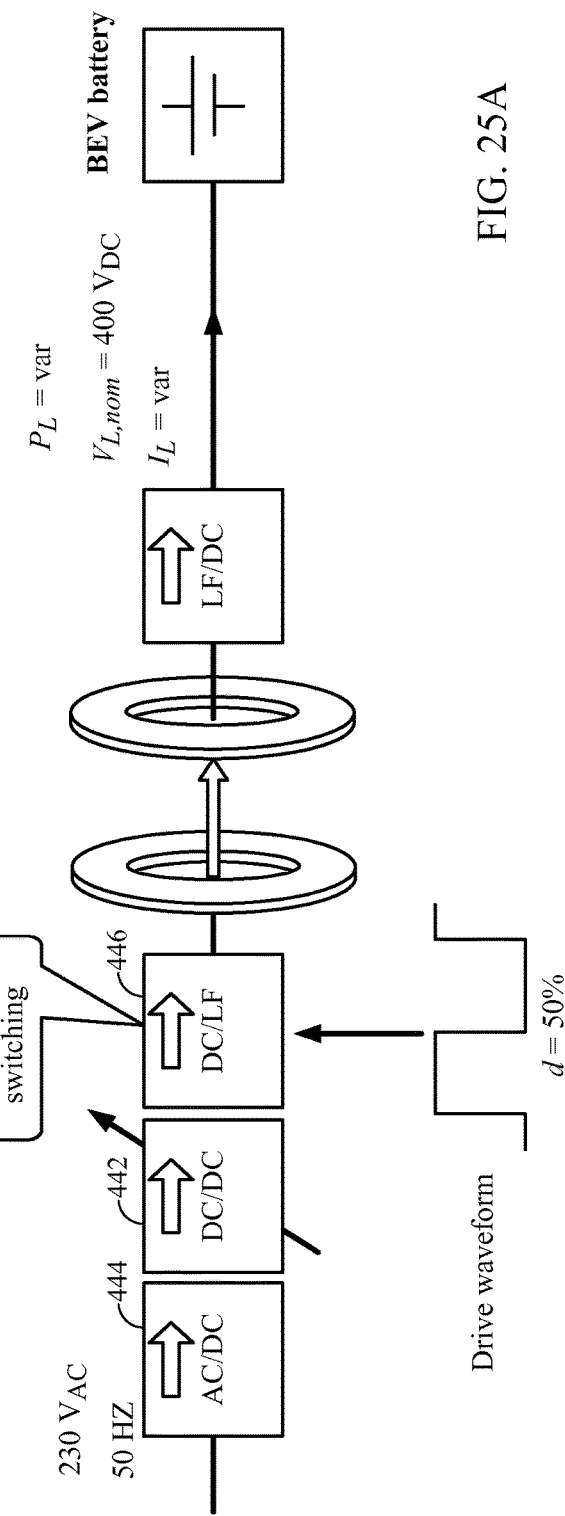
FIGS. 25A-25G are simplified block diagrams of a wireless power system for a BEV illustrating various exemplary embodiments of the variable power control block of FIG. 24.

FIGS. 25A-25G are simplified block diagrams of a wireless power system for a BEV illustrating various exemplary embodiments of the variable power control block of FIG. 24. In FIG. 25A, an additional DC/DC converter 442 (also referred to herein as a DC-to-DC converter) is placed between the AC/DC converter 444 (also referred to herein as a AC-to-DC converter) and the DC/LF converter 446 (also referred to herein as a DC-to-LF converter). As non-limiting examples, this DC/DC converter 442 may be a buck converter or a boost converter for modifying the voltage level of the intermediate DC supply of the DC/LF converter 446. Also shown is that the DC/LF converter 446 is driven at a 50% duty cycle to ensure zero current switching as explained above with reference to FIG. 23.

Figure 25B:
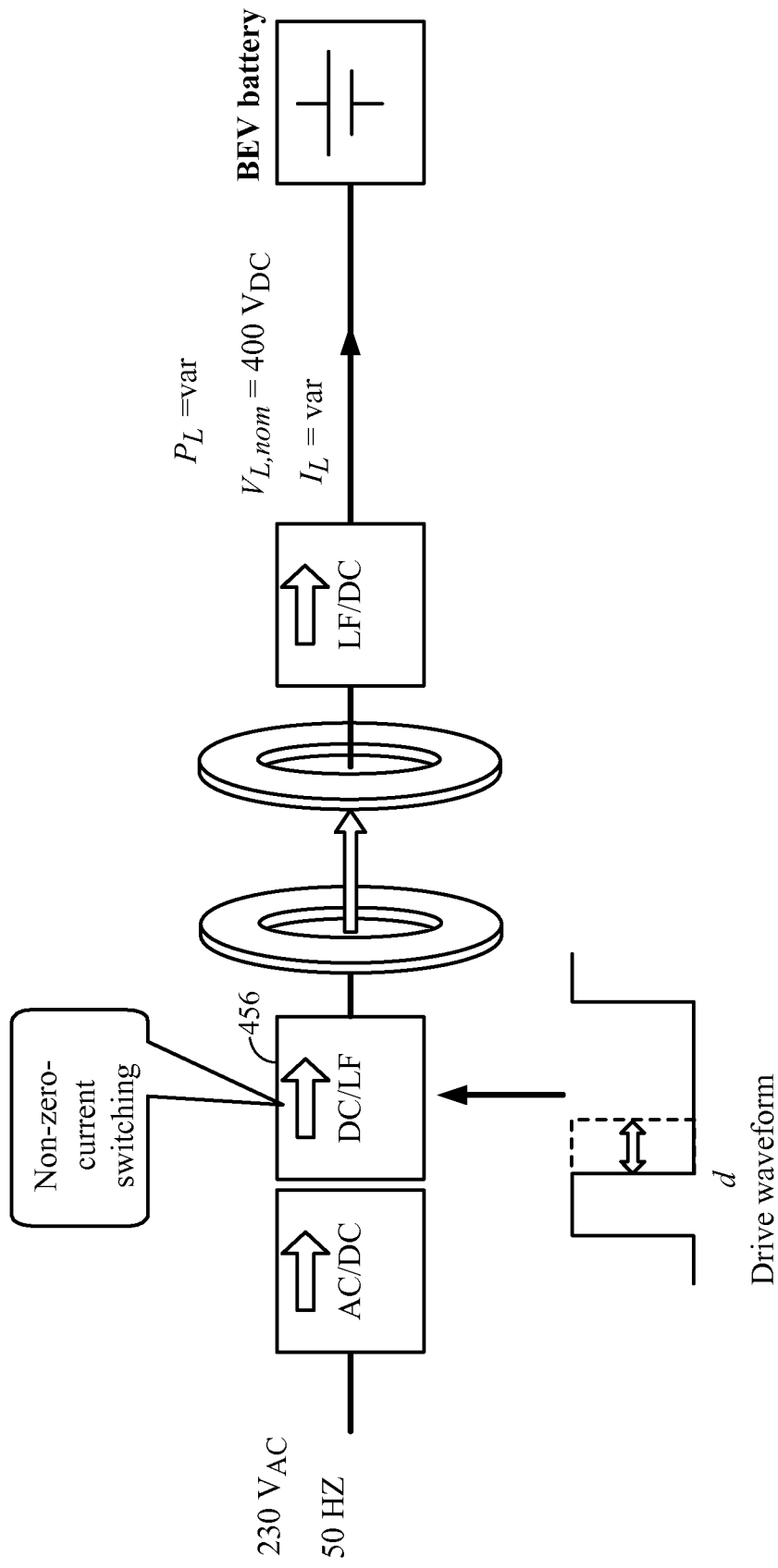

In FIG. 25B, the DC/LF converter 456 is modified from a 50% duty cycle to a lower or higher duty cycle to adjust the amount of power delivered to the transmit antenna. A duty cycle other than 50% may compromise overall efficiency somewhat, because zero current switching cannot be maintained, but it is a simple means for adjusting power levels without using additional circuitry.

Figure 25C:
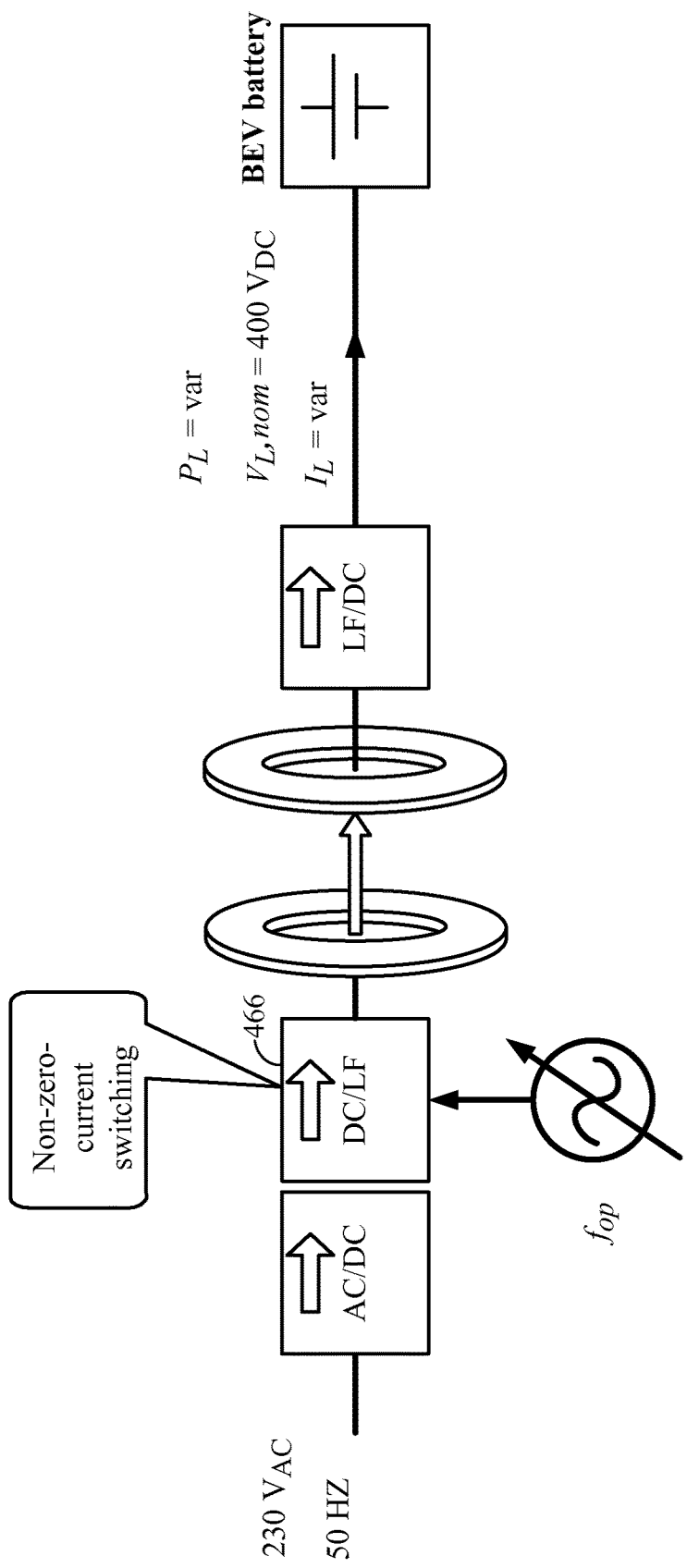

In FIG. 25C, the operating frequency is offset from resonance by changing the frequency of the PWM control signal in the DC/LF converter 466 relative to the resonant frequency of the transmit and receive antenna. This offsetting of the PWM frequency relative to the resonant frequency will reduce the amount of transmitted power, but will also reduce link efficiency as zero-current switching cannot be maintained in an off-resonance mode.

Figure 25D:
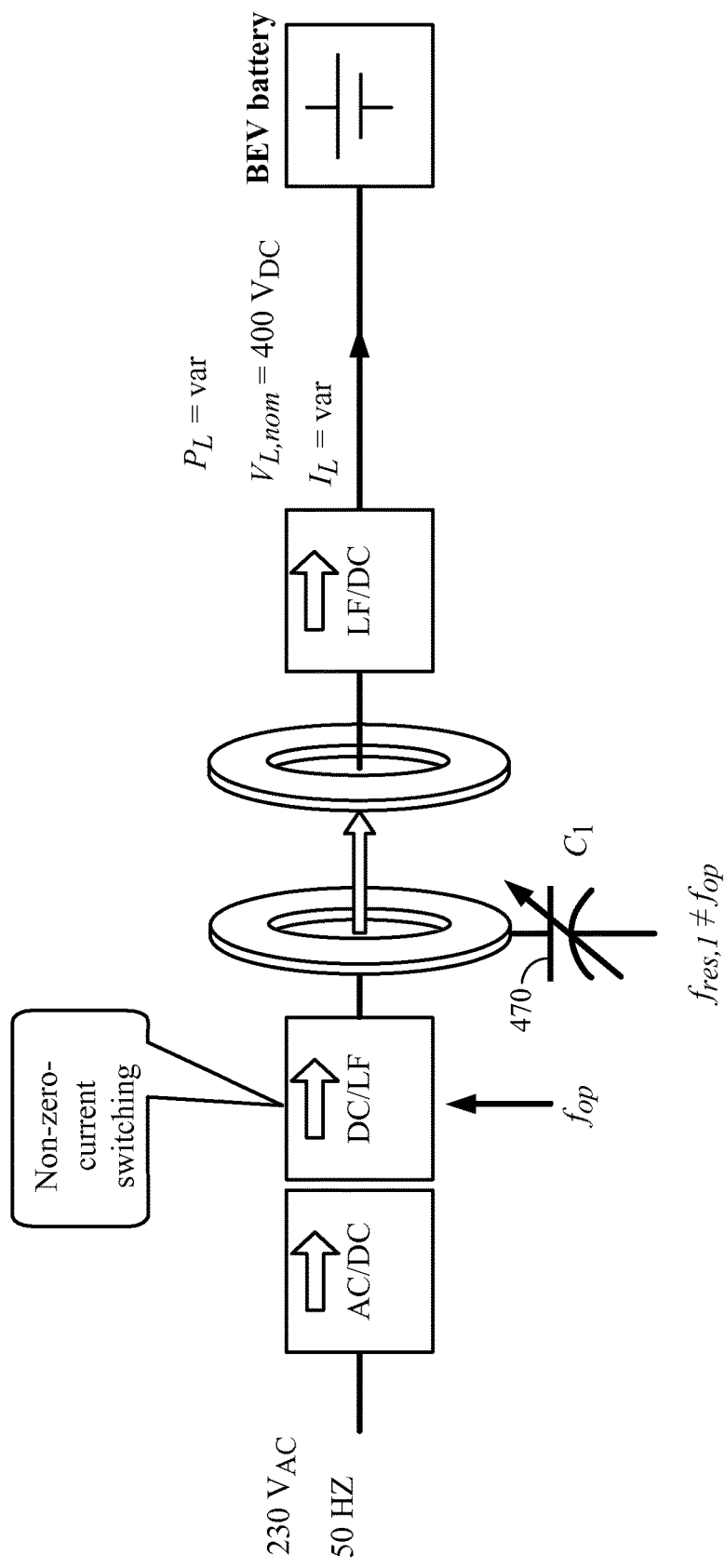

In FIG. 25D, the resonant frequency of the antenna is detuned by adding variable capacitance to the resonant transmit antenna circuit, which will reduce the amount of power transferred between the transmit antenna and the receive antenna. As non-limiting examples, tuning may be accomplished using a capacitor bank 470 with active switching components (as shown below with reference to FIG. 53) or by switch-controlled capacitance/inductance techniques.

Figure 25E:
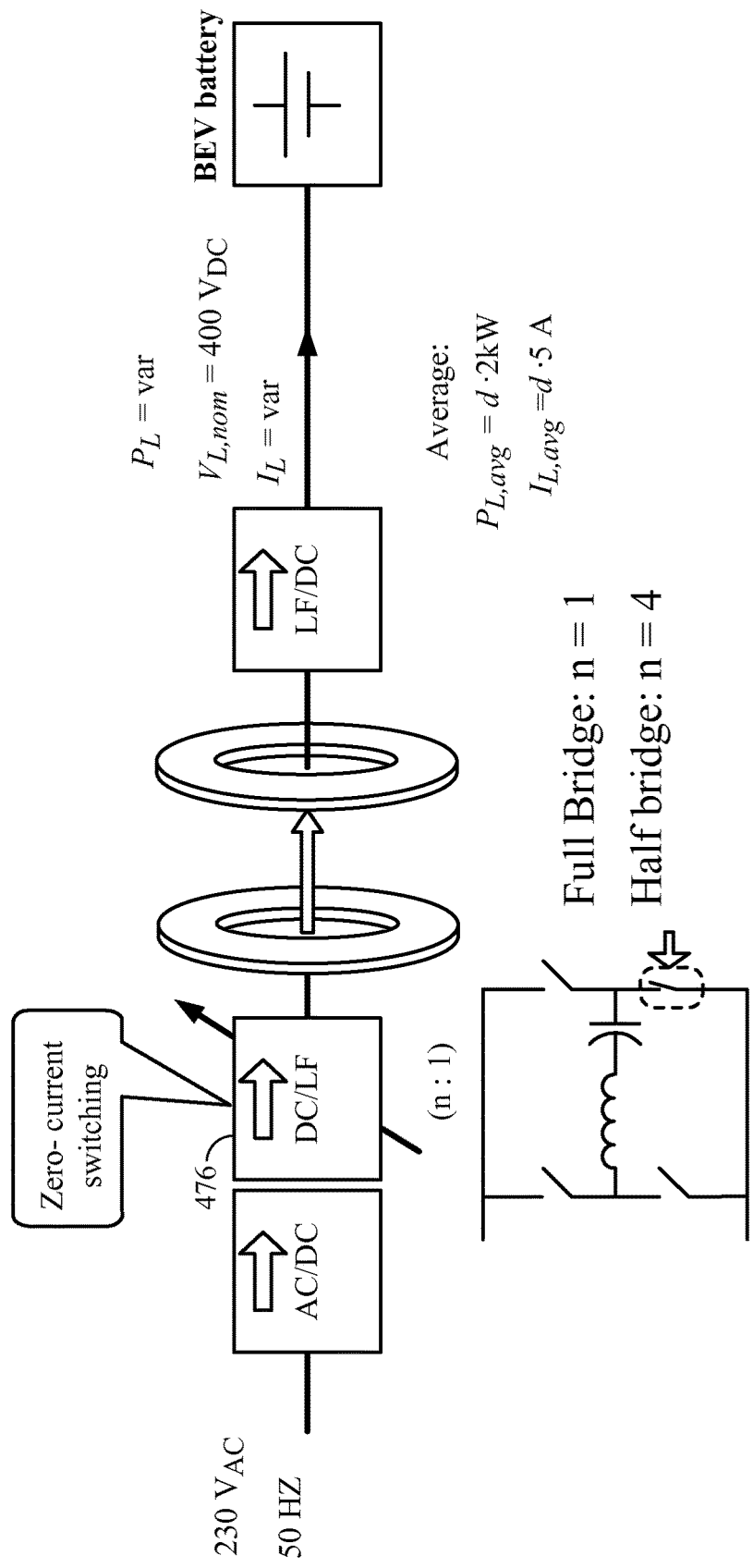

In FIG. 25E, the DC/LF converter 476 topology is reconfigured from a full-bridge rectifier to a half-bridge rectifier when power has to be reduced or vice versa when maximum power needs to be restored. This method comes almost for free as it does not require additional circuitry and can be accomplished solely by changing the PWM driving waveforms. This method however only allows for a two level (coarse) power control.

Figure 25F:
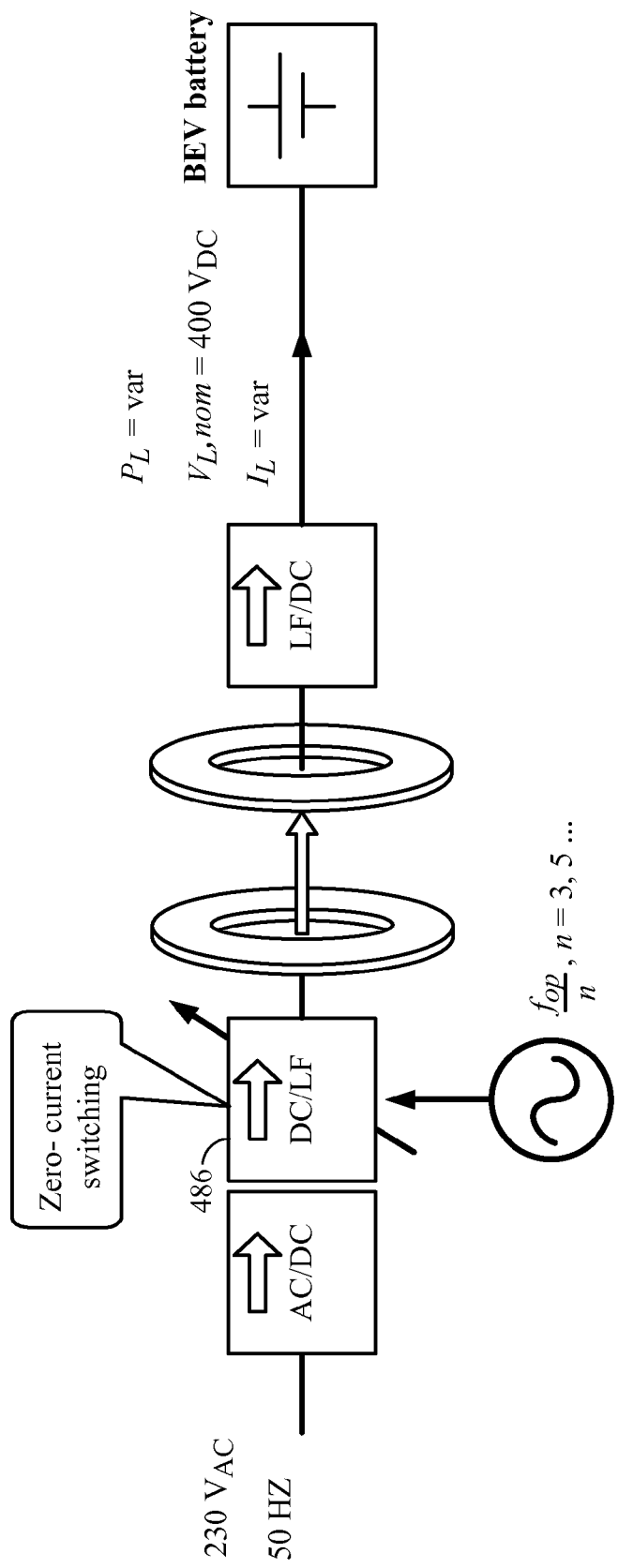

In FIG. 25F, the DC/LF converter 486 excites the resonant transmit antenna with one of the harmonic components of its drive waveform. In other words, the DC/LF converter 486 operates at a subharmonic frequency of the actual transmission frequency. This method allows power to be changed in a number of levels according to the levels contained in a harmonics series.

Figure 25G:
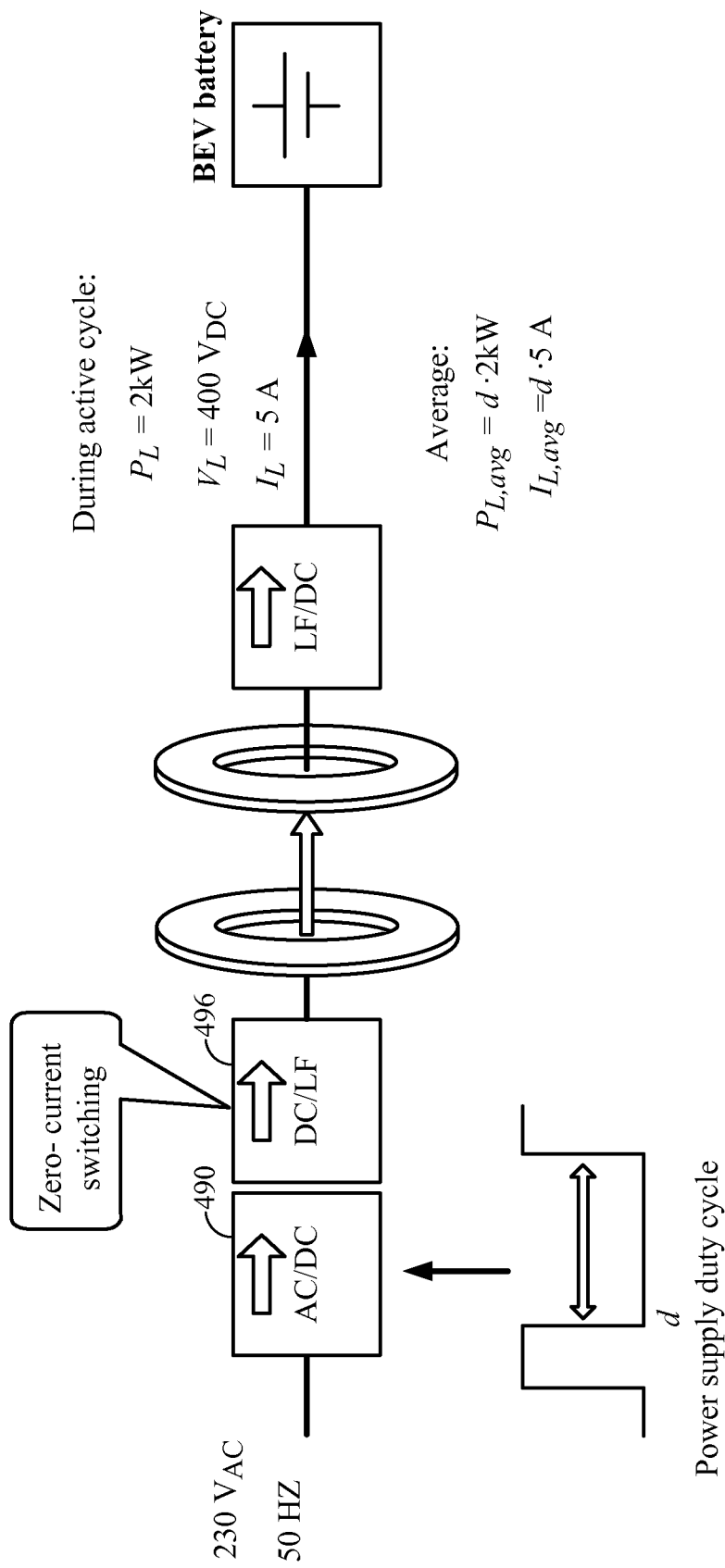

In FIG. 25G, the AC/DC converter 490 providing DC supply power to the DC/LF converter 496 may be intermittently operated with a duty cycle adjusted to the average power (battery charge current) demand. This average power control method in conjunction with battery charging is also known as pulse charging.

Of course, any of the embodiments described in FIGS. 25A-25G may be used in combination to form additional means for power control and creating means for both coarse and fine adjustments.

FIG. 26 is a simplified block diagram of a wireless power system 500 for a BEV illustrating that the means and methods for variable power control shown in FIGS. 24-25G may also be applicable to load adaptation in the BEV. Load adaptation is needed to maintain the load resistance as seen by the wireless power link and in particular by the resonant receive antenna at an optimum value to operate the link efficiently. This load resistance may change e.g. if battery charging current is reduced and may be a direct consequence of transmit side power control. The variable LF/DC converter 502 on the receive side may be configured in a manner similar to those described above in FIGS. 25A-25G except that these means are used to regulate (transform) the load impedance as seen by the receive antenna, rather than to control power. Transmit side power control and receive side load adaptation may be considered as transformers whose transformation ratios ($n_{TX}$:1) and (1:$n_{RX}$), respectively, are adjustable. This contemplation shows their relationship. For example, if $n_{TX}$ is increased to reduce power then $n_{RX}$ may have to be increased by the same amount to readapt to the load. (Note that the load voltage $V_L$ may be substantially constant, independently on $n_{RX}$, since the load is a battery that is substantially a voltage source. Therefore power control and corresponding load adaptation cannot be simply explained as a mean to maintain a constant output voltage, thus not trivial.)

FIG. 27 is a simplified block diagram of a wireless power system 520 for a BEV illustrating a communication channel between the BEV and the charging base (CB) that may be present in some embodiments of the invention. The communication channel was explained earlier. In the context of power control, the BEV communication unit, or other units in the BEV side, may sense values of voltage and current to the BEV battery and provide feedback through the BEV communication unit to the CB communication unit. Based on the values sensed, both the variable DC/LF converter in the transmit (CB) side and the variable LF/DC converter in the receive (BEV) side may adjust transformation ratios by any of the means discussed above to optimize power transfer or otherwise adjust power transfer.

Figure 28:
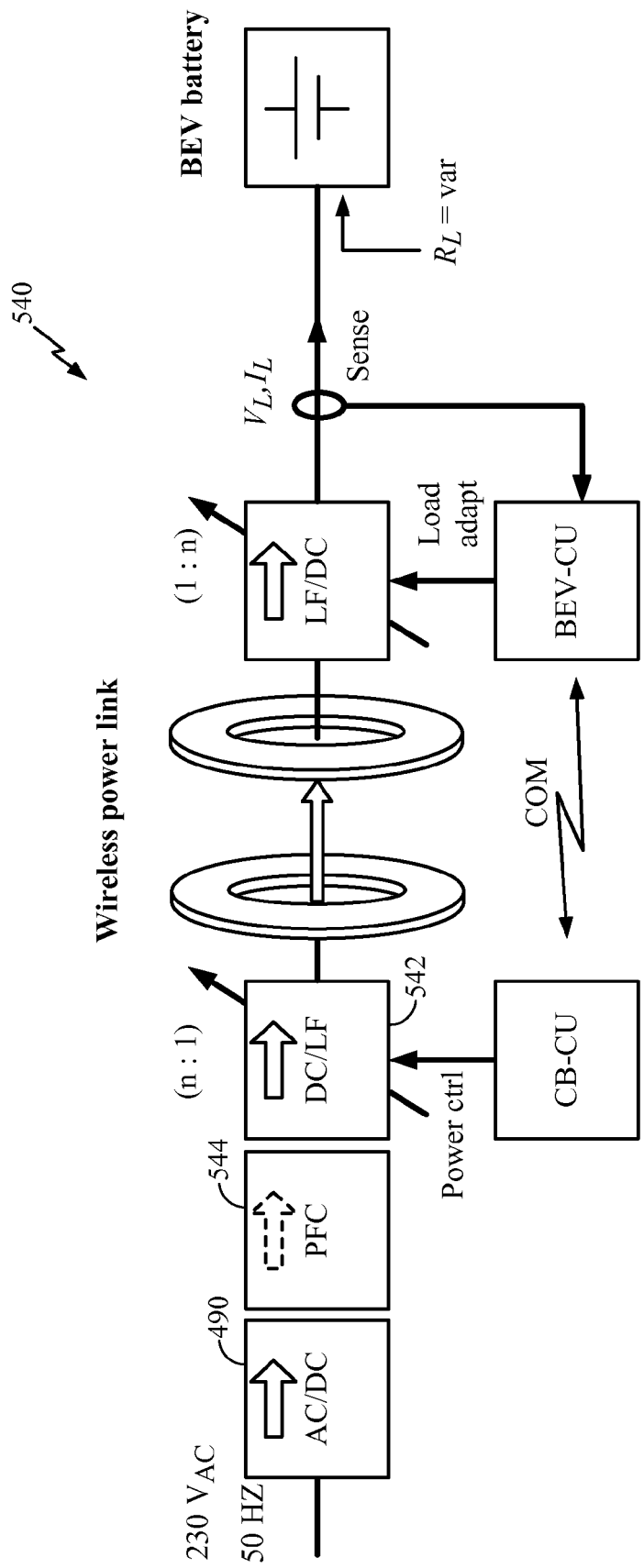
FIG. 28 is a simplified block diagram of a wireless power system for a BEV illustrating a variable power control block and a power factor correction block for converting a DC signal to a suitable wireless power frequency.

FIG. 28 is a simplified block diagram of a wireless power system 540 for a BEV illustrating a variable power control block 542 and a power factor correction block 544 for converting a DC signal to a LF signal at a suitable frequency for wireless power. Power factor correction may be defined as a reduction of harmonic content in currents of the AC supply system. Reducing current harmonics content may be a requirement for compliance of electric appliances consuming power above a specified limit according to international or national standards (e.g., IEC 61000-3-2). Reducing AC current harmonics helps energy suppliers to reduce excessive power losses in the power grid and to maintain mains voltage substantially sinusoidal.

Figure 29A:
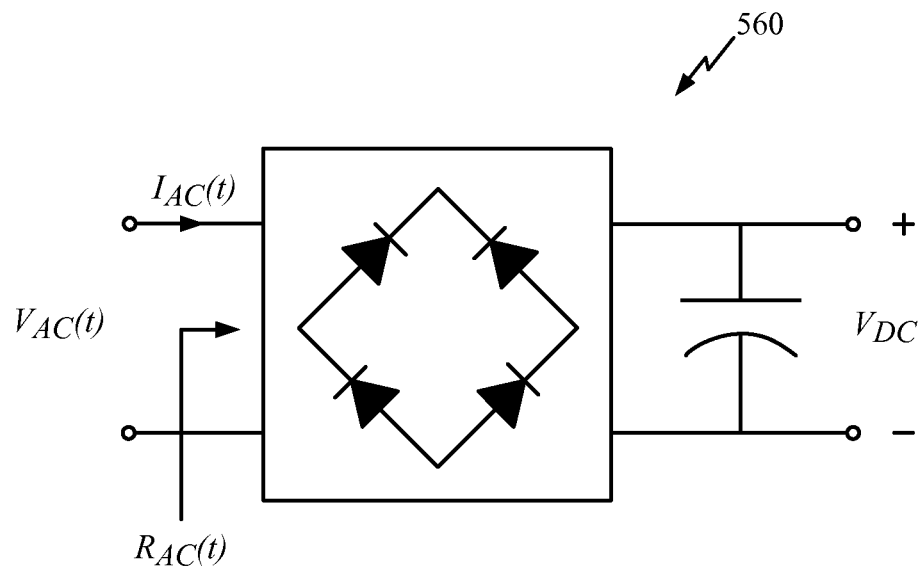
FIGS. 29A-29C illustrate a rectifier circuit, waveforms, and harmonics, respectively, before power factor correction has been included.
Figure 29B:
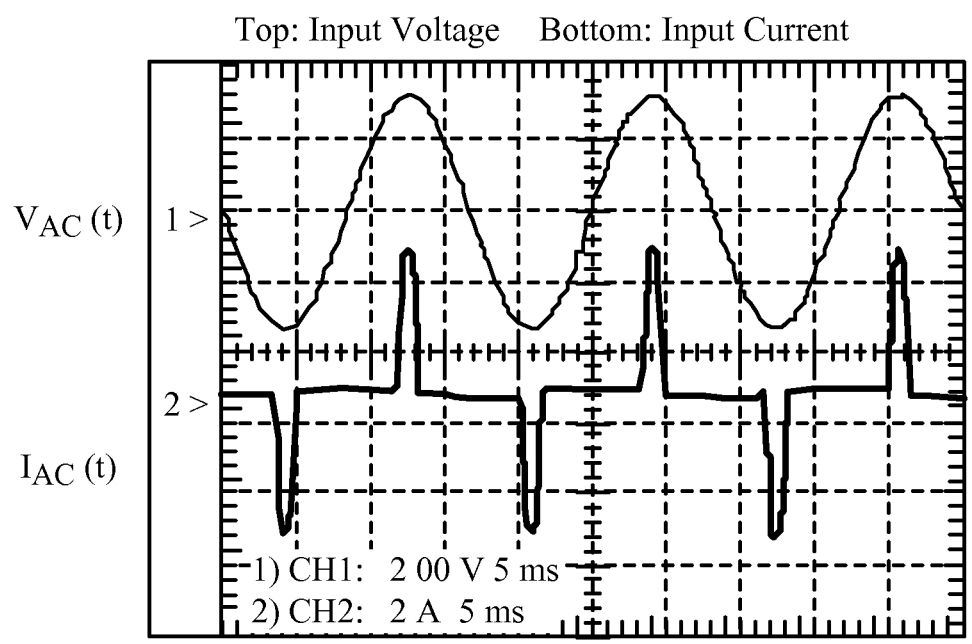
Figure 29C:
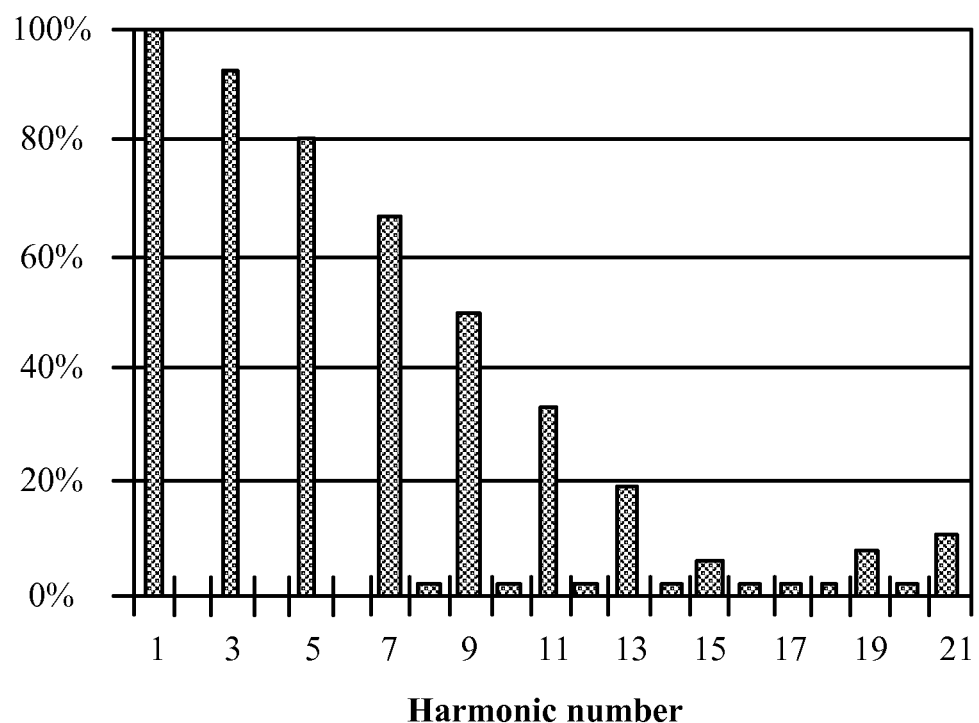

FIGS. 29A-29C illustrate a conventional rectifier circuit 560, typical voltage and current waveforms, and a current harmonics spectrum, respectively, before power factor correction has been included. In FIG. 29A, a conventional full-bridge rectifier 560 is illustrated with four diodes and a load capacitor on the output $V_{DC}$. The input voltages and currents are labeled as $V_{AC}(t)$ and $I_{AC}(t)$, respectively.

There may be regulations in some regions to limit some of these harmonics because they can cause losses that may be charged to the account of the energy supplier. FIG. 29B illustrates the voltage and current waveforms for the conventional full-bridge rectifier. The voltage curve is a sine wave; however, the current curve has spikes where the diodes switch to a conducting mode when recharging the DC smoothing capacitor in each AC cycle. In a Fourier analysis, these current spikes will have highest level at fundamental frequency, but they will also produce a number of harmonic signals, which can have quite high amplitudes as shown in FIG. 29C. In another contemplation, the input resistance as seen by the AC power supply system is time variant ($R_{AC}(t)$) and may change considerably and periodically with the AC frequency.

Figure 30:
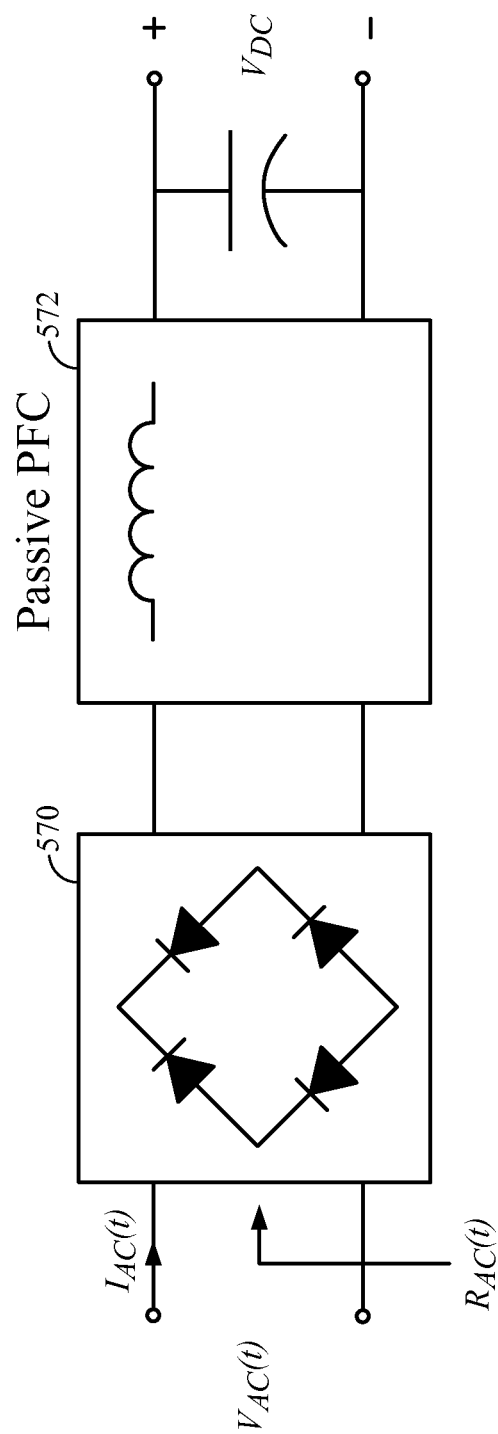
FIG. 30 is a simplified block diagram of a rectifier with a passive power factor control block.

FIG. 30 is a simplified block diagram of a rectifier 570 with a passive power factor correction block 572. In FIG. 30 the conventional rectifier 570 is followed by a passive device 572 that is a large inductor inserted in series between the rectifier and the smoothing capacitor. The inductor acts as a choke that will somewhat reduce harmonic content in the AC input current. However, the passive choke can be very bulky and introduces a voltage drop on the DC output, thus losses.

Figure 31A:
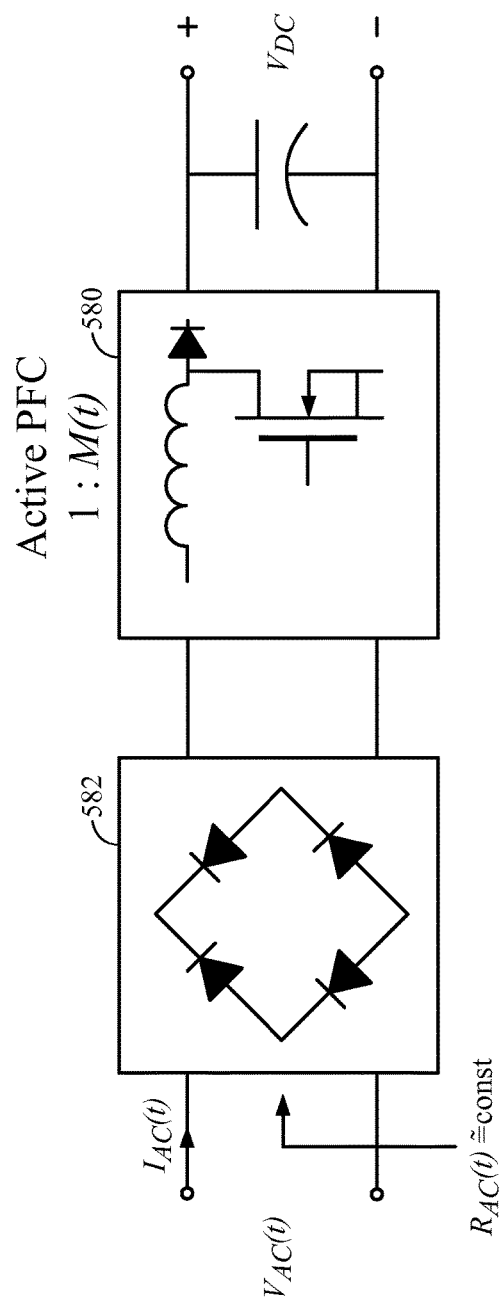
FIGS. 31A-31D illustrate a simplified schematic diagram, waveforms, a correction function, and harmonics, respectively, with active power factor control.
Figure 31B:
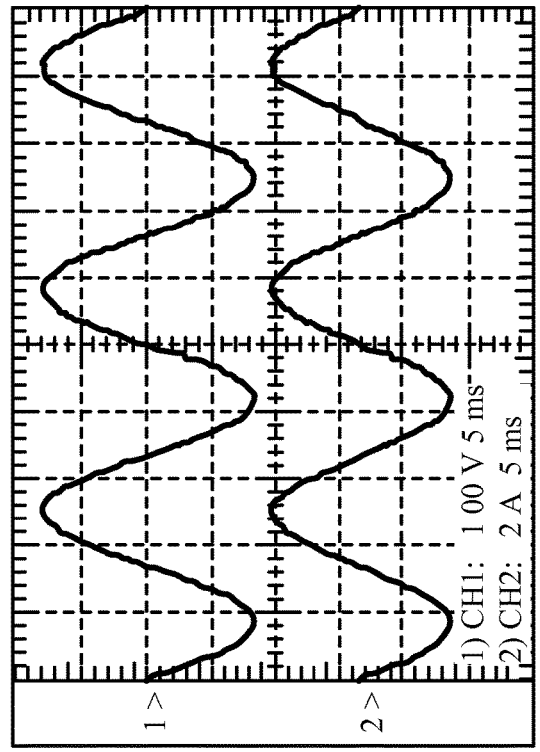
Figure 31C:
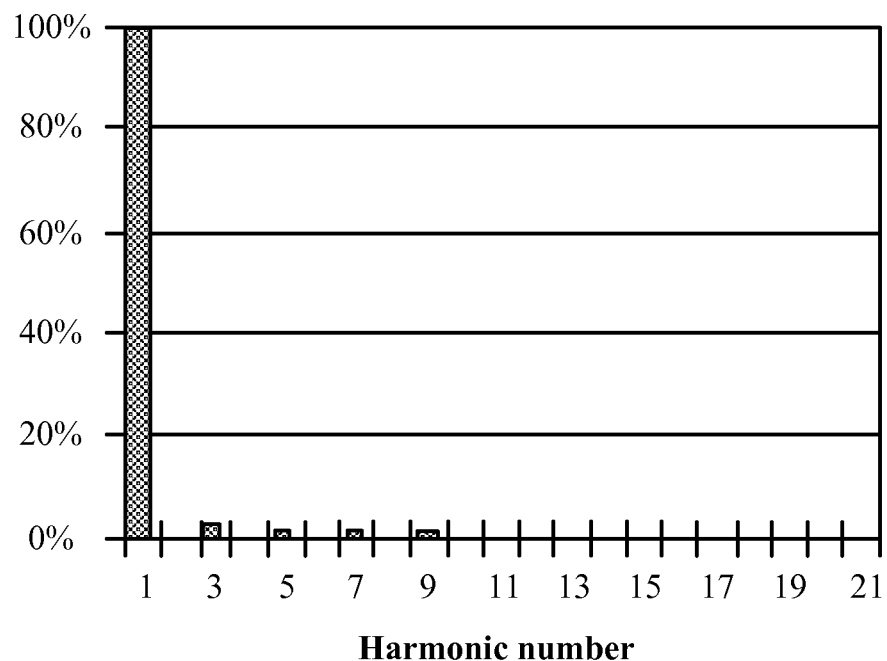
Figure 31D:
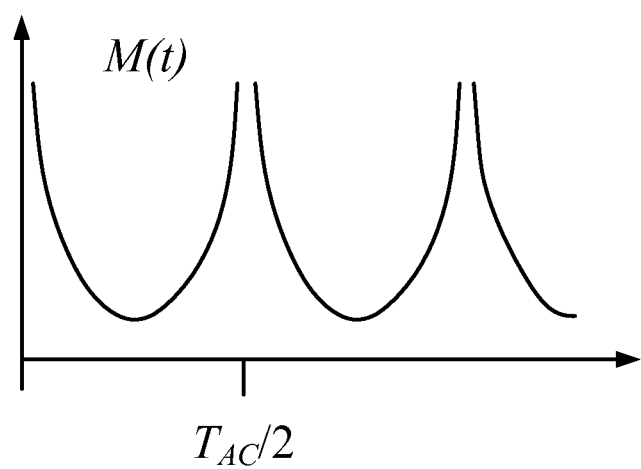

FIGS. 31A-31D illustrate a simplified schematic diagram, voltage and current waveforms, a correction function, and a harmonics spectrum, respectively, with active power factor correction. FIG. 31A illustrates an active power factor correction module (PFC) 580 inserted after the conventional rectifier 582. As a non-limiting example, the active PFC 580 may be configured as a boost converter operated with a time-variant AC periodic transformation ratio M(t) as shown in FIG. 31D, which creates and presents a variable impedance to the rectifier. This variable impedance function may be configured such that the resistance as seen at the rectifiers input ($R_{AC}(t)$) and that is normally time-variant becomes substantially constant. As a result, the instantaneous resistance seen at the AC input terminal is substantially constant and the voltage and current waveforms both maintain a substantially sinusoidal shape as shown in FIG. 31B, thus low harmonic content in the AC input current as shown in FIG. 31C.

Figure 32:
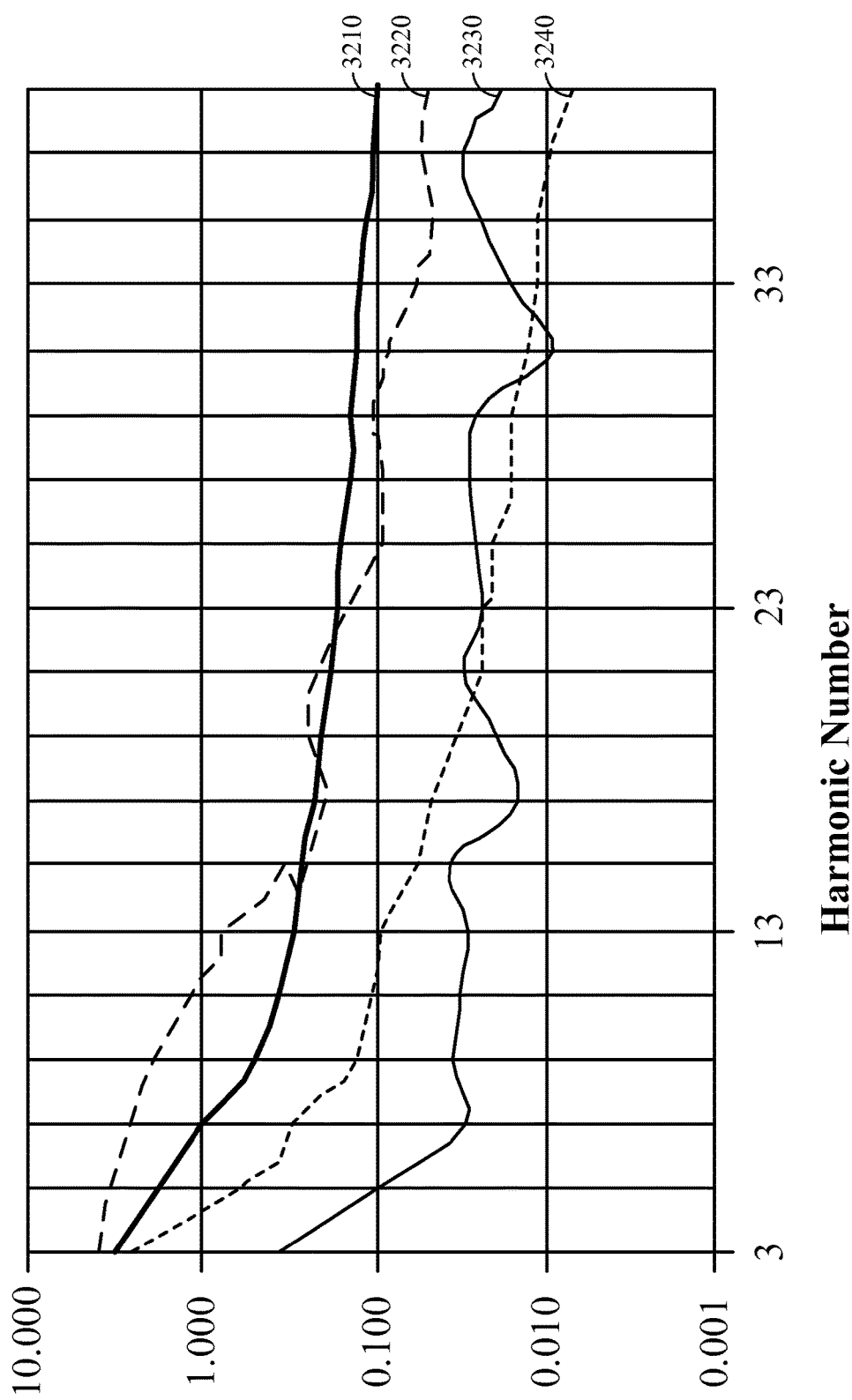
FIG. 32 is a graph illustrating the harmonics present in a rectifier without power factor control, a rectifier with passive power factor control and a rectifier with active power factor control.

FIG. 32 is a graph illustrating the harmonics present in a rectifier without power factor correction, a rectifier with passive power factor correction and a rectifier with active power factor correction. Curve 3210 illustrates a maximum limit that may be acceptable for harmonic content according to some standards. Curve 3220 illustrates harmonics for a full-bridge rectifier with no PFC. Curve 3230 illustrates the lower harmonic values that can be produced for the full-bridge rectifier followed by the simple choke as illustrated in FIG. 30. Curve 3240 illustrates the even lower harmonic levels that can be achieved with a full-bridge rectifier followed by an active PFC module as illustrated in FIG. 31A.

Figure 33:
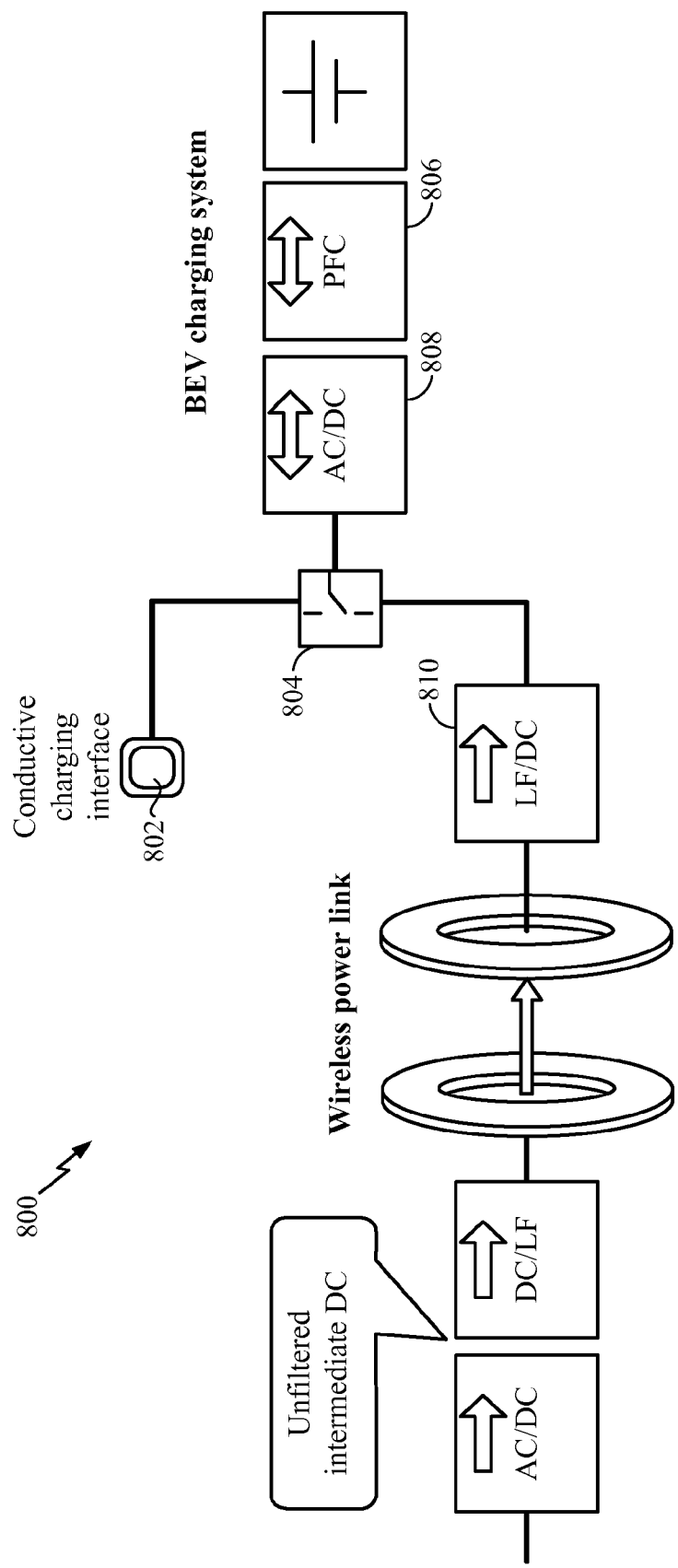
FIG. 33 is a simplified block diagram of a wireless power system for a BEV illustrating power source switching in the BEV.

FIG. 33 is a simplified block diagram of a wireless power system 800 for a BEV illustrating a variant that does not perform power factor correction but rather relies on PFC that may exist as part of the BEV's conductive charging system. This variant assumes that the wireless power system connects to the BEVs conductive charging interface 802 in an alternative manner. It can also be assumed that wireless (cordless) charging will not supersede corded charging via the standardized charging plug, so there will always be a conductive charging interface (CCI). A solid state switch or relay 804 may be included to switch between cordless and corded charging. Corded charging may directly plug into the AC supply system or may use other means for charging the BEV with a wired connection. With this configuration, a PFC module 806 on the receive side may already be available for reducing harmonics at the conductive charge interface that may have to comply to same standards. As a result, with the exemplary embodiment of FIG. 33, the PFC module 806 of the BEV charging system can be used to control harmonics back through the wireless power link to the charging base such that there may be no need for transmit-side PFC. In this case however, the wireless power transmit waveform will be no more constant envelope as shown and explained in the following. It should be noted that the AC/DC converter 808 on the BEV charging system would be in place to support the AC signal from the CCI. The DC signal from the LF/DC converter 810 can pass directly through the AC/DC converter 808 as a DC signal. Therefore, there may be no need to convert the LF from the wireless power link to an AC compatible with the CCI and an existing and simpler LF/DC converter 810 can be used.

Figure 34:
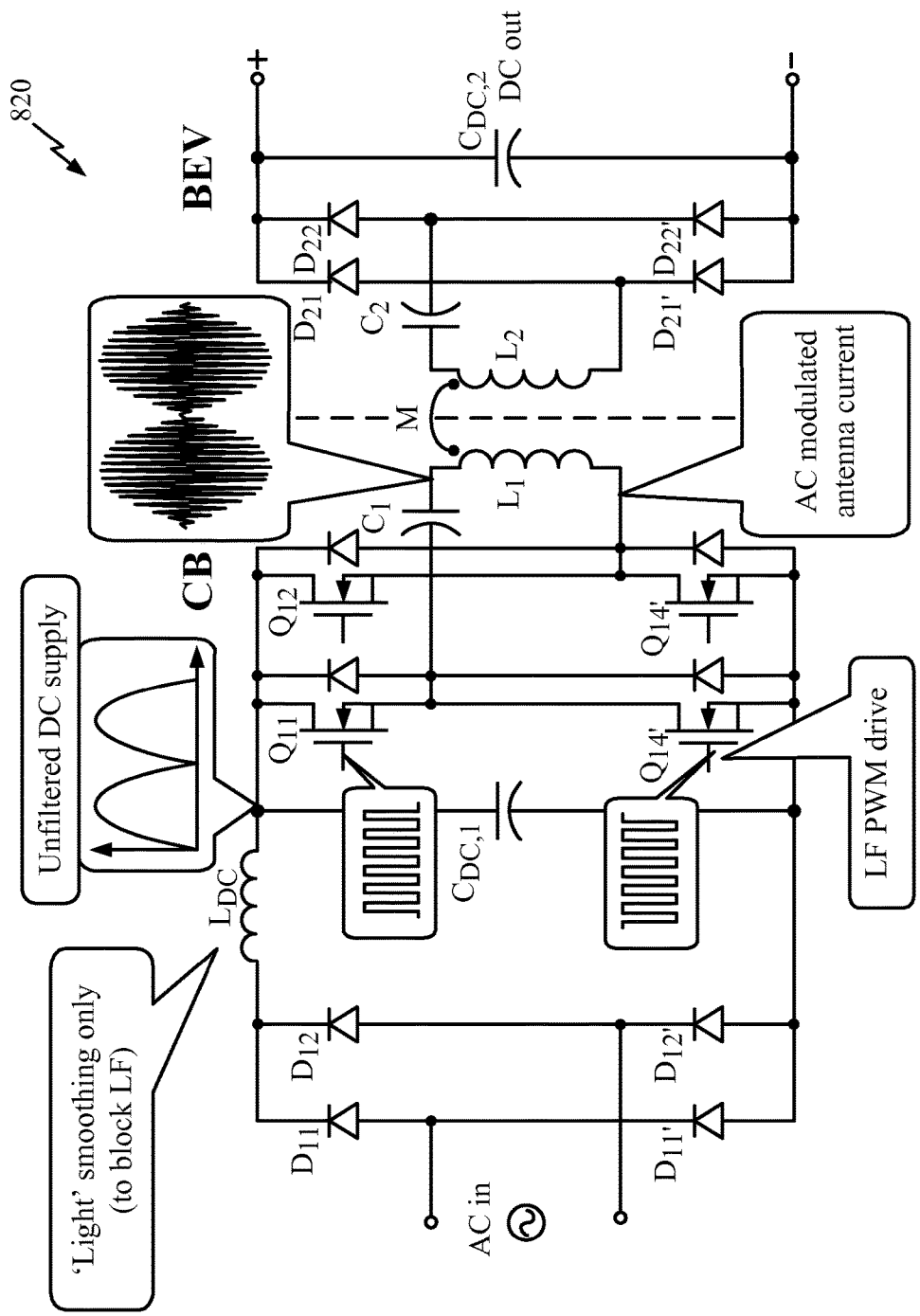
FIG. 34 is a simplified circuit diagram of a wireless power system for a BEV illustrating some possible circuits and waveforms for power factor control.

FIG. 34 is a simplified circuit diagram of a wireless power system 820 for a BEV illustrating some possible circuits and waveforms performing inherent power factor correction at AC supply input. Diodes $D_{11}$, $D_{11'}$, $D_{12}$, and $D_{12'}$ rectify the AC input power to generate a substantially unfiltered DC power to supply the DC/LF converter. The DC waveform may be considered as rectified half waves or AC halfwave modulated DC. As a consequence the output of the DC/LF converter and the transmit antenna ($L_1$) current will be AC halfwave modulated too as shown in FIG. 34. An inductor $L_{DC}$ may be used in combination with capacitor $C_{DC,1}$ to lightly smooth the intermediate DC supply voltage and to block the LF that may be generated by the PWM circuits from propagating back in to the AC supply system in the sense of EMI filtering. The low frequency PWM drive signals are shown as square waves controlling the switching transistors $Q_{14}$, $Q_{14'}$, $Q_{24}$, and $Q_{24'}$ configured as full bridge such that the unfiltered DC supply is modulated onto the LF to produce the modulated AC signal at the transmit antenna. On the BEV side, diodes $D_{21}$, $D_{21'}$, $D_{22}$ and $D_{22'}$ rectify the received modulated AC signal to produce a DC output that AC modulated too. Capacitor $C_{DC,2}$ serves to lightly smooth the DC output and to remove the LF content at the BEV charging interface in the sense of EMI filtering. Since this wireless power system will be transparent meaning that load resistance as seen at the CCI will be reflected back to its AC supply input, the instantaneous resistance as seen at the AC input of the wireless power system will also be substantially constant and thus low harmonic level.

Figure 35A:
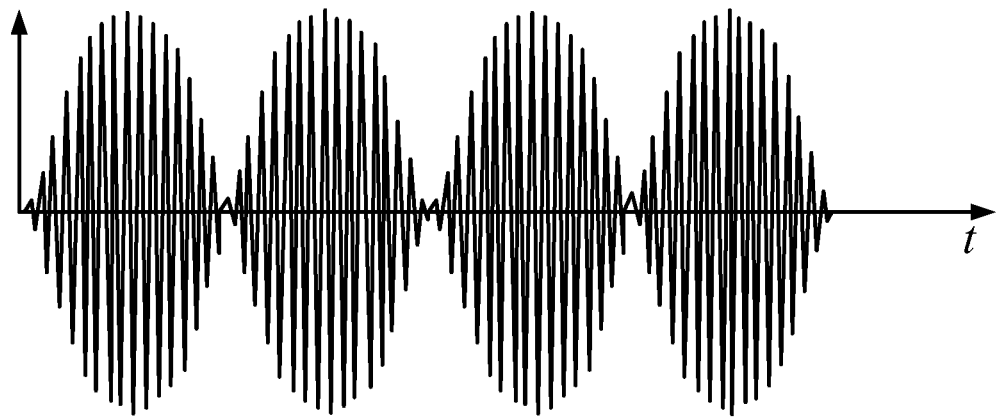
FIGS. 35A and 35B are graphs illustrating transmit waveforms in the time domain and frequency domain, respectively, with non-filtered DC supplied to the low frequency (LF) stage.
Figure 35B:
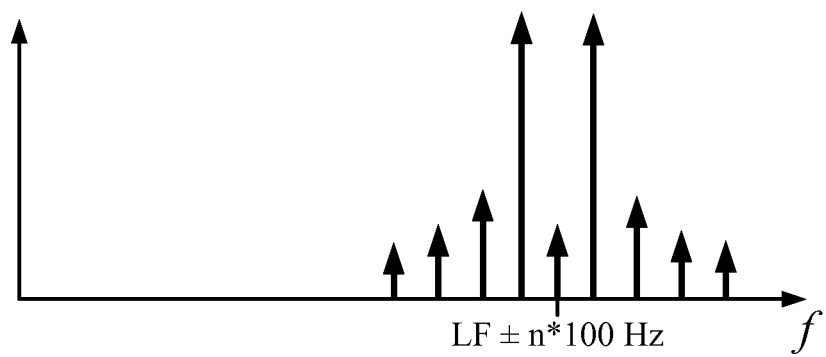

FIGS. 35A and 35B are graphs illustrating transmit waveforms in the time domain and frequency domain, respectively, that would be generated by the exemplary embodiment of FIG. 34 with non-filtered DC supplied to the low frequency (LF) stage. FIG. 35A shows transmit antenna current in the time domain as a 100 Hz pulsed AM signal. FIG. 35B shows the transmit signal in the frequency domain to show the fundamental frequency at about 100 Hz and the harmonic side bands on either side of the fundamental frequency.

Figure 36:
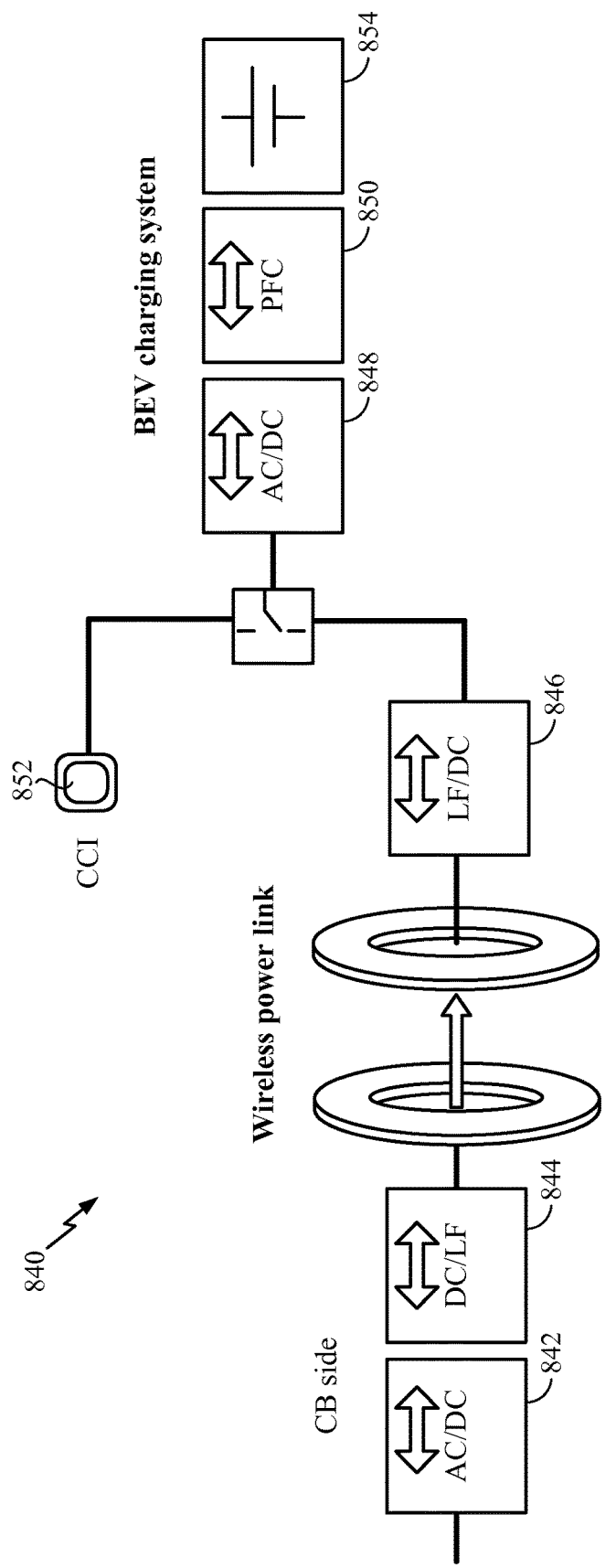
FIG. 36 is a simplified block diagram of a wireless power system for a BEV illustrating that wireless power transmission can be bidirectional.

FIG. 36 is a simplified block diagram illustrating a bidirectional wireless power system 840 including a bidirectional wireless power transceiver for a BEV. Bidirectional or two-way energy transfer means that energy can be transferred either from charging base towards BEV or from BEV towards charging base which is to the power grid. As explained earlier, bidirectional wireless power transfer will be required to realize the V2G (Vehicle-to-Grid) functionality that may become an important feature in future smart grids in which BEVs temporarily connected to the grid will be used as distributed energy storage devices 854 e.g. to compensate for fluctuations in distributed renewable energy production and to locally stabilize the power grid. Thus, exemplary embodiments may be configured with the CB side AC/DC converter 842, the DC/LF converter 844 as bidirectional power converters. Similarly, the LF/DC converter 846, the AC/DC converter 848, and the PFC 850 on the BEV side may be configured as bidirectional power converters. As a result, the exemplary embodiment of FIG. 36 is symmetrical and capable of transferring and controlling power in both directions across the wireless power link. It should also be noted that the AC/DC converter 848 on the BEV charging system would be in place to support the AC signal from the CCI 852. The DC signal from the LF/DC converter 846 can pass directly through the AC/DC converter 848 as a DC signal, as was explained above with reference to FIG. 33. Therefore, in a bidirectional system, some exemplary embodiments may include an AC/DC conversion on the BEV side. In other exemplary embodiments, the AC/DC converter 848 on the BEV side, when operating in the reverse direction, would convert to a CCI frequency or LF, depending on which interface was selected.

Figure 37:
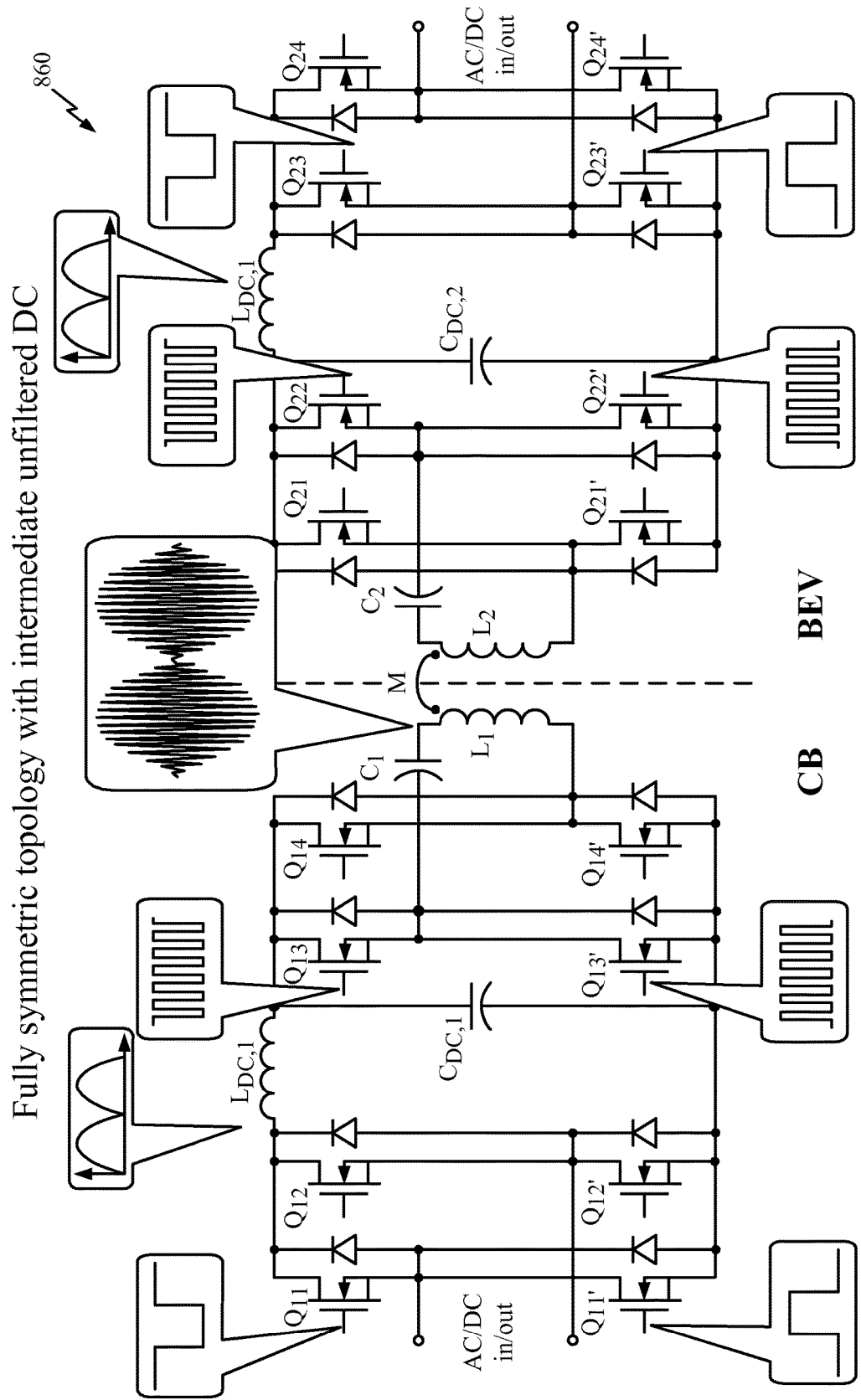
FIG. 37 is a simplified circuit diagram of a wireless power system for a BEV illustrating a symmetric topology for bidirectional wireless power transfer with an intermediate unfiltered DC signal.

FIG. 37 is a simplified circuit diagram of a wireless power system 860 for a BEV illustrating a symmetric topology for bidirectional wireless power transfer with an intermediate unfiltered DC supply. In the following it is assumed that the wireless power system interfaces at AC at both of its interfaces (CB side and BEV side). On both the CB side and the BEV there is a cascade of full bridge PWM modules that may either act as AC/DC converter (rectifier) or DC/AC converter (inverter, which may also be referred to herein as DC-to-AC converters) or as LF/DC (rectifiers) or DC/LF converters (inverters), respectively with substantially unfiltered intermediate DC that assumes light smoothing as described with reference to FIG. 34. As referenced herein, a converter operating as either digital-to-analog or analog-to-digital may be may be referred to herein as a DC/AC converter. It should be noted that for bidirectional power transfer, when a DC/AC (DC/LF) converter is operated on a CB side is operated in receive mode, the DC/AC (DC/LF) converter is actually operating as a rectifier instead of as an inverter. Similarly, when an AC/DC converter on the BEV side is operating in transmit mode, then the AC/DC converter is actually operating as an inverter instead of as a rectifier. Accordingly, bridge circuits, namely full-bridge and half-bridge circuits when configured for bidirectional power transfer, operates as both a rectifier and as an inverter depending upon the direction of power transmission. Therefore, bidirectional full-bridge circuits and half-bridge circuits may be synonymously referred to herein as full-bridge inverter/rectifier and half-bridge inverter/rectifier circuits.

When transmitting energy from the CB to the BEV, the AC input on the far left is rectified by the AC/DC converter (first full bridge $Q_{11}$, $Q_{11'}$, $Q_{12}$, $Q_{12'}$) that is operated as a synchronous rectifier to produce an unfiltered DC supply. Synchronous rectification means that once in synchronous mode rectification is performed by the active switches (transistors) rather than by the passive diodes that are always in parallel also to protect active switches from reverse polarization. The use of active switching which is here needed to operate converters in both directions (i.e., bidirectional power converters) may bring the additional advantage of lower switching losses thus higher efficiency. The unfiltered DC supplies the following full bridge ($Q_{13}$, $Q_{13'}$, $Q_{14}$, $Q_{14'}$) that is the DC/LF converter and that drives AC modulated LF current into the resonant antenna of the CB. On the BEV side, accordingly, the third full bridge ($Q_{21}$, $Q_{21'}$, $Q_{22}$, $Q_{22'}$) synchronously rectifies received LF power to AC-modulated DC power and the fourth full bridge ($Q_{23}$, $Q_{23'}$, $Q_{24}$, $Q_{24'}$) reconverts it to AC power. In specific applications, there may be a DC supply at CB side input, in this case the first full bridge would be operated in a static mode without switching. The same apply to the fourth bridge if the BEV side did accept DC power.

When transmitting from the BEV to the CB, the same power conversion process using bidirectional power converters as described above may apply however in reverse direction and it accordingly applies in regards to a possible DC interface either on BEV side or on CB side or on both sides.

Figure 38:
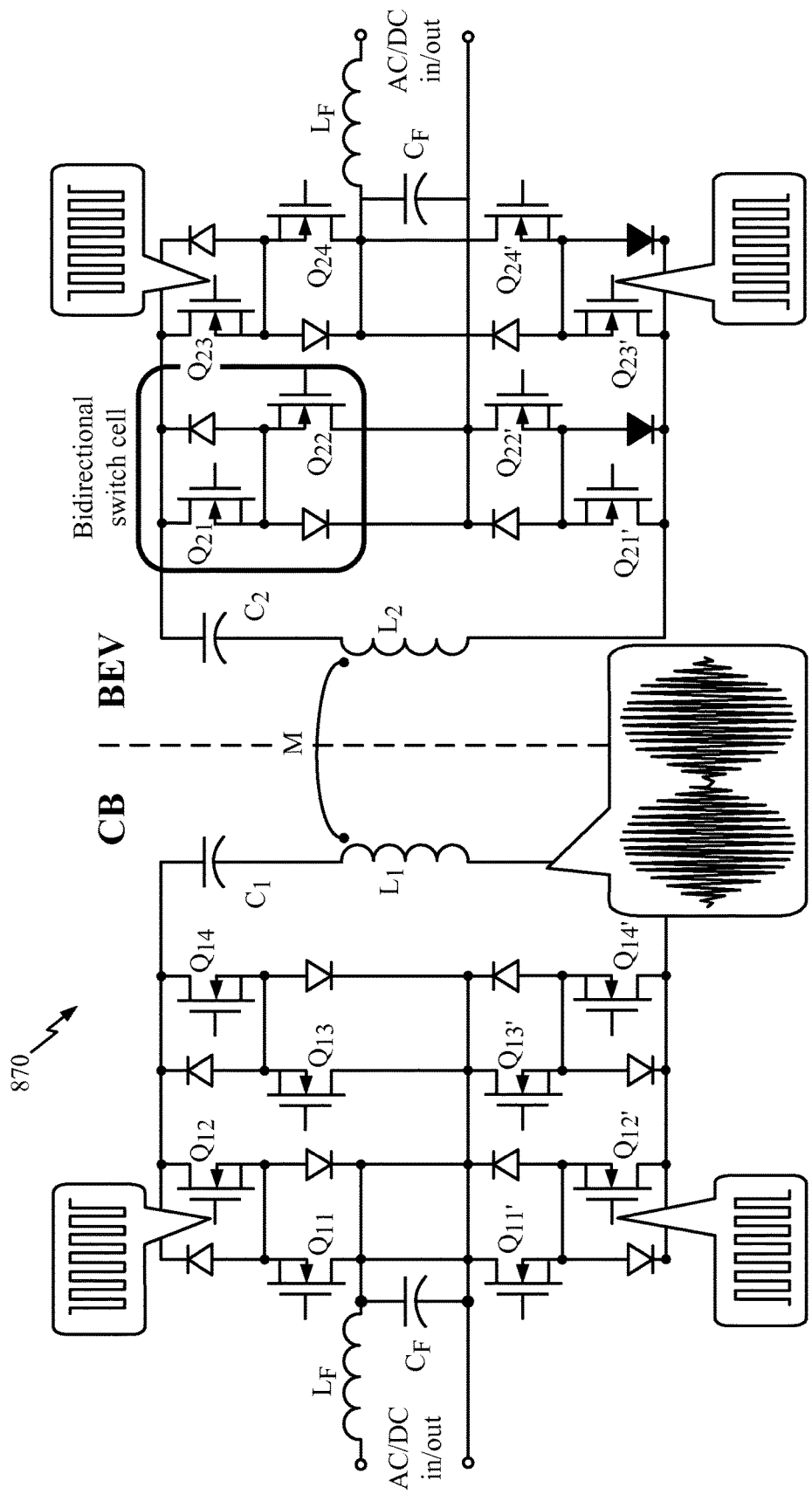
FIG. 38 is a simplified circuit diagram of a wireless power system for a BEV illustrating a symmetric topology for wireless power transfer without an intermediate unfiltered DC signal and using a frequency mixing approach.

FIG. 38 is a simplified circuit diagram of a wireless power system 870 for a BEV illustrating another symmetric topology for wireless power transfer without an intermediate unfiltered DC supply and based on a frequency mixing approach. The exemplary embodiment of FIG. 38 uses a fully symmetric full bridge topology consisting of four bidirectional active switch cells. In transmit mode, this topology may operate as AC/LF up-converter which is actually a Double Side Band (DSB) modulator or in receive mode as LF/AC down-converter which is a synchronous DSB demodulator to convert the received LF input power into the required AC power (e.g. 50 Hz). These circuits may also apply if one or both interfaces of the wireless power system was a DC interface.

As with the embodiment of FIG. 37, transmission from the CB to the BEV proceeds from an AC input on the left side through the circuitry on the CB side acting as a DSB modulator, to the CB antenna, to the BEV antenna, and through the circuitry on the BEV side acting as a demodulator to create a AC or DC output power on the right side. Similarly, transmission from the BEV to the CB proceeds from an AC or DC input on the right side through the circuitry on the BEV side acting as a DSB modulator, to the BEV antenna, to the CB antenna, and through the circuitry on the CB side acting as a demodulator to create an AC or DC output power on the left side.

Conversion from a modulator function to a demodulator function may be accomplished with a bidirectional switch cell including two transistors in anti-parallel. On the BEV side, the bidirectional switch cell includes transistor $Q_{21}$ with a diode in series therewith and cross-coupled transistor $Q_{22}$ with a diode in series therewith. Similarly, on the CB side, the bidirectional switch cell includes transistor $Q_{13}$ with a diode in series therewith and cross-coupled transistor $Q_{14}$ with a diode in series therewith.

Figure 39A:
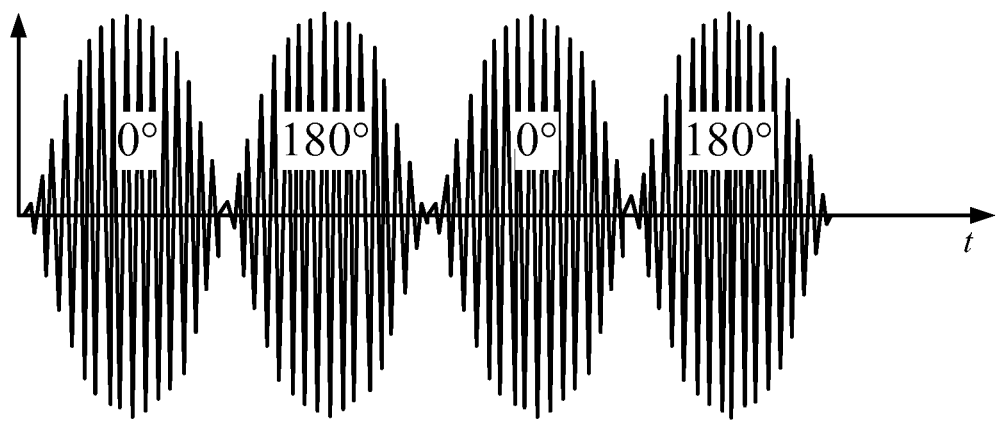
FIGS. 39A and 39B are graphs illustrating transmit waveforms in the time domain and frequency domain, respectively, with power conversion that is Double Side Band (DSB) modulated.
Figure 39B:
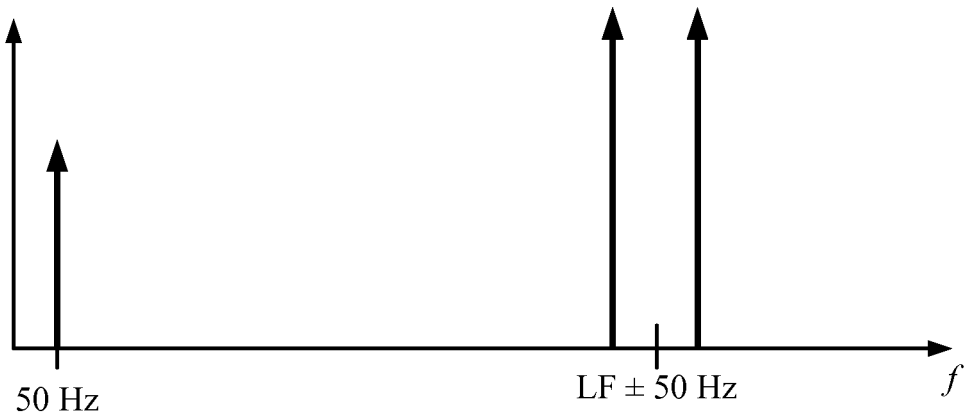

FIGS. 39A and 39B are graphs illustrating transmit waveforms in the time domain and frequency domain, respectively, with power conversion that is Double Side Band (DSB) modulated. As shown in FIG. 39A, the time domain illustrates that a 180° phase-shift exists on the signal from one AC half wave pulse to the next AC half wave pulse. This is well known as the waveform of a double tone signal. As shown in FIG. 39B, in the frequency domain, a clean double-frequency spectrum is generated ideally with no spectral skirts (sidebands of 100 Hz harmonics) as it is the case for the approach shown in FIG. 37. Like the approach of FIG. 37, the DSB modulator approach is transparent in regards to load resistance, thus may be potentially suitable to make use of PFC that may already exist in the BEV charging system for reasons of compliance of the CCI.

Figure 40:
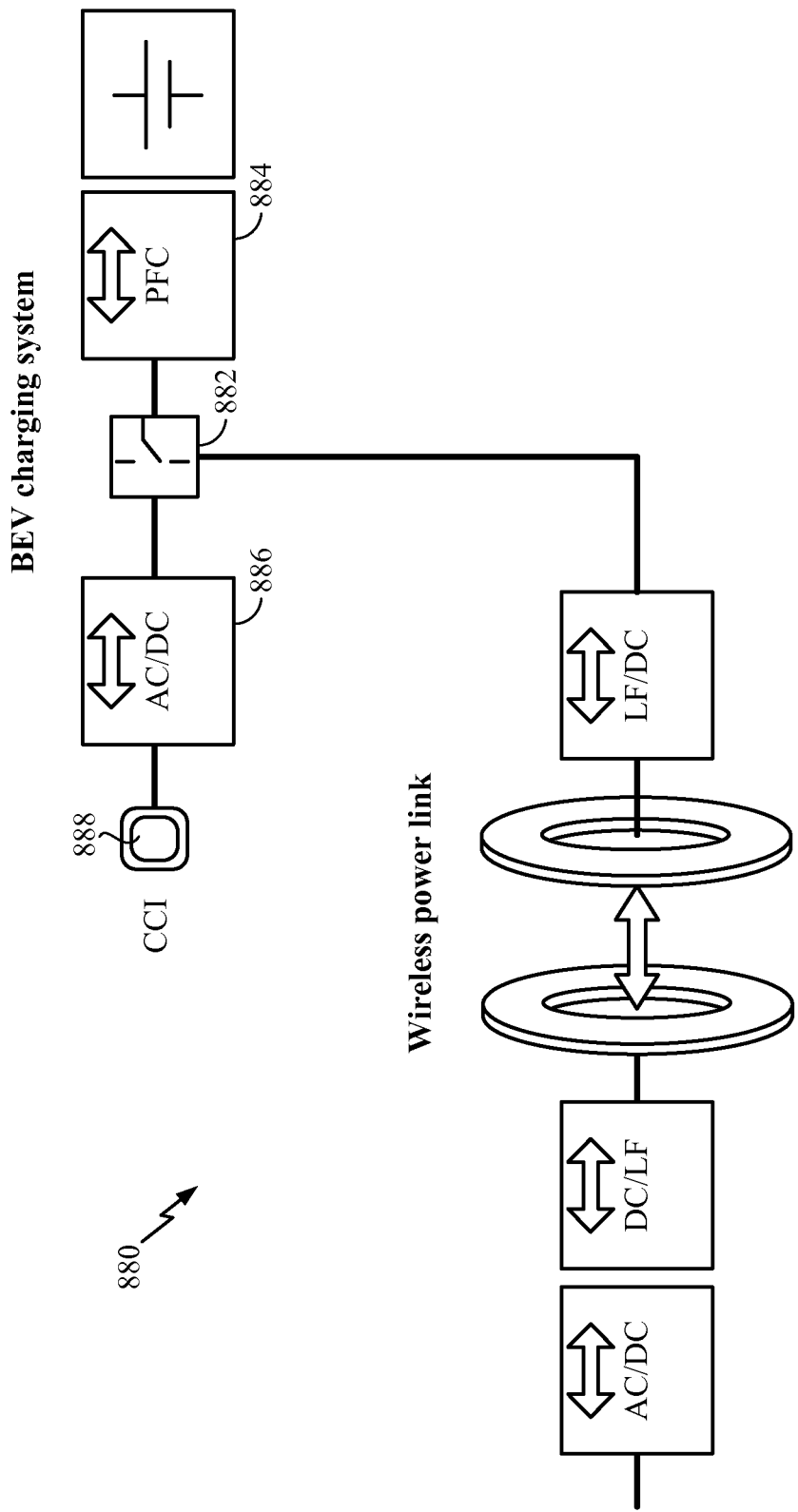
FIG. 40 is a simplified block diagram of a wireless power system for a BEV illustrating coupling to a conductive charging interface that may reduce the need for an additional AC-to-DC converter.

FIG. 40 is a simplified block diagram of a wireless power system 880 for a BEV illustrating an alternative approach to interface to the BEV charging system and that bypasses the BEV AC-to-DC converter to reduce the length of the power conversion chain thus likely increasing its end-to-end efficiency. This exemplary embodiment illustrates moving the charging mode switch 882 from the input of the AC/DC to the input of the PFC 884. In FIG. 40, the AC/DC converter 886 is between the CCI 888 and the switch 882 as opposed to the embodiment of FIG. 36 where the AC/DC converter is after the switch. This solution avoids conversion/reconversion to/from AC on the wireless power side of the switch. The embodiment of FIG. 36 may be best for a retrofit system because the wireless power interface can easily be added in parallel to an existing standard CCI. The embodiment of FIG. 40 may be more useful for a system that incorporates wireless charging from the start where the wireless power charging can be more optimally designed in and integration with the CCI.

Figure 41:
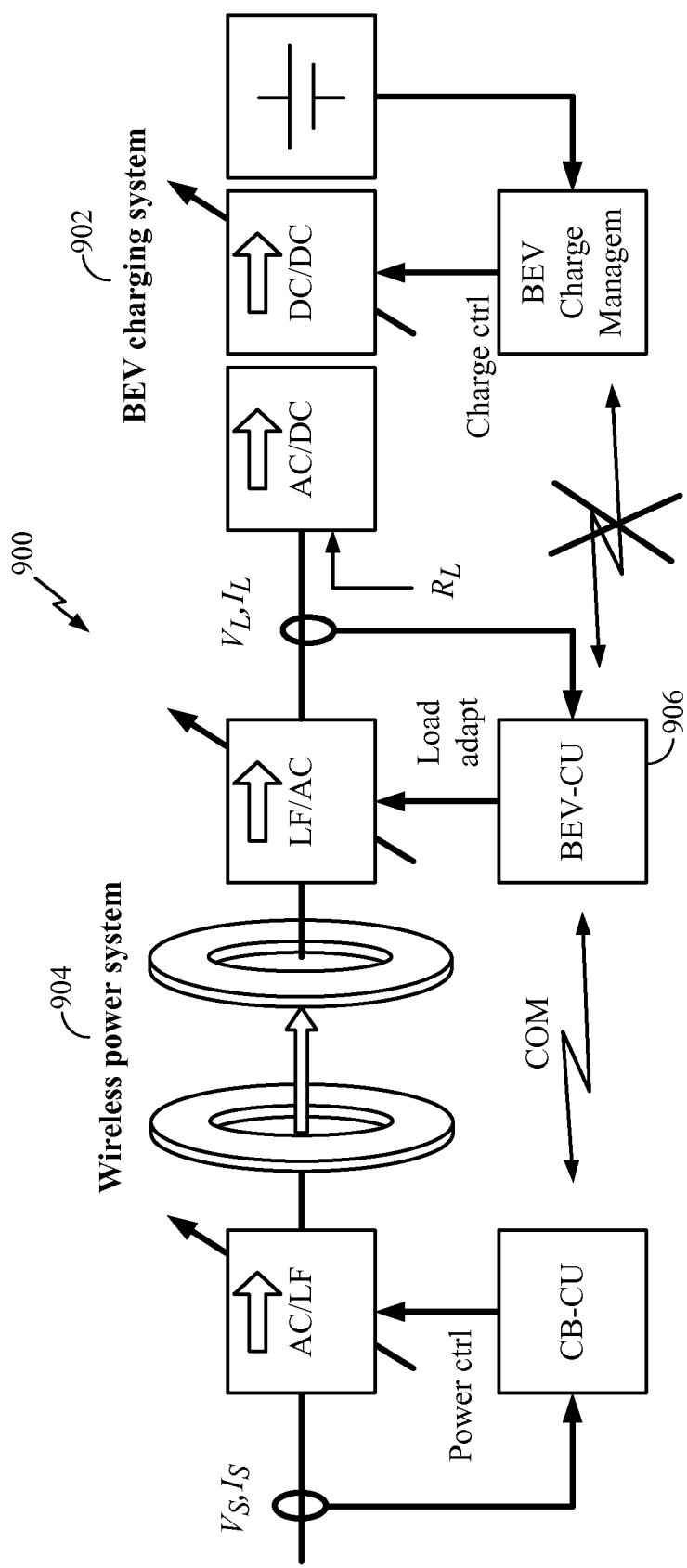
FIG. 41 is a simplified block diagram of a wireless power system for a BEV illustrating that in some exemplary embodiments there may be no need for communication between the BEV charging system and the BEV wireless power system.

FIG. 41 is a simplified block diagram of a wireless power system 900 for a BEV illustrating that in some exemplary embodiments there may be no need for communication between the BEV charging system 902 and the BEV wireless power system 904. In this exemplary embodiment, the wireless power system 904 may operate as a slave of the BEV charging system 902. As a slave, the wireless power system 904 can work autonomously to a wide extent and inter-system communication may not be necessary as is illustrated by the X mark through the communication interface between the BEV charging system 902 and the BEV communication unit 906. This slave mode may be accomplished because, as explained earlier, wireless power transfer can be optimized by monitoring voltage and current at the receive side, at the transmit side, or a combination thereof and possibly communicating the measured information between the receive side and the transmit side.

Figure 42A:
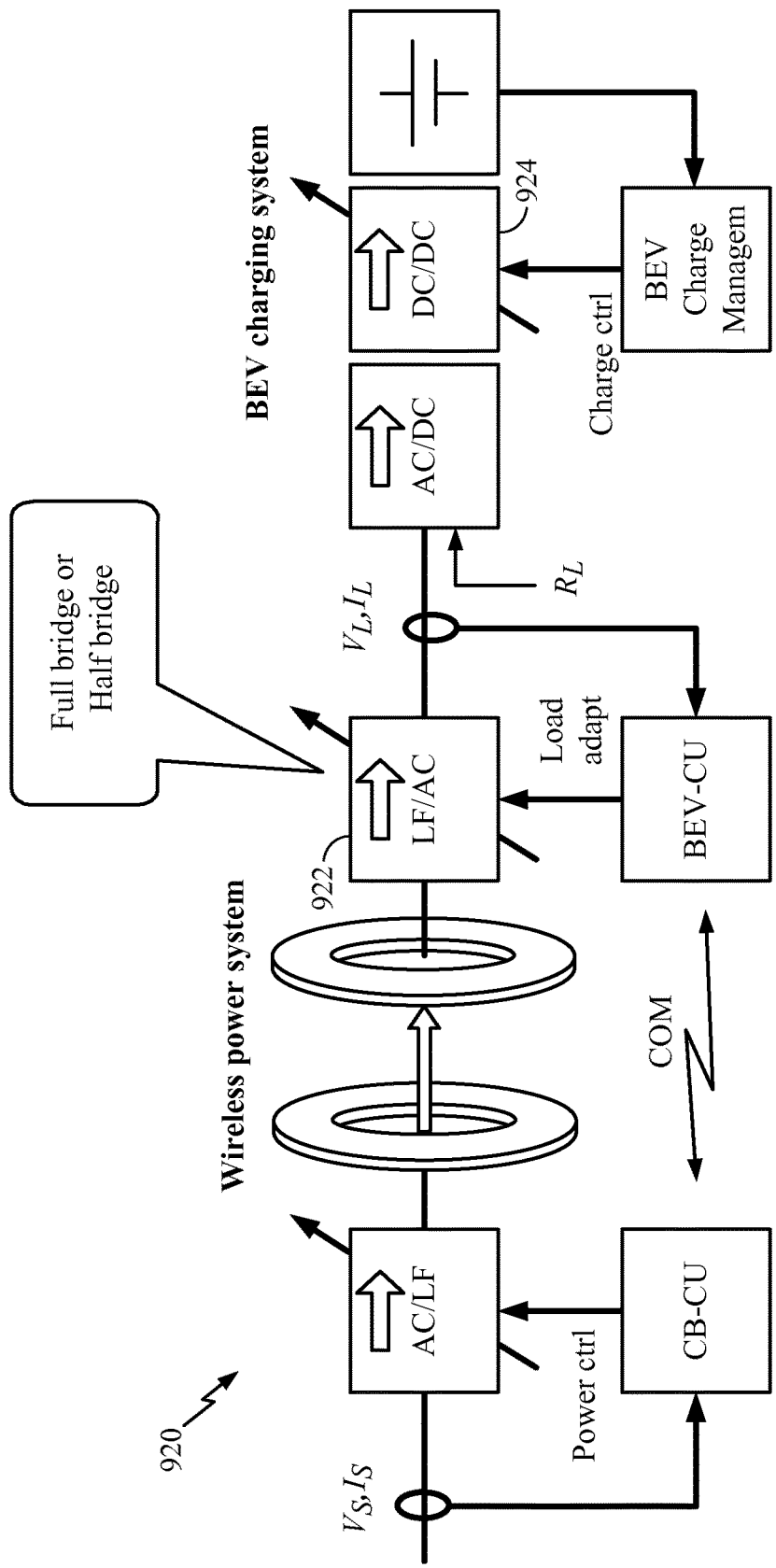
FIG. 42A is a simplified block diagram of a wireless power system for a BEV illustrating coarse load adaptation.

FIG. 42A is a simplified block diagram of a wireless power system 920 for a BEV illustrating coarse load adaptation. With coarse load adaptation, the LF/AC converter 922 can be modified between full-bridge rectification and half-bridge rectification. In addition, the DC-to-DC converter 924 can be modified by changing its load resistance.

Figure 42B:
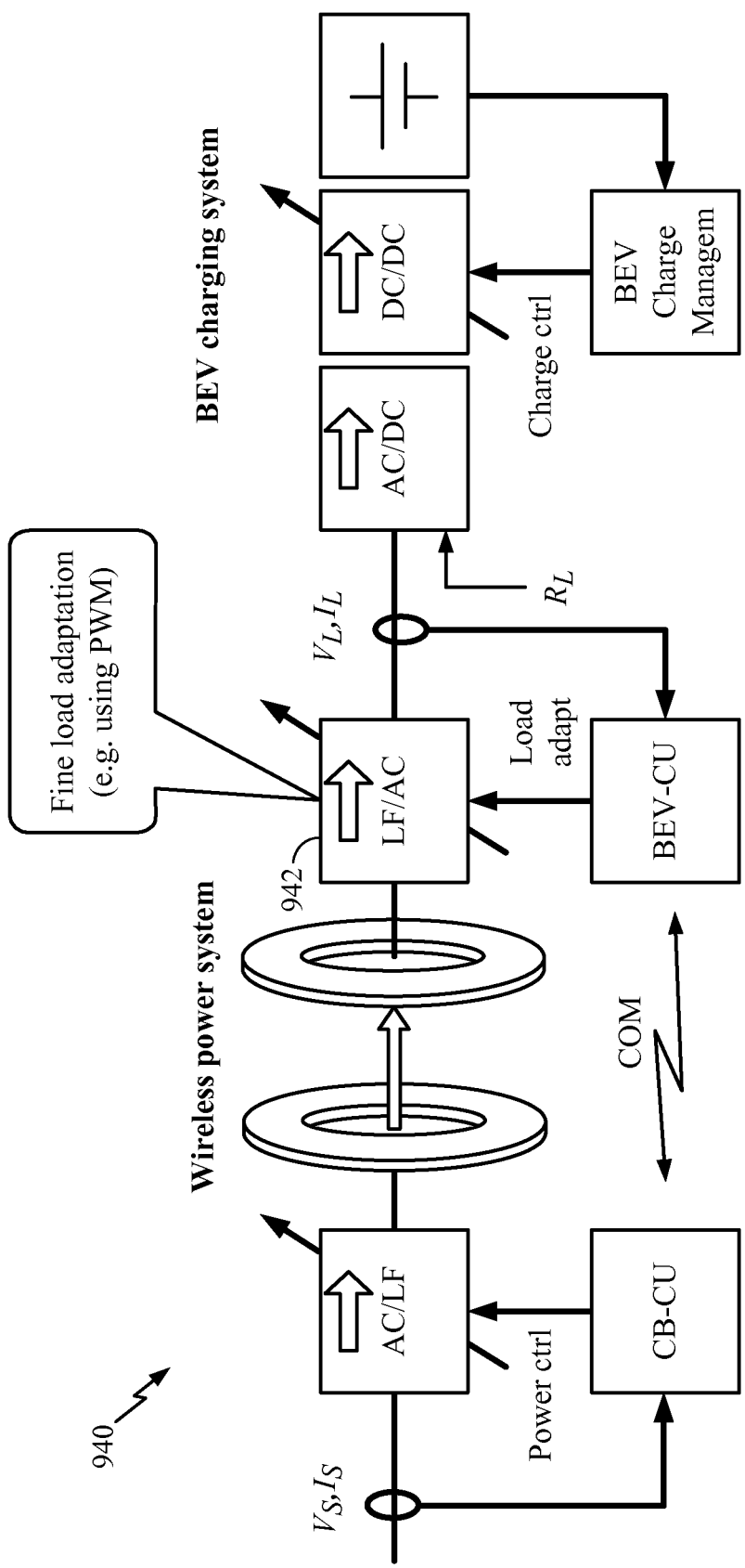
FIG. 42B is a simplified block diagram of a wireless power system for a BEV illustrating fine load adaptation.

FIG. 42B is a simplified block diagram of a wireless power system 940 for a BEV illustrating fine load adaptation. With fine load adaptation, the LF/AC converter 942 can be modified to adjust its transformation ratio in fine steps using the appropriate means already described above, such as, for example, detuning and PWM duty cycle adjustments.

Figure 43:
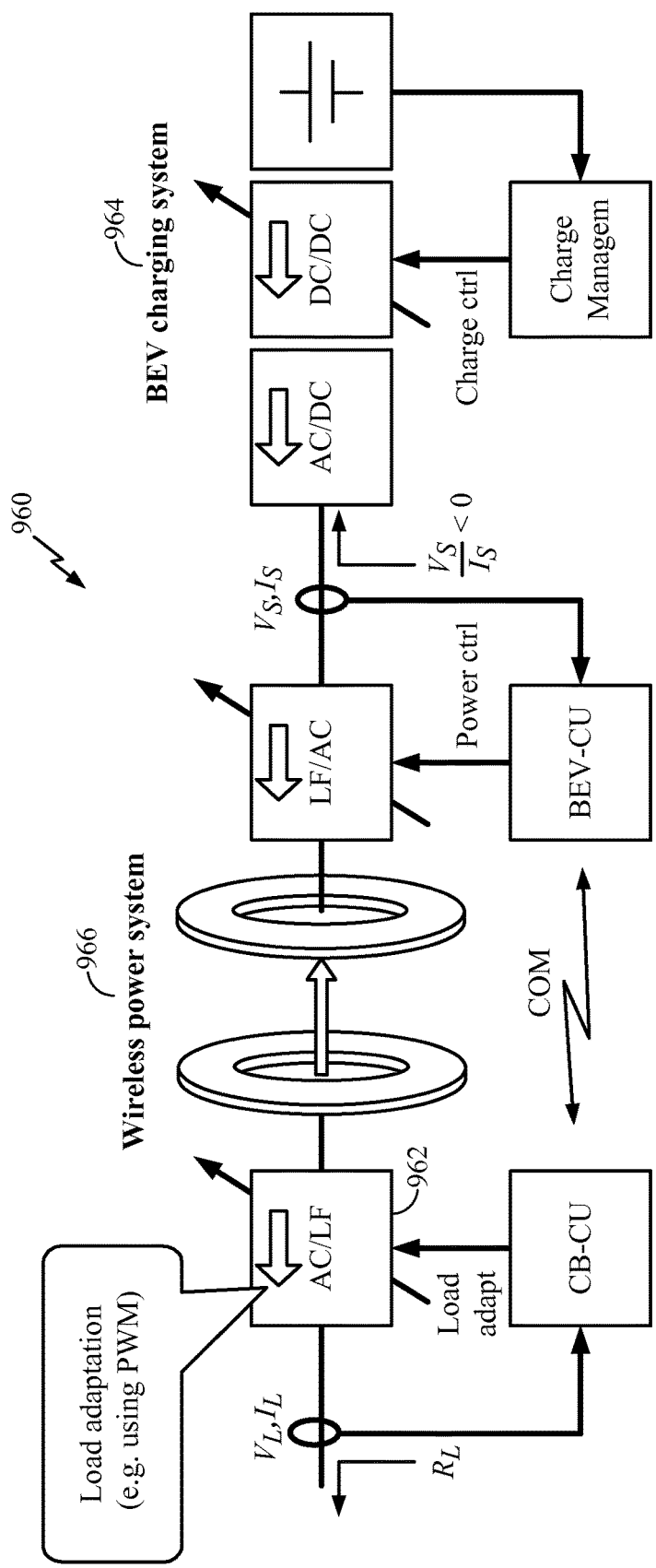
FIG. 43 is a simplified block diagram of a wireless power system for a BEV illustrating reverse link load adaptation.

FIG. 43 is a simplified block diagram of a wireless power system 960 for a BEV illustrating reverse link load adaptation. As stated earlier, the wireless power system can operate in a reverse link to move power from the BEV to the CB. In this case, a load adaptation and control strategy is defined in FIG. 43 for managing the reverse power flow. As with the forward direction, coarse adaptation can be performed by switching between full-bridge rectification and half-bridge rectification, except that the rectification switching may be performed on the CB side by the AC/LF converter 962 (operating in reverse direction as a LF/AC converter).

Reverse power mode may detected when the resistance $V_S/I_S$ at the BEV charging interface appears negative. It is assumed that BEV charging system 964 would limit output voltage $V_S$ so that $V_S$ would not increase infinitely (theoretically) if the load presented by the wireless power system 966 in reverse mode dropped off.

As long as voltage $V_S$ remains above a defined threshold voltage $V_{min}$, reverse power transmission into the AC mains (i.e., $V_L$, $I_L$, $R_L$) may be maintained at maximum (or at nominal rating). If $V_S$ drops below $V_{min}$ then the reverse power control may decrease power transmission until $V_S$ rises above the threshold again.

To maintain maximum reverse link efficiency, AC-mains sided load adaptation may be performed in the charging base subsystem. Since AC mains will exhibit a quasi-constant voltage (behave like a voltage source), the load resistance as seen into the AC mains will depart from the optimum value when power decreases, requiring continuous load adaptation in CB subsystem.

This behavior is in contrast to feeding into the BEV charging interface in forward mode. The BEV system may exhibit a different behavior and input resistance may be influenced by offered voltage.

Figure 44:
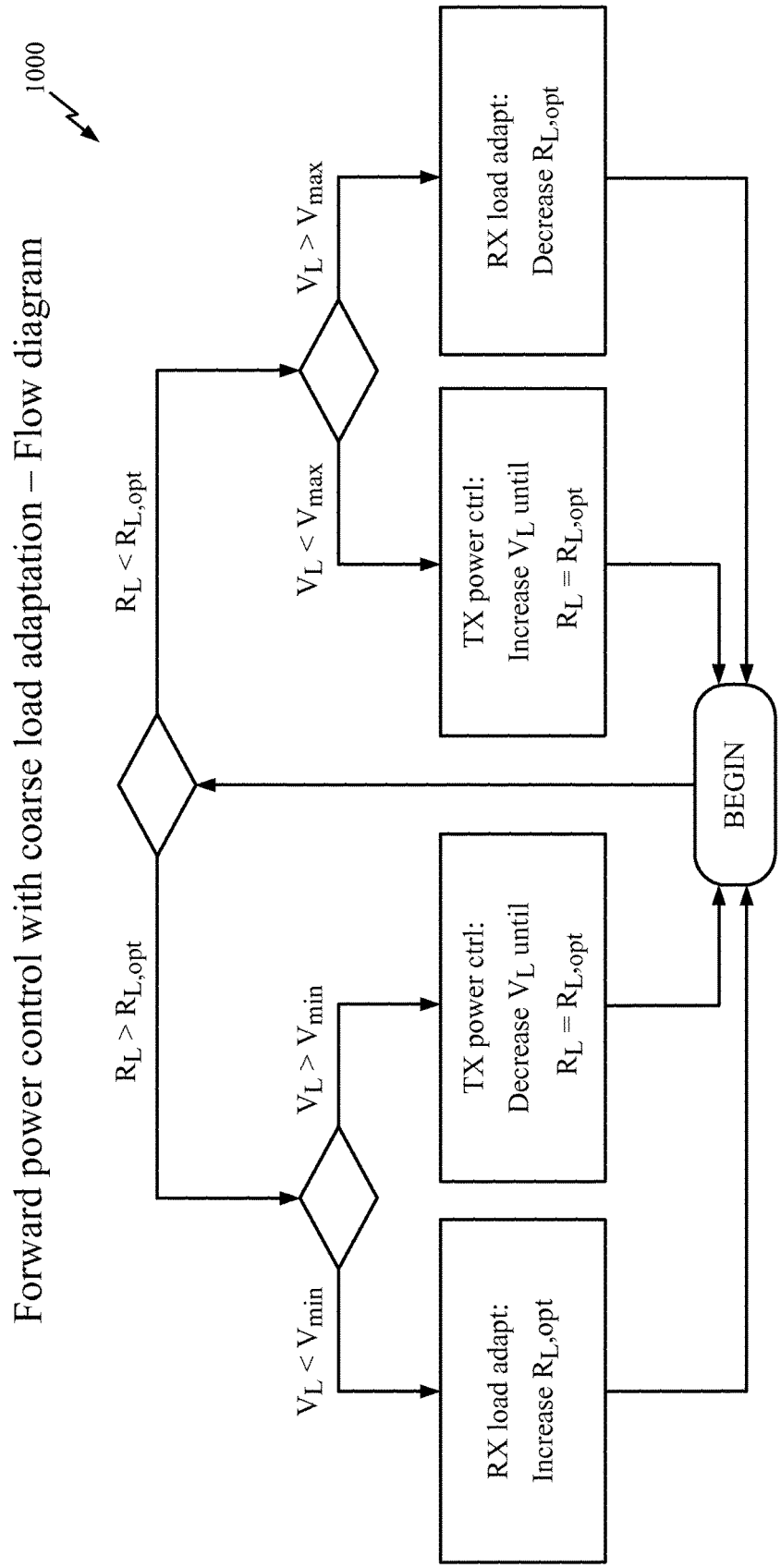
FIG. 44 is a flow diagram illustrating coarse load adaptation.

FIG. 44 is a flow diagram 1000 illustrating coarse load adaptation.

Figure 45:
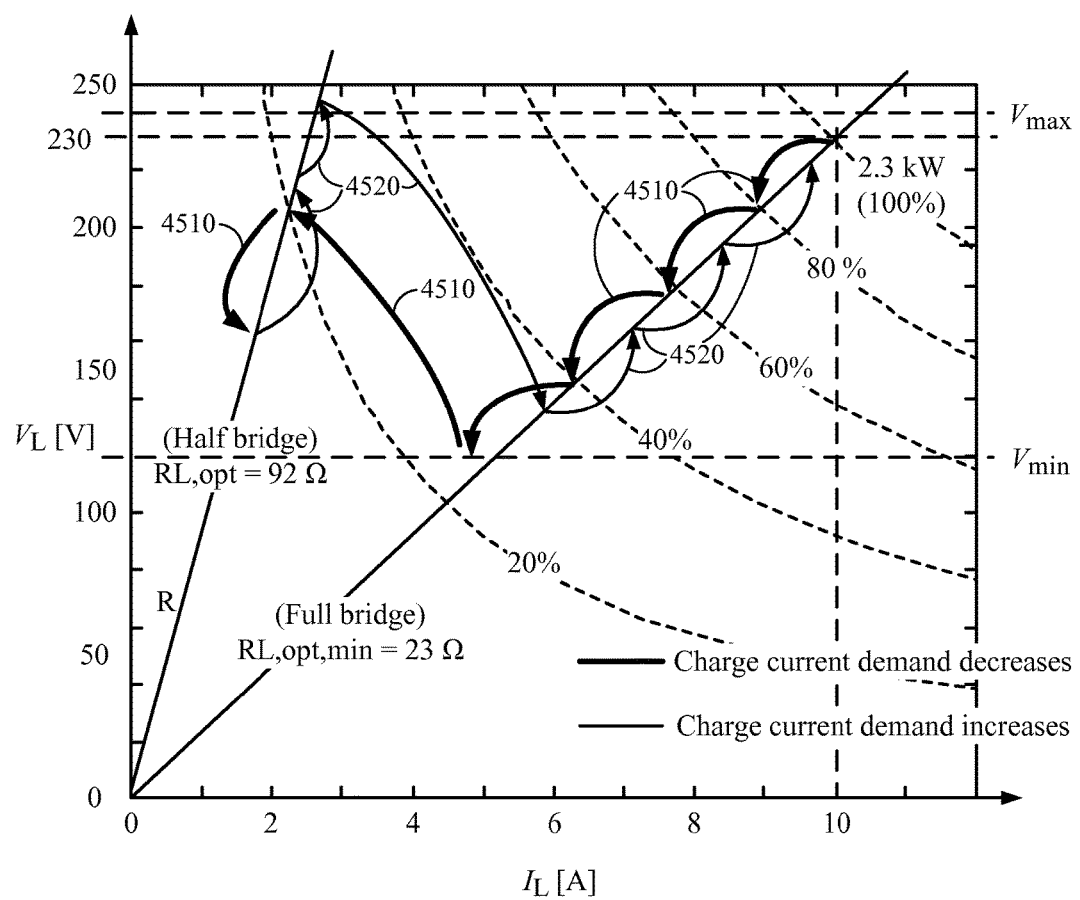
FIG. 45 is a voltage versus current graph illustrating steps of a coarse load adaptation.

FIG. 45 is a voltage versus current graph illustrating steps of a coarse load adaptation.

Figure 46:
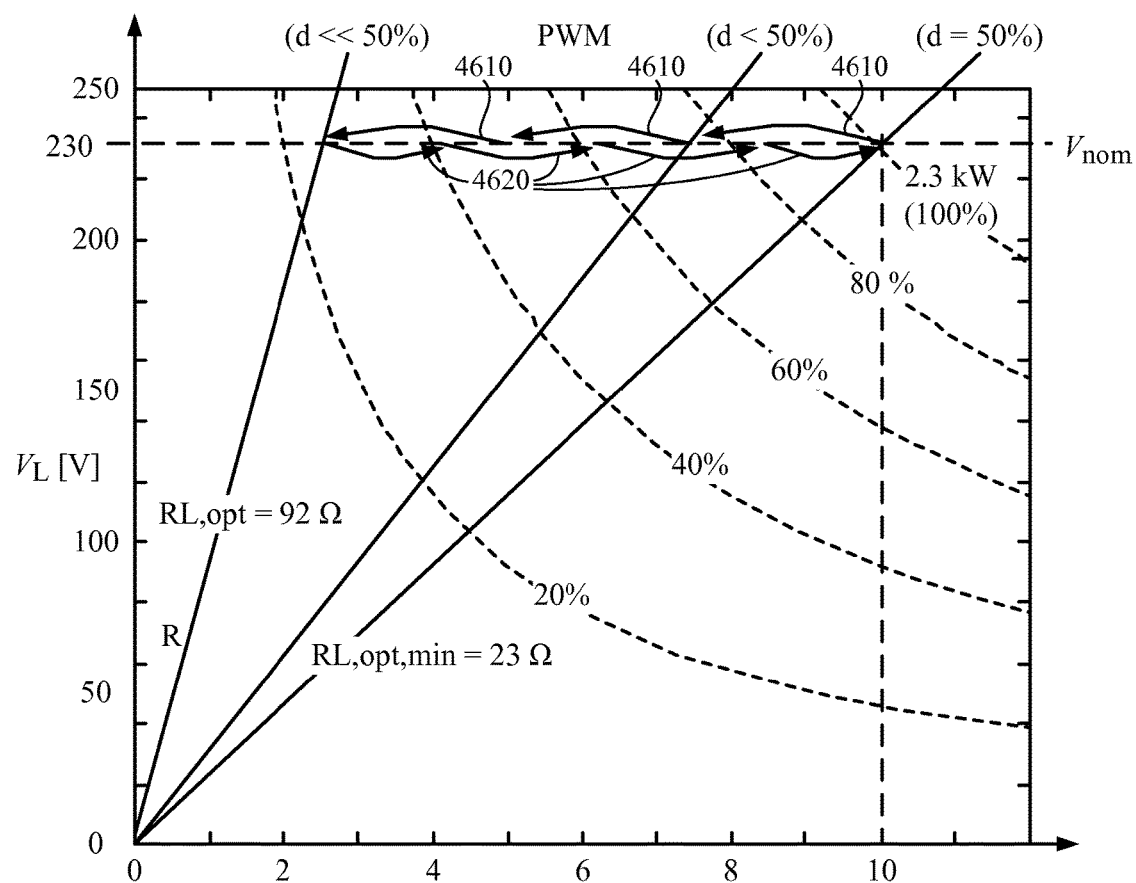
FIG. 46 is a voltage versus current graph illustrating steps of a fine load adaptation.

FIG. 46 is a voltage versus current graph illustrating steps of a fine load adaptation.

With reference to FIGS. 42-46, coarse load adaptation and fine load adaptation will be described. An optimum receiver load resistance may exist that maximizes transfer efficiency of the wireless power link. The function that maintains this optimum load resistance or transforms the actual load resistance as presented by the energy sink (e.g. the battery) to the optimum load resistance may be referred to as "load adaptation." As already noted above, load adaptation may also be considered as the reverse function of power control. In wireless high power, load adaptation is of particular importance, as the magnetic link needs to operate at efficiencies close to 100%.

In the example of FIGS. 45 and 46, the wireless power system may be optimally loaded when RL=23 Ohm if operating in a full bridge configuration. In nominal charging conditions, the receiver may output a nominal voltage of about 230 V, a nominal current of about 10 A, providing a nominal power of about 2.3 kW into the optimum load of about 23 Ohms. Now imagine that BEV charging process enters a phase in which current decays slowly, which can be controlled using the DC/DC converter of the BEV charging system. Any current/charge power reduction will have an immediate effect at the output of the wireless power system. The wireless power system will a priori maintain $V_L$, thus $I_L$ tends to decrease since power demand by BEV is retrograding. As a consequence, $R_L = V_L/I_L$ will increasingly deviate from $R_{L\_opt}$.

Now consider coarse load adaptation. To counteract this false trend, the wireless power system will throttle transmit power slightly so that $V_L$ will drop, in turn forcing the BEV DC/DC converter to lower its input resistance ($I_L$ to increase) such that the load resistance as presented by the BEV DC/DC converter becomes again 23 Ohm. This is illustrated by lines 4510 in FIG. 45 with each line indicating a coarse load adjustment as $I_L$ continues to decrease. In the $V_L/I_L$ plane, this control strategy may be visualized as an operating point always tracking along the $R_{L,opt}$=23 Ohm line until a lower limit voltage is reached.

To counteract any further load resistance increase by the BEV DC/DC converter, the wireless power system now decides to apply coarse load adaptation by reconfiguring the receive topology from full-bridge (i.e., transformation ratio about 1:1) to half-bridge (transformation ratio about 1:4). In half-bridge, the optimum load resistance that needs to be targeted is, for example 92 Ohms instead of 23 Ohms. $V_L$ also will increase again to near the upper limit of the BEV DC/DC converter input range giving room for further demand reduction. The process of power throttling can now continue in the same manner however along the 92 Ohm load line until eventually the lower $V_L$ limit is reached.

Now, consider fine load adaptation as illustrated in FIG. 46. Fine load adaptation may be useful if the input voltage tolerance range of the BEV DC/DC converter was tight around the nominal $V_L$. In this case the transformation ratio (1:n) of the receiver would need to be steadily adapted using one of the methods described above, such as, for example, detuning, PWM duty cycle, etc. When power demand is retrograding and $I_L$ tends to decrease, the wireless power system will respond by steadily incrementing the transformation ratio n such that $V_L$ can be maintained in a tight control band while the load resistance is maintained at optimum. In the $V_L/I_L$ chart of FIG. 46, the operating point will still track the optimum load line but the load line continuously changes its slope such that $V_L$ stays in the specified tight tolerance band.

Of course, this process of coarse/fine load adaptation can be reversed in the same manner when BEV power demand should increase. This is also illustrated in FIGS. 45 and 46 with lines 4520 and 4620, respectively.

In the coarse load adaptation approach, the wireless power system forces/stimulates the BEV DC/DC converter to perform fine load adaptation while the wireless power system itself only performs coarse load adaptation when the BEV DC/DC converter reaches its limits.

In the fine load adaptation approach, the wireless power system does not (or only marginally) rely on the BEV DC/DC converter and performs load adaptation alone.

In a system that has to support reverse power mode (Vehicle-to-grid), only fine load adaptation will likely apply in the wireless power system, since on the grid-side there will normally not be an external converter that can be stimulated to perform fine load adaptation.

Figure 47:
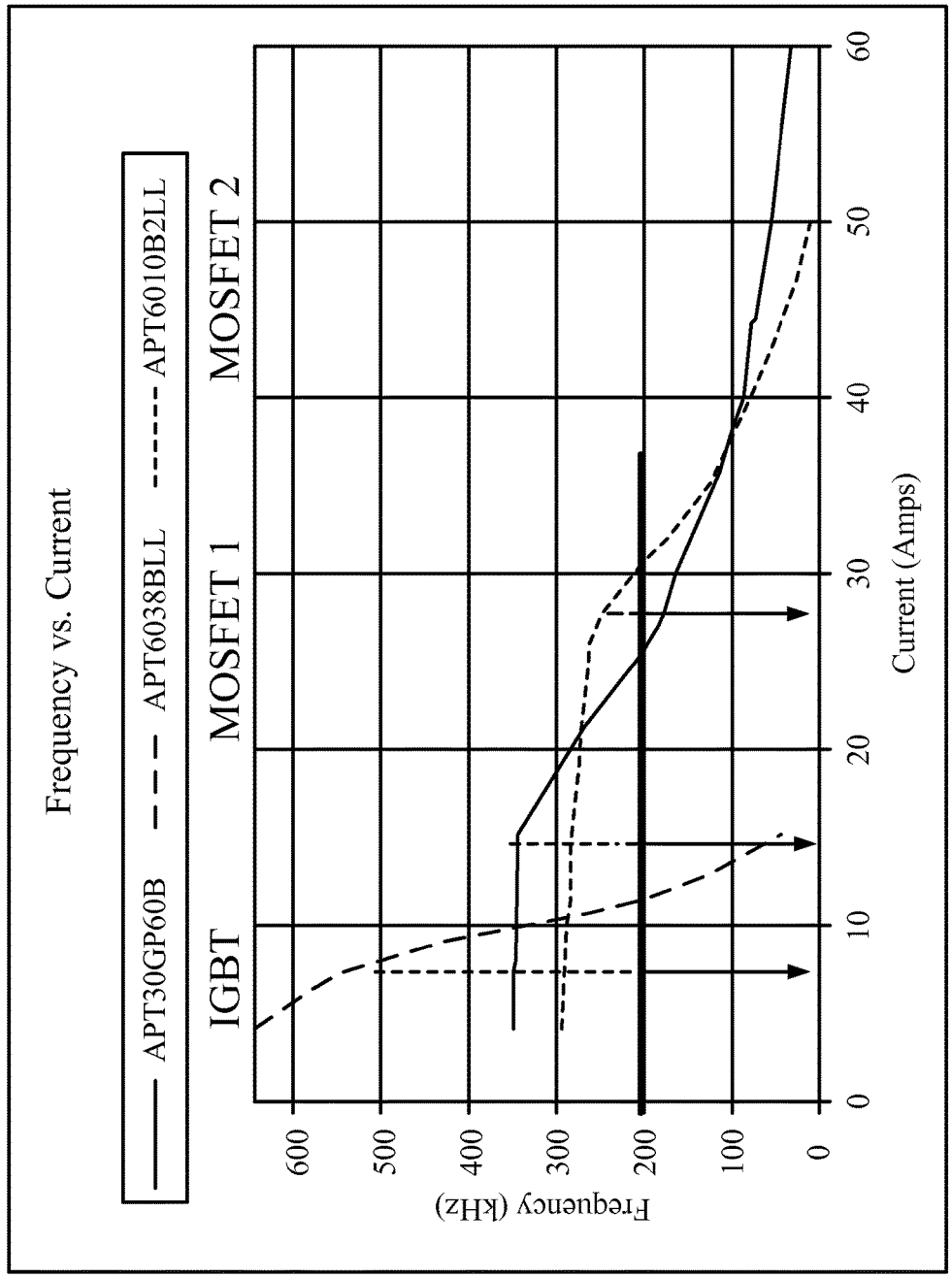
FIG. 47 is a graph illustrating frequency versus current characteristics for various solid-state switches that may be used in exemplary embodiments.

FIG. 47 is a graph illustrating frequency versus current characteristics for various solid-state switches that may be used in exemplary embodiments. The semiconductor switches used for the power electronics stages in a wireless BEV charger may need to fulfil certain general requirements, such as, for example: a high operating voltage (e.g., >500 V), a medium operating current (e.g., 10 A), a sufficient switching speed for VLF or LF frequencies, low on-state losses, and low switching losses. Insulated Gate Bipolar Transistors (IGBTs) and Power Metal Oxide Field Effect Transistors (MOSFETs) are both available for voltages greater than 600 V and currents up to 80 A. Other parameters that may be important are the switching speed with related switching losses and the on-state losses. IGBTs may be the device of choice for voltages >1000 V and for low switching speeds in low voltage applications. MOSFETs may be the device of choice for switching speeds >200 kHz and very low voltage applications.

Figure 48:
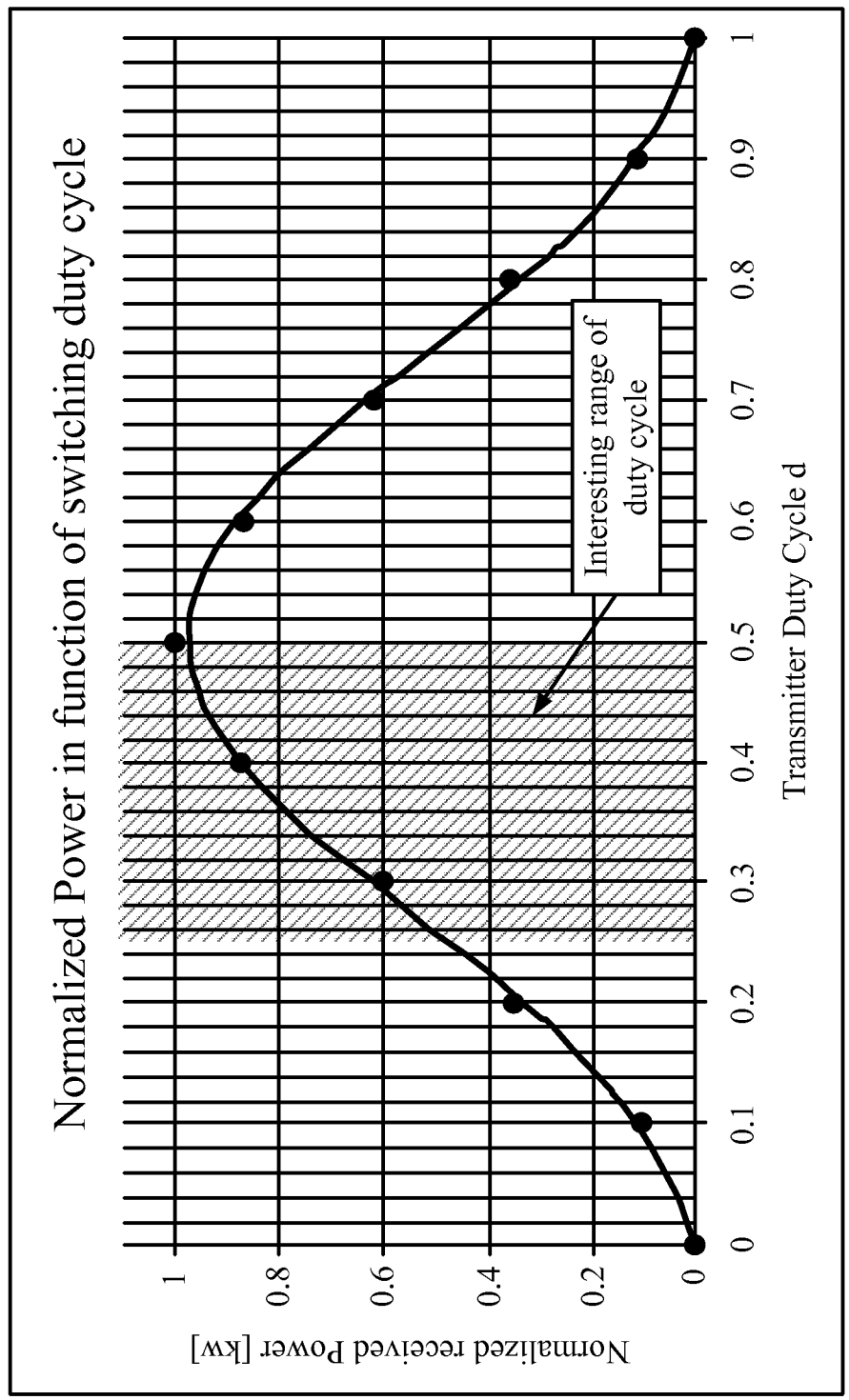
FIG. 48 illustrates normalized power as a function of transmitter duty cycle to show a significant range for the duty cycle.

FIG. 48 illustrates normalized power as a function of transmitter duty cycle to show a significant range for the duty cycle. For power control using pulse-width modulation smooth power control would be dependent on the resolution available for the pulse width. PWM will likely be most effective for power control within the "interesting range" illustrated on FIG. 50 between about 0.25 and 0.5 for the duty cycle. Using PWM outside of this range may introduce additional harmonics and inefficiencies in the system. As a result, outside the "interesting range" other power control methods (e.g., half bridge and sub-harmonic drive) may be more effective.

Figure 49:
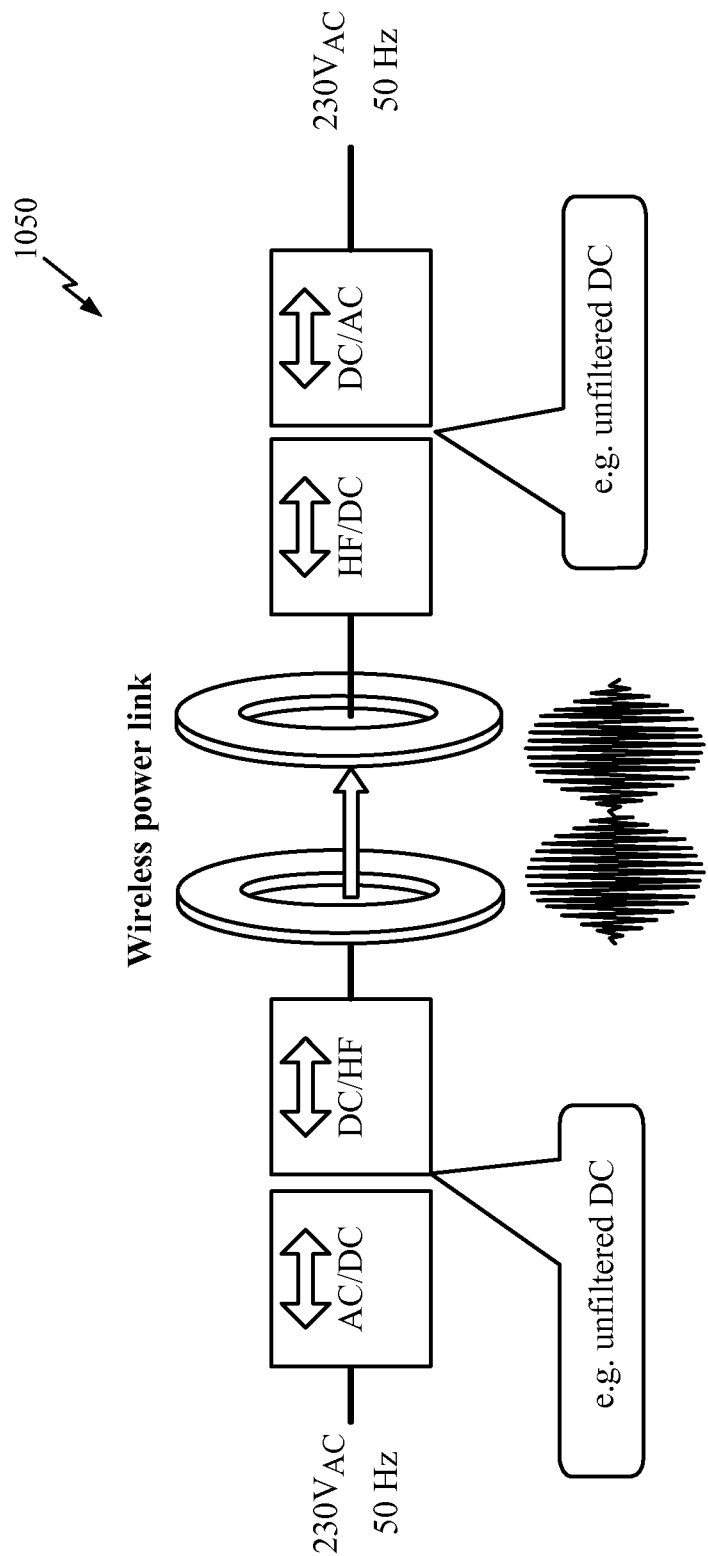
FIG. 49 is a simplified block diagram illustrating an exemplary embodiment of a wireless power system at high frequencies.

FIG. 49 is a simplified block diagram illustrating an exemplary embodiment of a wireless power system 1050 at high frequencies. Such high frequencies (HF) may be in the range of 3 MHz to 30 MHz as explained earlier and particularly the 13.56 MHz frequency used for RFID and Near Field Communication (NFC), the 6.78 MHz frequency and the 27.12 MHz frequency discussed earlier. As with the LF and VLF embodiments discussed earlier, the AC/DC converters and DC/HF converters (rather than DC/LF) can be configured to be bidirectional such that power can be transferred through the wireless power link from the CB to the BEV or from the BEV to the CB.

Figure 50:
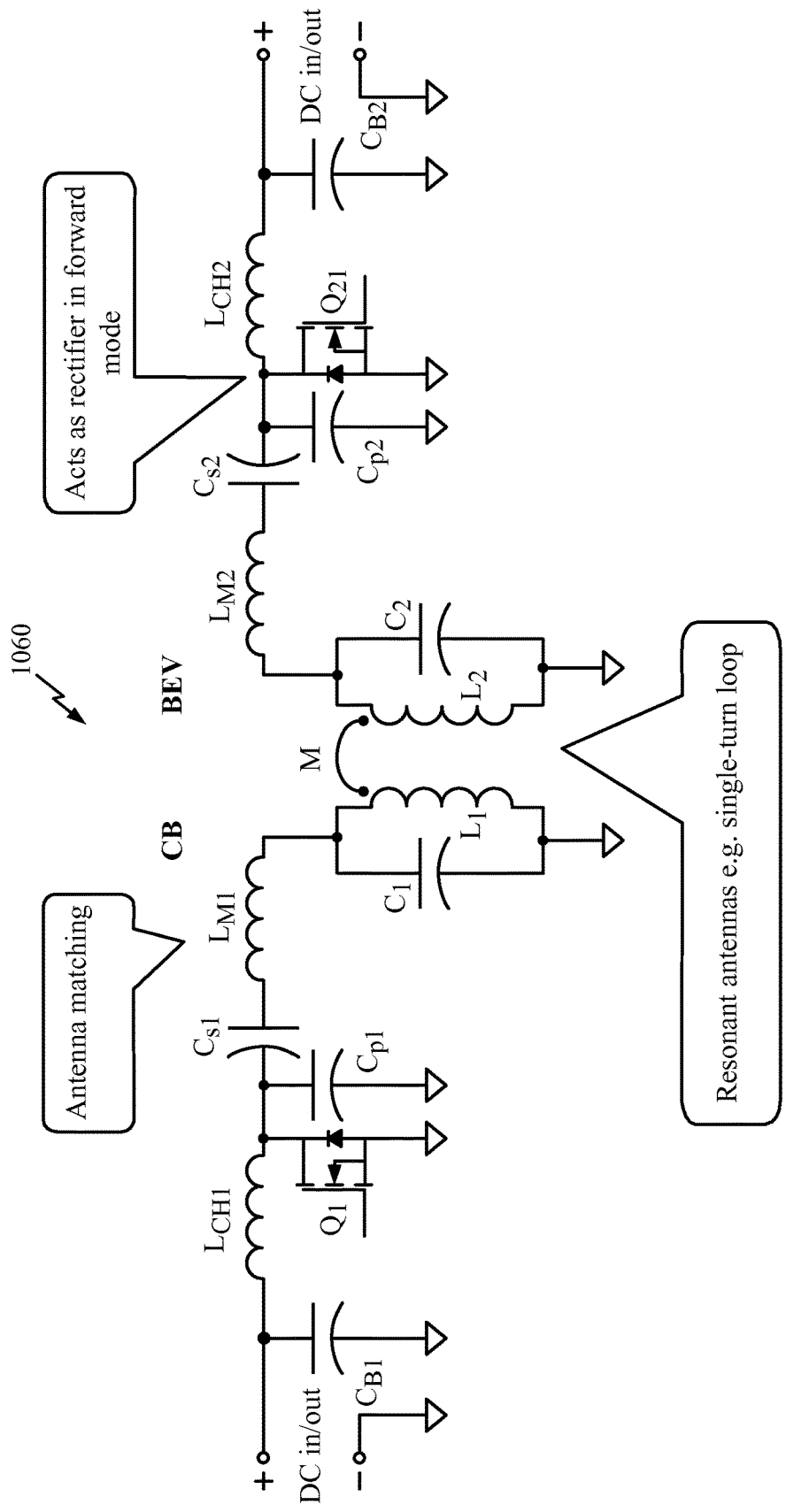
FIG. 50 is a simplified circuit diagram of a wireless power system for a BEV illustrating an asymmetric Class E topology for wireless power transfer.

FIG. 50 is a simplified circuit diagram of a wireless power system 1060 for a BEV illustrating an asymmetric Class E topology for wireless power transfer. The resonant antennas on both the CB side and the BEV side may include inductors ($L_{M1}$ and $L_{M2'}$, respectively) and capacitors ($C_{S1}$ and $C_{S2'}$, respectively) for impedance matching. On the CB side, transistor $Q_1$ may be used to generate the HF power. DC supply may be blocked for HF signals by capacitor $C_{P1}$ and inductor $L_{CH1}$ is part of the well known class E circuit. When performing a receive function, transistor $Q_1$, capacitor $C_{P1}$ and inductor $L_{CH1}$ can act as a synchronous rectifier to reconvert HF power to DC power. On the BEV side, $Q_{21}$, capacitor $C_{P2}$ and inductor $L_{CH2}$ can perform the same HF power generation or HF rectification depending on whether the BEV is transmitting or receiving, respectively.

Figure 51:
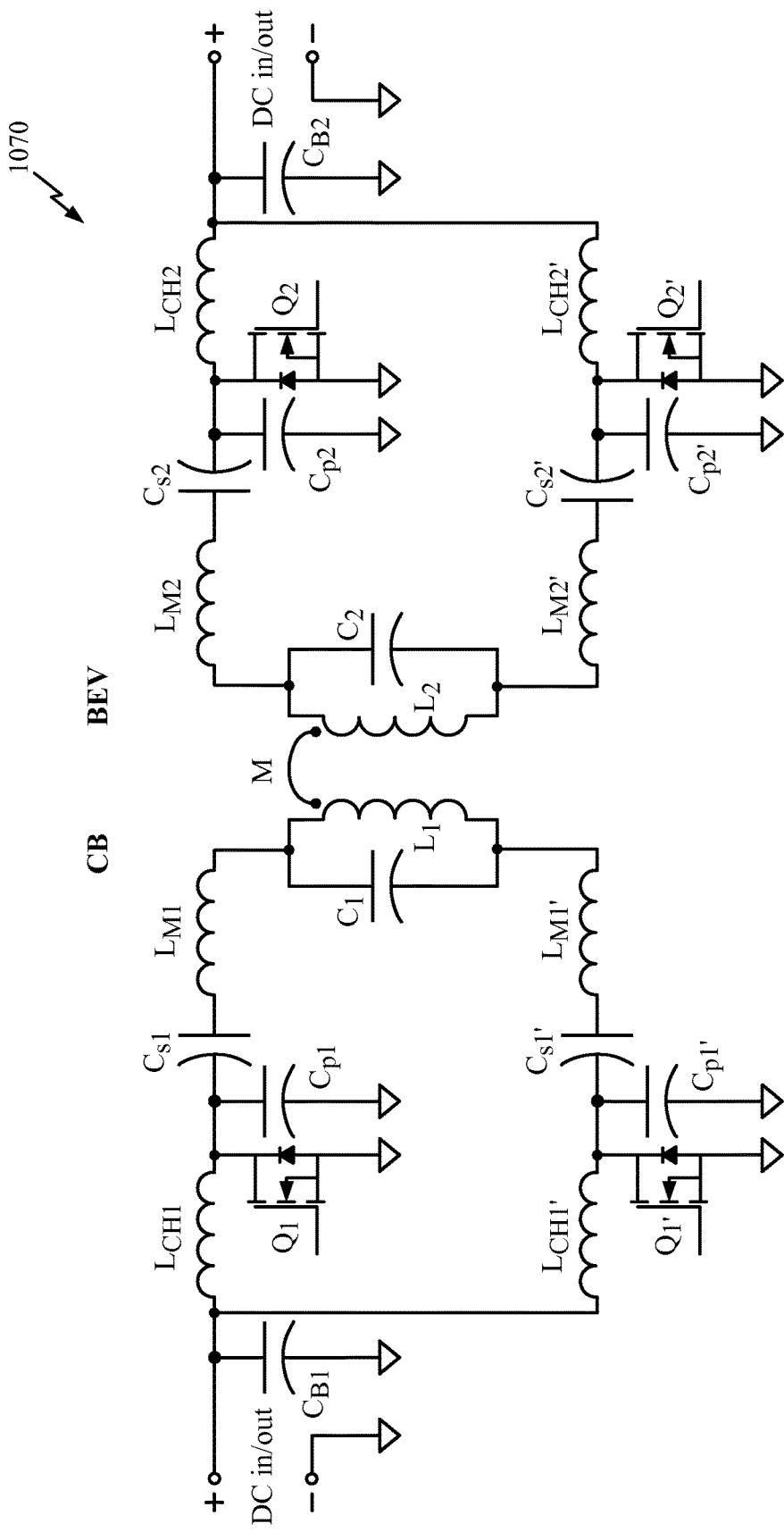
FIG. 51 is a simplified circuit diagram of a wireless power system for a BEV illustrating a symmetric Class E topology for wireless power transfer.

FIG. 51 is a simplified circuit diagram of a wireless power system 1070 for a BEV illustrating a symmetric Class E topology for wireless power transfer at HF. The embodiment of FIG. 53 is similar to the embodiment of FIG. 52 except that it is fully symmetrical with duplicated circuitry on each side of the transmit antenna and duplicated circuitry on each side of the receive antenna. Since more active switches are involved this topology may have higher power capability, moreover, even harmonics in the antenna currents ideally cancel therefore simplifying additional harmonics filtering (not shown in FIG. 51).

Figure 52:
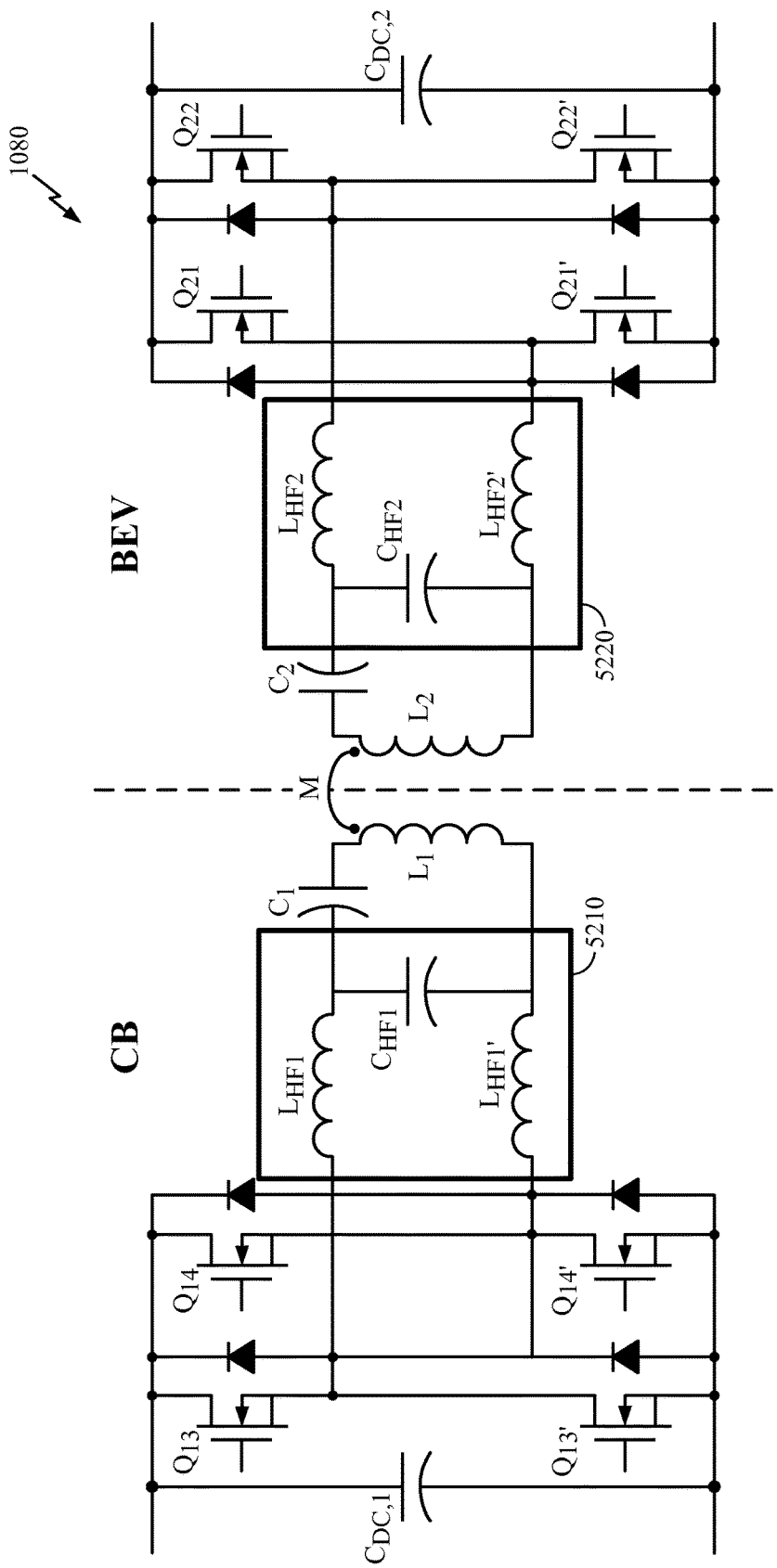
FIG. 52 is a simplified circuit diagram illustrating harmonics filtering in a wireless power system for a BEV
Figure 53:
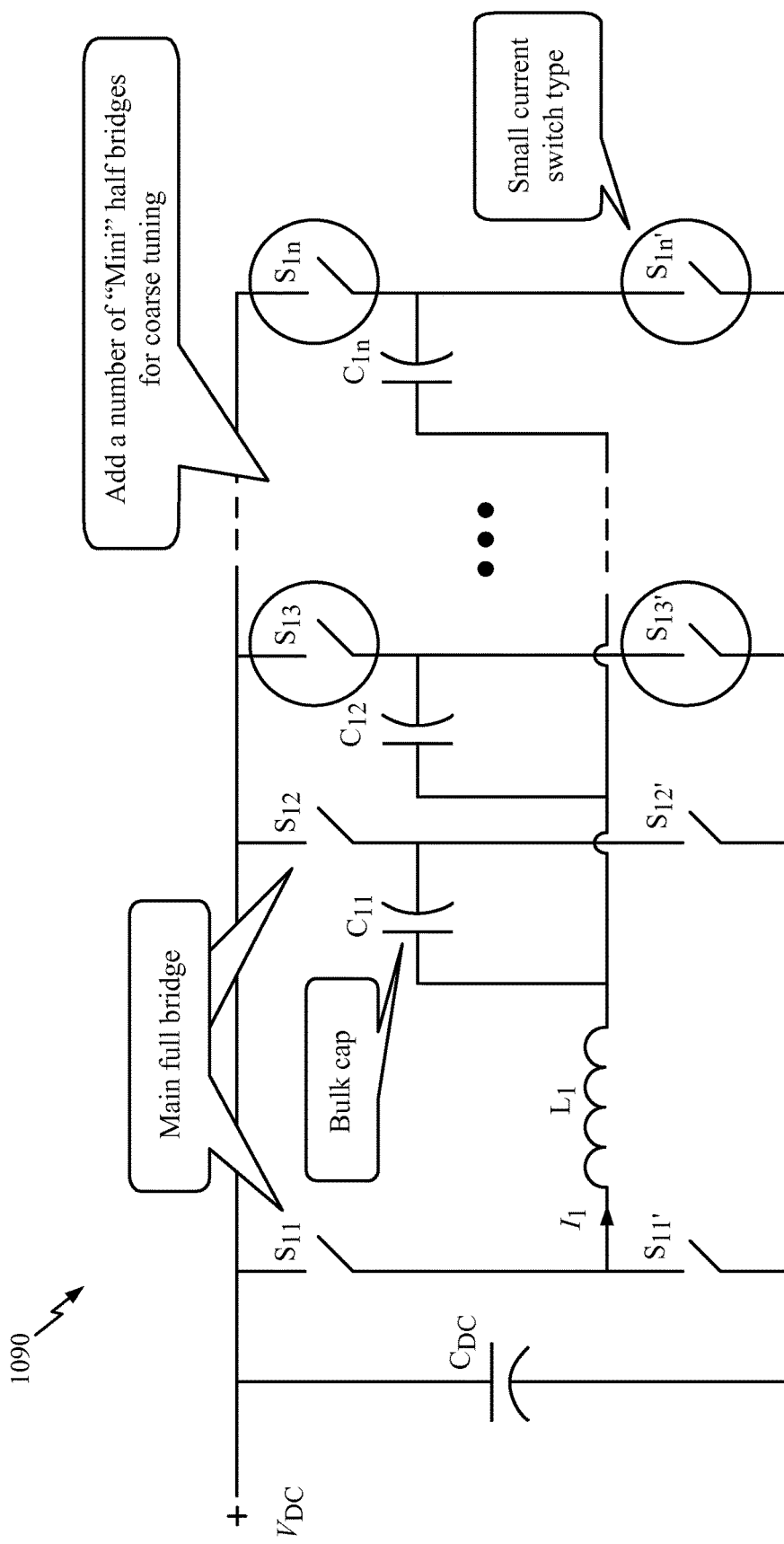
FIG. 53 is a simplified circuit diagram illustrating resonance tuning in a wireless power system for a BEV.

FIG. 52 is a simplified circuit diagram illustrating harmonics filtering in a wireless power system 1080 for a BEV operating at VLF, LF or even higher frequencies. For some frequencies, a light harmonics filtering may suffice to achieve compliance with some standards. In still other exemplary embodiments, harmonics filtering may be performed by exemplary embodiments discussed above and additional harmonics filtering may be included as shown in FIG. 52. In FIG. 52, the harmonics filtering for the case of a full bridge topology is illustrated as box 5210 on the CB side and box 5220 on the BEV side. For example, on the CB side, the harmonics filter 5210 has a symmetric low pass structure and may include inductors $L_{HF1}$ and $L_{HF1'}$ with a capacitor $C_{HF1}$ therebetween. Similarly, on the BEV side, the harmonics filter 5220 has a symmetric low pass structure and may include inductors $L_{HF2}$ and $L_{HF2'}$ with a capacitor $C_{HF2}$ therebetween.

FIG. 53 is a simplified circuit diagram illustrating resonance tuning in a wireless power system 1090 for a BEV that is based on a full bridge topology. The exemplary embodiment of FIG. 53 can be configured to make minor changes to the resonant frequency. These minor changes may be useful, for example, to compensate for some undesired de-tuning effect from other circuitry and to purposefully move the resonant frequency for power control. A main full-bridge topology is formed with solid-state switches $S_{11}$, $S_{11'}$, $S_{12}$, and $S_{12'}$ and a main capacitor $C_{11}$. A number of "mini" half bridges can be added with a corresponding capacitor to modify characteristics of the full-bridge by adding incremental amounts of capacitance. "n" half-bridges are illustrated in FIG. 53. A first half-bridge includes solid-state switches $S_{13}$, $S_{13'}$, and capacitor $C_{12}$. A final half-bridge includes solid-state switches $S_{1n}$, $S_{1n'}$, and capacitor $C_{1n}$. A desired number of half-bridges can be synchronously switched with the full-bridge to add in incremental capacitances and modify the resonant frequency due to the additional capacitance. This tuning network applies to operating the full bridge in both transmit and receive (synchronous rectification) mode.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
    a conductive charging interface (CCI) configured to receive a first AC power signal from an AC power distribution network;
    an antenna circuit configured to wirelessly receive, via an electromagnetic field from a transmitting device, charging power at a level sufficient to power or charge an electronic device or vehicle, and to provide a second AC power signal based upon the received charging power;
    a power factor correction (PFC) circuit shared by the CCI and the antenna circuit via a switching circuit configured to selectively couple the PFC circuit to the CCI or the antenna circuit;
    a power converter circuit operably coupled between the PFC circuit and the switching circuit; and
    a rectifier circuit operably coupled between the antenna circuit and the switching circuit, and configured to convert the second AC power signal to a DC output signal and pass the DC output signal through the power converter circuit when the PFC circuit is operably coupled to the antenna circuit,
    wherein the PFC circuit is configured to:
        when operably coupled to the antenna circuit, receive the DC output signal from the rectifier circuit and reduce harmonics in the second AC power signal provided by the antenna circuit, via presenting a variable impedance to the rectifier circuit.

2. The apparatus of claim 1, wherein the PFC circuit is configured to reduce harmonics in the AC power distribution network and to produce a load resistance, at an input of the power converter circuit, that is substantially constant, via presenting a variable impedance to the power converter circuit.

3. The apparatus of claim 1, wherein the rectifier circuit is configurable between half-bridge mode and full-bridge mode depending on a load at an input of the rectifier circuit.

4. The apparatus of claim 3, wherein the rectifier circuit is configured to bidirectionally convert i) AC power to DC power in receive mode and ii) DC power to AC power in transmit mode.

5. The apparatus of claim 4, wherein the second AC power signal is a modulated AC power signal is-based on an unfiltered DC signal.

6. The apparatus of claim 3, wherein the second AC power final is a modulated AC power signal having a waveform with a non-constant envelope.

7. The apparatus of claim 1, wherein the rectifier is configured to convert the second AC power signal to a DC output that is AC modulated.

8. The apparatus of claim 1, wherein the power converter circuit comprises:
a bidirectional DC/DC converter configured to modify a power output signal of the PFC circuit; and
a bidirectional DC/AC converter operably coupled to the bidirectional DC/DC converter via the switching circuit.

9. The apparatus of claim 1, wherein the rectifier circuit comprises a bidirectional DC/AC converter including a pulse-width modulation circuit with an adjustable duty cycle and configured to adjust a power output signal of the PFC circuit.

10. The apparatus of claim 1, wherein the rectifier circuit comprises:
a full-bridge rectifier/inverter with a bulk capacitance, wherein the full-bridge rectifier/inverter comprises a plurality of transistors; and
a plurality of half-bridge rectifiers/inverters, each with a trim capacitance;
wherein at least one of the half-bridge rectifiers/inverters is configured to synchronously switch transistors of the full-bridge rectifier/inverter to modify a resonant frequency of the wireless power link.

11. The apparatus of claim 1, wherein the rectifier circuit is further configured to convert an operating frequency of the second AC power signal to a substantially subharmonic frequency of the antenna circuit's resonant frequency to control the second AC power signal.

12. The apparatus of claim 1, wherein the rectifier circuit is configured as a frequency upconverter in transmit mode and as a frequency downconverter in receive mode, and wherein the frequency converter is a double side band modulator in transmit mode and a double side band demodulator in receive mode.

13. A method of wireless charging with reduced current harmonics, comprising:
receiving a first AC power signal from an AC power distribution network via a conductive charging interface (CCI);
wirelessly receiving, at an antenna circuit via an electromagnetic field from a transmitting device, charging power at a level sufficient to power or charge an electronic device or vehicle;
providing a second AC power signal from the antenna circuit, based upon the received charging power;
selectively coupling a power factor correction (PFC) circuit to the CCI or the antenna circuit using a switching circuit, the PFC circuit shared by the CCI and the antenna circuit;
when the PFC circuit is operably coupled to the CCI, converting the first AC power signal received using a power converter circuit operably coupled between the PFC circuit and the switching circuit; and
when the PFC circuit is operably coupled to the antenna circuit:
converting the second AC power signal to a DC output signal using a rectifier circuit operably coupled between the antenna circuit and the switching circuit,
passing the DC output signal through the power converter circuit such that the DC output signal is received by the PFC circuit;
reducing harmonics, via the PFC circuit, in the second AC power signal provided by the antenna circuit, via presenting a variable impedance to the rectifier circuit.

14. The method of claim 13, further comprising:
producing a load resistance, at an input of the power converter circuit, that is substantially constant, via presenting using the PFC circuit a variable impedance to the power converter circuit.

15. The method of claim 13, wherein the rectifier circuit is configurable between half-bridge mode and full-bridge mode depending on a load input to the rectifier circuit.

16. The method of claim 15, further comprising:
determining an output signal condition comprising one or more of a current of an output signal of the PFC circuit and a voltage of the output signal;
sampling the output signal condition and providing a pulse-width modulation signal to the rectifier circuit to adapt to a change in load on the output signal; and
performing a coarse load adaptation via at least one of:
switching from a half-bridge rectification to a full-bridge rectification if a voltage of the output signal falls below a lower limit voltage; and
switching from the half-bridge rectification to the full-bridge rectification if a voltage of the output signal rises above the lower limit voltage.

17. The method of claim 15, further comprising:
upconverting in the rectifier circuit by using double side band modulation in transmit mode; and
downconverting in the rectifier circuit by using double side band demodulation in receive mode.

18. The method of claim 13, wherein the second AC power signal comprises a modulated AC power signal, and further comprising converting a frequency of the modulated AC power signal to a substantially subharmonic frequency of the antenna circuit's resonant frequency to control the power level of the modulated AC power signal.

19. The method of claim 13, further comprising adjusting a power output signal of the PFC circuit by repeatedly switching a power input signal of the PFC module between on and off when in transmit mode.

20. The method of claim 13, wherein converting the second AC power signal to a DC output signal using the rectifier circuit comprises converting the second AC power signal to a DC output signal is AC modulated.

21. The method of claim 13, wherein the second AC power signal has a waveform having a non-constant envelope, and wherein the second AC power signal is based on an unfiltered DC signal.

22. An apparatus, comprising:
means for receiving a first AC power signal from an AC power distribution network;
means for wirelessly receiving, via an electromagnetic field from a transmitting device, charging power at a level sufficient to power or charge an electronic device or vehicle;
means for providing a second AC power signal from the means for wirelessly receiving power, based upon the received charging power;
means for power factor correction (PFC);
switching means for selectively coupling the PFC means to the means for receiving power via the AC power distribution network or the means for wirelessly receiving power; and
power converting means for converting the power received via the AC power distribution network, operably coupled between the switching means and the PFC means;
rectifying means for converting the second AC power signal to a DC output signal and passing the DC output signal through the power converting means when the PFC means is operably coupled to the means for wireless receiving charging power, the rectifying means being operably coupled between the means for wireless receiving charging power and the switching means;

wherein the PFC means comprises means for, when the PFC means is operably coupled to the means for wireless receiving charging power, reducing harmonics in the second AC power signal via presenting a variable impedance to the rectifying means.

23. The apparatus of claim 22, wherein the PFC means further comprises:

means for producing a load resistance, at an input of the power converting means, that is substantially non-time variant, via presenting a variable impedance to the power converting means.

24. The apparatus of claim 23, wherein the rectifying means is configurable between half-bridge mode and full-bridge mode depending on a load.

25. The apparatus of claim 24, further comprising:

means for generating a pulse-width modulation signal; and means for modifying an output signal of the rectifying means to a DC power output signal at a different voltage level responsive to the pulse-width modulation signal.

26. The apparatus of claim 25, further comprising:

means for determining a DC power output signal condition comprising one or more of a current and a voltage of the DC power output signal;

means for sampling the DC power output signal condition; and means for providing a feedback signal to the rectifying means to modify the DC power output signal to adapt to a change in a load at the DC power output signal.

27. The apparatus of claim 24, wherein the rectifying means comprises means for bidirectionally converting i) AC power to DC power in receive mode and ii) DC power to AC power in transmit mode.

28. The apparatus of claim 22, wherein the DC output signal is AC modulated, wherein the second AC power signal has a waveform having a non-constant envelope.

* * * * *